(12) United States Patent
Maeda et al.

(10) Patent No.: US 9,615,310 B2
(45) Date of Patent: Apr. 4, 2017

(54) MOBILE COMMUNICATION SYSTEM

(71) Applicant: Mitsubishi Electric Corporation, Tokyo (JP)

(72) Inventors: Miho Maeda, Tokyo (JP); Mitsuru Mochizuki, Tokyo (JP); Yasushi Iwane, Tokyo (JP); Yuji Kakehi, Tokyo (JP); Masayuki Nakazawa, Tokyo (JP); Taisei Suemitsu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/089,336

(22) Filed: Nov. 25, 2013

(65) Prior Publication Data

US 2014/0079038 A1 Mar. 20, 2014

Related U.S. Application Data

(62) Division of application No. 13/499,026, filed as application No. PCT/JP2010/005624 on Sep. 15, 2010, now Pat. No. 8,626,163.

(30) Foreign Application Priority Data

Oct. 2, 2009 (JP) .................. 2009-230547

(51) Int. Cl.
*H04W 48/02* (2009.01)
*H04W 60/00* (2009.01)
(Continued)

(52) U.S. Cl.
CPC .......... *H04W 48/02* (2013.01); *H04W 60/00* (2013.01); *H04W 28/06* (2013.01); *H04W 74/00* (2013.01); *H04W 84/045* (2013.01)

(58) Field of Classification Search
CPC ... H04W 84/045; H04W 48/08; H04W 24/10; H04W 36/14; H04W 36/20;
(Continued)

(56) References Cited

U.S. PATENT DOCUMENTS

2005/0273399 A1 12/2005 Soma et al.
2008/0220770 A1 9/2008 Qi et al.
(Continued)

FOREIGN PATENT DOCUMENTS

| EP | 2 451 217 A1 | 5/2012 |
| JP | 10-84311 | 3/1998 |
| WO | 2008/109403 | 9/2008 |

OTHER PUBLICATIONS

3GPP TS 25.413 V9.4.0, "$3^{rd}$ Generation Partnership Project; Technical Specification Group Radio Access Network; UTRAN Iu interface Radio Access Network Application Part (RANAP) signalling," Total 4 Pages, (Sep. 2010).

(Continued)

*Primary Examiner* — Chuong A Ngo
(74) *Attorney, Agent, or Firm* — Oblon, McClelland, Maier & Neustadt, L.L.P.

(57) ABSTRACT

A mobile communication system includes a CSG cell which is accessible by a CSG member, a hybrid cell which is the CSG cell where a non-CSG member is also allowed access at the same time, and a mobile terminal which is subscribed as the CSG member and connected to the CSG cell or the hybrid cell as the CSG member. Even in a case in which a subscription time period has expired, the mobile communication system enables the mobile terminal to continue the connection. When the subscription time period for the CSG member expires, in case of the mobile terminal's connection to the CSG cell, the CSG cell initiates a handover, in case of the mobile terminal's connection to the hybrid cell, the hybrid cell changes treatment for the mobile terminal from (Continued)

treating the mobile terminal as the CSG member to treating the mobile terminal as the non-CSG member.

8 Claims, 29 Drawing Sheets

(51) Int. Cl.
      *H04W 28/06*       (2009.01)
      *H04W 74/00*       (2009.01)
      *H04W 84/04*       (2009.01)
(58) Field of Classification Search
      CPC ....... H04W 36/26; H04W 48/02; H04W 4/08;
                H04W 60/00; H04W 74/00; H04W 28/06;
                H04W 88/08; H04L 12/66
      USPC .......................................... 455/435.1, 442.1
      See application file for complete search history.

(56) References Cited

U.S. PATENT DOCUMENTS

| | | | |
|---|---|---|---|
| 2009/0093232 A1 | 4/2009 | Gupta et al. | |
| 2010/0322197 A1* | 12/2010 | Adjakple ............... | H04B 7/155 370/332 |
| 2012/0015652 A1* | 1/2012 | Jung .................... | H04W 48/08 455/434 |
| 2012/0233667 A1 | 9/2012 | Amirov et al. | |
| 2013/0150115 A1 | 6/2013 | Maggenti et al. | |

OTHER PUBLICATIONS

3GPP TS 36.300 V9.0.0, "3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2," Total 162 Pages (Jun. 2009).
3GPP TSG-RAN WG1 Meeting #49bis R1-072963, "Signaling of MBSFN subframe allocation in D-BCH," Nokia Siemens Networks, Nokia, Huawei, Total 5 Pages, (Jun. 25-29, 2007).
3GPP TS 36.304 V8.6.0, "3$^{rd}$ Generation Partnership Project; Technical Specification Group Radio Access Network; Evolved Universal Terrestrial Radio Access (E-UTRA); User Equipment (UE) procedures in idle mode," Total 34 Pages, (Jun. 2009).
3GPP TSG-SA1 #42 S1-083461, "LS on HNB/HeNB Open Access Mode," 3GPP SA WG1, Total 2 Pages, (Oct. 13-17, 2008).
3GPP TSG-RAN WG 2 meeting #62 R2-082899, "LS on CSG cell identification," RAN2, Total 2 Pages, (May 5-9, 2008).
3 GPP TS 22.220 V9.1.1, "3$^{rd}$ Generation Partnership Project; Technical Specification Group Services and System Aspects; Service requirements for Home NodeBs and Home eNodeBs," Total 22 Pages, (Jun. 2009).
3GPP TS 23.401 V9.1.0, "3$^{rd}$ Generation Partnership Project; Technical Specification Group Services and System Aspects; General Packet Radio Service (GPRS) enhancements for Evolved Universal Terrestrial Radio Access Network (E-UTRAN) access," Total 234 Pages, (Jun. 2009).
3GPP TS 23.122 V8.6.0, "3$^{rd}$ Generation Partnership Project; Technical Specification Group Core Network and Terminals; Non-Access-Stratum (NAS) functions related to Mobile Station (MS) in idle mode," Total 39 Pages, (Jun. 2009).
International Search Report Issued Dec. 14, 2010 in PCT/JP10/05624 Filed Sep. 15, 2010.
Office Action issued Jul. 7, 2015 in Japanese Patent Application No. 2014-143294 (with English-language Translation).
TeliaSonera, "CSG lists and Manual CSG selection" [online], 3GPP TSG-SA1 #44 51-090333, URL:http://www.3gpp.org/ftp/tsg_sa/WG1_Serv/TSGS1_44_SanAntonio/tdocs/S1-090333.zip, San Antonio, Texas, Feb. 2-6, 2009.
Supplementary Partial European Search Report issued Jul. 4, 2016 in European Patent Application No. 10820085.8.
3GPP TS 22.011, 3rd Generation Partnership Project; Technical Specification Group Services and System Aspects; Service accessibility (Release 8), V8.9.0, Sep. 2009, XP050360397.
Office Action issued Feb. 14, 2017 in Japanese Patent Application No. 2016-052483 (with English-language Translation).
Qualcomm Europe, "Evaluation of diversion of established communications" 3GPP TSG SA WG2 Meeting #73, TD S2-094082, May 11-15, 2009, 3 pages.

* cited by examiner

FIG.5
[A]
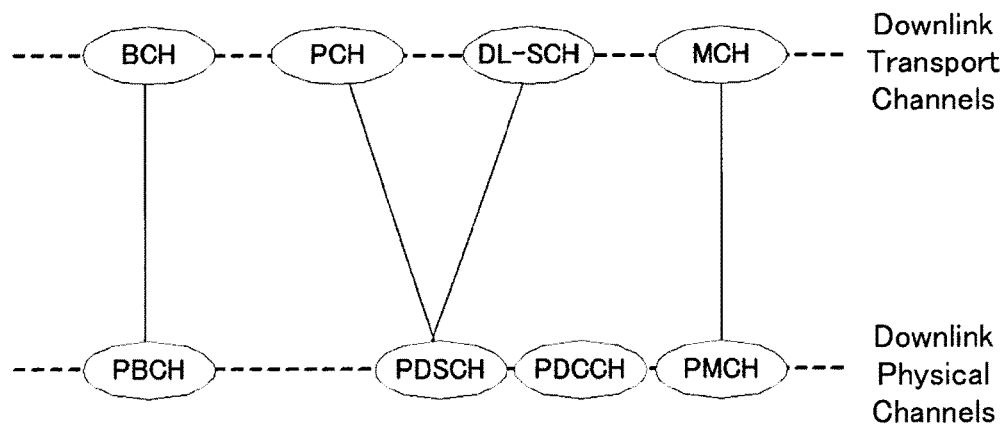
[B]
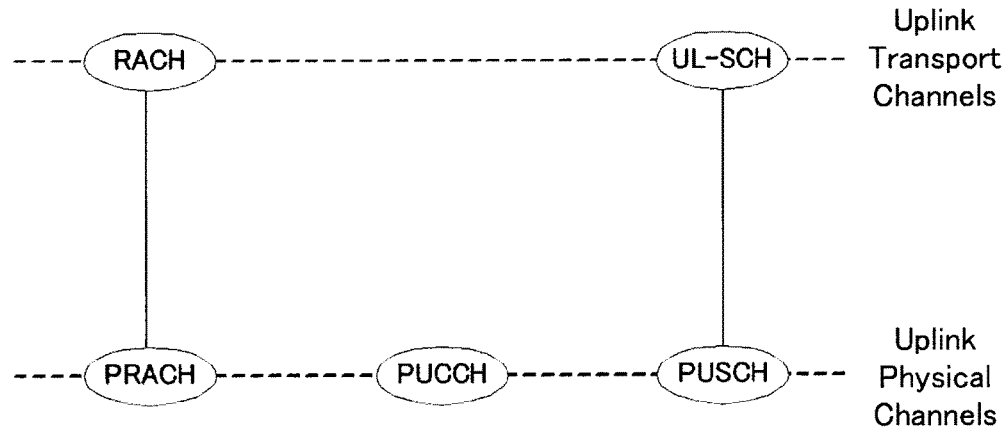

FIG.6
[A]
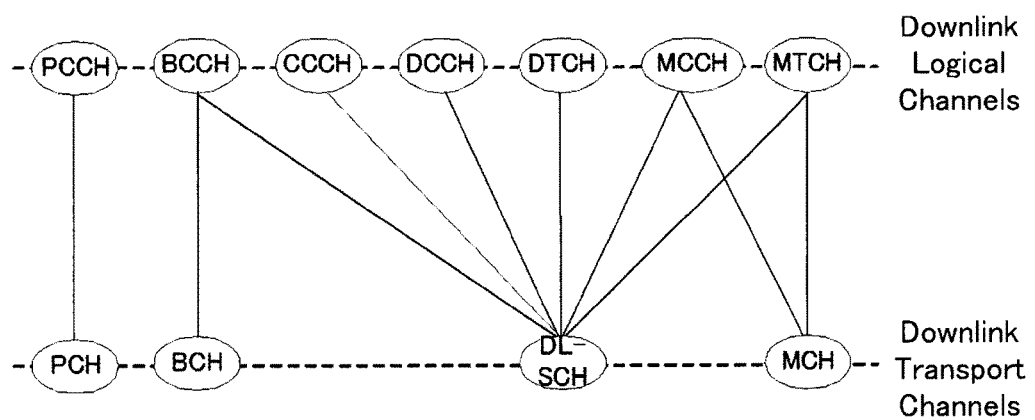
[B]
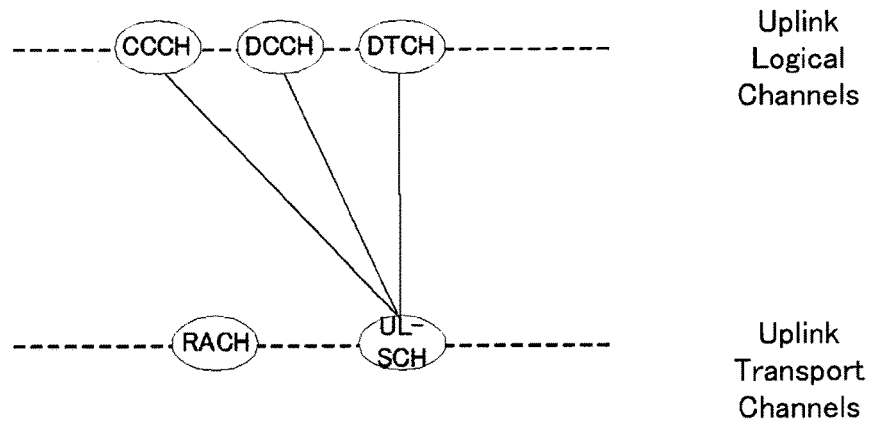

| Item | Information |
|---|---|
| Allowed CSG ID List | |
| ⋮ | ⋮ |

(a)-(2)

| Item | Information |
|---|---|
| Allowed CSG ID List | CSG ID=1 |
| ⋮ | ⋮ |

(b)-(1)

| UE Identifier | Item | Information |
|---|---|---|
| UE A | Allowed CSG ID List | |
| | ⋮ | ⋮ |
| UE B | Allowed CSG ID List | CSG ID=2 |
| | ⋮ | ⋮ |
| ⋮ | ⋮ | ⋮ |
| | Expired CSG Subscriptions | |

(b)-(2)

| UE Identifier | Item | Information |
|---|---|---|
| UE A | Allowed CSG ID List | CSG ID=1 (Temporary Time Period=A) |
| | ⋮ | ⋮ |
| UE B | Allowed CSG ID List | CSG ID=2 |
| | ⋮ | ⋮ |
| ⋮ | ⋮ | ⋮ |
| | Expired CSG Subscriptions | |

(b)-(3)

| UE Identifier | Item | Information |
|---|---|---|
| UE A | Allowed CSG ID List | |
| | ⋮ | ⋮ |
| UE B | Allowed CSG ID List | CSG ID=2 |
| | ⋮ | ⋮ |
| ⋮ | ⋮ | ⋮ |
| | Expired CSG Subscriptions | UEA CSG ID=1 |

MOBILE COMMUNICATION SYSTEM

CROSS-REFERENCE TO RELATED APPLICATIONS

This application is a divisional application of U.S. application Ser. No. 13/499,026 filed Mar. 29, 2012, which is a National Phase of PCT/JP2010/005624 filed Sep. 15, 2010 and claims priority to JP2009-230547 filed Oct. 2, 2009. The entire contents of each of which are incorporated herein by reference.

FIELD OF THE INVENTION

The present invention relates to a mobile communication system that carries out radio communications between a plurality of mobile terminals and a base station.

BACKGROUND OF THE INVENTION

Commercial service of a wideband code division multiple access (W-CDMA) system among so-called third-generation communication systems has been offered in Japan since 2001. In addition, high speed down link packet access (HSDPA) service for achieving higher-speed data transmission using a down link has been offered by adding a channel for packet transmission high speed-downlink shared channel (HS-DSCH)) to the down link (dedicated data channel, dedicated control channel). Further, in order to increase the speed of data transmission in an uplink direction, service of a high speed up link packet access (HSUPA) has been offered. W-CDMA is a communication system defined by the 3rd generation partnership project (3GPP) that is the standard organization regarding the mobile communication system, where the specifications of Release 8 version are produced.

Further, 3GPP is investigating new communication systems referred to as "long term evolution (LTE)" regarding radio areas and "system architecture evolution (SAE)" regarding the overall system configuration including a core network (merely referred to as network as well) as communication systems independent of W-CDMA. In the LTE, an access scheme, radio channel configuration and a protocol are totally different from those of the current W-CDMA (HSDPA/HSUPA). For example, as to the access scheme, code division multiple access is used in the W-CDMA, whereas in the LTE, orthogonal frequency division multiplexing (OFDM) is used in a downlink direction and single career frequency division multiple access (SC-FDMA) is used in an uplink direction. In addition, the bandwidth is 5 MHz in the W-CDMA, while in the LTE, the bandwidth can be selected from 1.4 MHz, 3 MHz, 5 MHz, 10 MHz, 15 MHz and 20 MHz for each base station. Further, differently from the W-CDMA, circuit switching is not provided but a packet communication system is only provided in the LTE.

The LTE is defined as a radio access network independent of the W-CDMA network because its communication system is configured with a new core network different from a core network (GPRS) of the W-CDMA. Therefore, for differentiation from the W-CDMA communication system, a base station that communicates with a user equipment (UE) and a radio network controller that transmits/receives control data and user data to/from a plurality of base stations are referred to as an E-UTRAN NodeB (eNB) and an evolved packet core (EPC: also referred to as access gateway (aGW)), respectively, in the LTE communication system. Unicast service and evolved multimedia broadcast multicast service (E-MBMS service) are provided in this LTE communication system. The E-MBMS service is broadcast multimedia service, which is merely referred to as MBMS in some cases. Bulk broadcast contents such as news, weather forecast and mobile broadcast are transmitted to a plurality of UEs. This is also referred to as point to multipoint service.

Non-Patent Document 1 describes the current decisions by 3GPP regarding an overall architecture in the LTE system. The overall architecture (Chapter 4.6.1 of Non-Patent Document 1) is described with reference to FIG. 1. FIG. 1 is a diagram illustrating the configuration of the LTE communication system. With reference to FIG. 1, the evolved universal terrestrial radio access (E-UTRAN) is composed of one or a plurality of base stations 102, provided that a control protocol (for example, radio resource management (RRC)) and a user plane (for example, packet data convergence protocol (PDCP), radio link control (RLC), medium access control (MAC), and physical layer (PHY)) for a UE 101 are terminated in the base station 102. The base stations 102 perform scheduling and transmission of paging signaling (also referred to as paging messages) notified from a mobility management entity (MME) 103. The base stations 102 are connected to each other by means of an X2 interface. In addition, the base stations 102 are connected to an evolved packet core (EPC) by means of an S1 interface, more specifically, connected to the mobility management entity (MME) 103 by means of an S1_MME interface and connected to a serving gateway (S-GW) 104 by means of an S1_U interface. The MME 103 distributes the paging signaling to multiple or a single base station 102. In addition, the MME 103 performs mobility control of an idle state. When the UE is in the idle state and an active state, the MME 103 manages a list of tracking areas. The S-GW 104 transmits/receives user data to/from one or a plurality of base stations 102. The S-GW 104 serves as a local mobility anchor point in handover between base stations. Moreover, there is provided a PDN gateway (P-GW), which performs per-user packet filtering and UE-ID address allocation.

A control protocol RRC between the UE 101 and the base station 102 carries out broadcast, paging, RRC connection management, etc. There are RRC_Idle and RRC_CONNECTED as states of the base station and the mobile terminal in the RRC. In the RRC_IDLE, PLMN (Public Land Mobile Network) selection, broadcast of system information (SI), paging, cell reselection, mobility, etc. are carried out. In the RRC_CONNECTED, the mobile terminal has an RRC connection, can transmit and receive data to and from the network. Further, a handover (HO), and a measurement of a neighboring cell, etc. are carried out.

The current decisions by 3GPP regarding the frame configuration in the LTE system are described in Non-Patent Document 1 (Chapter 5), which are described with reference to FIG. 2. FIG. 2 is a diagram illustrating the configuration of a radio frame used in the LTE communication system. With reference to FIG. 2, one radio frame is 10 ms. The radio frame is divided into ten equally sized subframes. The subframe is divided into two equally sized slots. Each subframe is divided into two equal-sized slots (slots). The first and sixth subframes contain a downlink synchronization signal (SS) per each radio frame. The synchronization signals are classified into a primary synchronization signal (P-SS) and a secondary synchronization signal (S-SS). Multiplexing of channels for multimedia broadcast multicast service single frequency network (MBSFN) and for non-MBSFN is performed on a per-subframe basis. Hereinafter, a subframe for MBSFN transmission is referred to as an MBSFN subframe. Non-Patent Document 2 describes a signaling example when MBSFN subframes are allocated. FIG. 3 is a diagram illustrating the configuration of the MBSFN frame. With reference to FIG. 3, the MBSFN subframes are allocated for each MBSFN frame. An MBSFN frame cluster is scheduled. A repetition period of the MBSFN frame cluster is allocated.

Non-Patent Document 1 describes the current decisions by 3GPP regarding the channel configuration in the LTE system. It is assumed that the same channel configuration is used in a closed subscriber group (CSG) cell as that of a non-CSG cell. A physical channel (Chapter 5 of Non-Patent Document 1) is described with reference to FIG. 4. FIG. 4 is a diagram illustrating physical channels used in the LTE communication system. With reference to FIG. 4, a physical broadcast channel 401 (PBCH) is a downlink channel transmitted from the base station 102 to the UE 101. A BCH transport block is mapped to four subframes within a 40 ms interval. There is no explicit signaling indicating 40 ms timing. A physical control format indicator channel 402 (PCFICH) is for transmission from the base station 102 to the UE 101. The PCFICH notifies the number of OFDM symbols used for PDCCHs from the base station 102 to the UE 101. The PCFICH is transmitted in each subframe. A physical downlink control channel 403 (PDCCH) is a downlink channel transmitted from the base station 102 to the UE 101. The PDCCH notifies the resource allocation, HARQ information related to DL-SCH (downlink shared channel that is one of the transport channels shown in FIG. 5) and the PCH (paging channel that is one of the transport channels shown in FIG. 5). The PDCCH carries an uplink scheduling grant. The PDCCH carries ACK/Nack that is a response signal to uplink transmission. The PDCCH is referred to as an L1/L2 control signal as well. A physical downlink shared channel 404 (PDSCH) is a downlink channel transmitted from the base station 102 to the UE 101. A DL-SCH (downlink shared channel) that is a transport channel and a PCH that is a transport channel are mapped to the PDSCH. A physical multicast channel 405 (PMCH) is a downlink channel transmitted from the base station 102 to the UE 101. A multicast channel (MCH) that is a transport channel is mapped to the PMCH.

A physical uplink control channel 406 (PUCCH) is an uplink channel transmitted from the UE 101 to the base station 102. The PUCCH carries ACK/Nack that is a response signal to downlink transmission. The PUCCH carries a channel quality indicator (CQI) report. The CQI is quality information indicating the quality of received data or channel quality. In addition, the PUCCH carries a scheduling request (SR). A physical uplink shared channel 407 (PUSCH) is an uplink channel transmitted from the UE 101 to the base station 102. A UL-SCH (uplink shared channel that is one of the transport channels shown in FIG. 5) is mapped to the PUSCH. A physical hybrid ARQ indicator channel 408 (PHICH) is a downlink channel transmitted from the base station 102 to the UE 101. The PHICH carries ACK/Nack that is a response to uplink transmission. A physical random access channel 409 (PRACH) is an uplink channel transmitted from the UE 101 to the base station 102. The PRACH carries a random access preamble.

A downlink reference signal which is a known symbol in a mobile communication system is inserted in the first, third and last OFDM symbols of each slot. The physical layer measurement objects of a UE include, for example, reference symbol received power (RSRP).

The transport channel (Chapter 5 of Non-Patent Document 1) is described with reference to FIG. 5. FIG. 5 is a diagram illustrating transport channels used in the LTE communication system. FIG. 5(a) shows mapping between a downlink transport channel and a downlink physical channel. FIG. 5(b) shows mapping between an uplink transport channel and an uplink physical channel. A broadcast channel (BCH) is broadcast to the entire coverage of the base station (cell) regarding the downlink transport channel. The BCH is mapped to the physical broadcast channel (PBCH). Retransmission control according to a hybrid ARQ (HARQ) is applied to a downlink shared channel (DL-SCH). Broadcast to the entire coverage of the base station (cell) is enabled. The DL-SCH supports dynamic or semi-static resource allocation. The semi-static resource allocation is also referred to as persistent scheduling. The DL-SCH supports discontinuous reception (DRX) of a UE for enabling the UE to save power. The DL-SCH is mapped to the physical downlink shared channel (PDSCH). The paging channel (PCH) supports DRX of the UE for enabling the UE to save power. Broadcast to the entire coverage of the base station (cell) is required. The PCH is mapped to physical resources such as the physical downlink shared channel (PDSCH) that can be used dynamically for traffic or physical resources such as the physical downlink control channel (PDCCH) of the other control channel. The multicast channel (MCH) is used for broadcast to the entire coverage of the base station (cell). The MCH supports SFN combining of MBMS service (MTCH and MCCH) in multi-cell transmission. The MCH supports semi-static resource allocation. The MCH is mapped to the PMCH.

Retransmission control according to a hybrid ARQ (HARQ) is applied to an uplink shared channel (UL-SCH). The UL-SCH supports dynamic or semi-static resource allocation. The UL-SCH is mapped to the physical uplink shared channel (PUSCH). A random access channel (RACH) shown in FIG. 5(b) is limited to control information. There is a collision risk. The RACH is mapped to the physical random access channel (PRACH).

The HARQ is described. The HARQ is the technique for improving the communication quality of a channel by combination of automatic repeat request and forward error correction. The HARQ has an advantage that error correction functions effectively by retransmission even for a channel whose communication quality changes. In particular, it is also possible to achieve further quality improvement in retransmission through combination of the reception results of the first transmission and the reception results of the retransmission. An example of the retransmission method is described. In a case where the receiver fails to successfully decode the received data (in a case where a cyclic redundancy check (CRC) error occurs (CRC=NG)), the receiver transmits "Nack" to the transmitter. The transmitter that has received "Nack" retransmits the data. In a case where the receiver successfully decodes the received data (in a case where a CRC error does not occur (CRC=OK)), the receiver transmits "AcK" to the transmitter. The transmitter that has received "Ack" transmits the next data. Examples of the HARQ system include "chase combining". In chase combining, the same data sequence is transmitted in the first transmission and retransmission, which is the system for improving gains by combining the data sequence of the first transmission and the data sequence of the retransmission in retransmission. This is based on the idea that correct data is partially included even if the data of the first transmission contains an error, and highly accurate data transmission is enabled by combining the correct portions of the first transmission data and the retransmission data. Another example of the HARQ system is incremental redundancy (IR). The IR is aimed to increase redundancy, where a parity bit is transmitted in retransmission to increase the redundancy by combining the first transmission and retransmission, to thereby improve the quality by an error correction function.

A logical channel (Chapter 6 of Non-Patent Document 1) is described with reference to FIG. 6. FIG. 6 is a diagram illustrating logical channels used in an LTE communication system. FIG. 6(a) shows mapping between a downlink logical channel and a downlink transport channel. FIG. 6(b) shows mapping between an uplink logical channel and an uplink transport channel. A broadcast control channel (BCCH) is a downlink channel for broadcast system control information. The BCCH that is a logical channel is mapped to the broadcast channel (BCH) or downlink shared channel (DL-SCH) that is a transport channel. A paging control channel (PCCH) is a downlink channel for transmitting paging signals. The PCCH is used when the network does not know the cell location of a UE. The PCCH that is a logical channel is mapped to the paging channel (PCH) that is a transport channel. A common control channel (CCCH) is a channel for transmission control information between UEs and a base station. The CCCH is used in a case where the UEs have no RRC connection with the base station. In downlink, the CCCH is mapped to the downlink shared channel (DL-SCH) that is a transport channel. In uplink, the CCCH is mapped to the uplink shared channel (UL-SCH) that is a transport channel.

A multicast control channel (MCCH) is a downlink channel for point-to-multipoint transmission. The MCCH is a channel used for transmission of MBMS control information for one or several MTCHs from a network to a UE. The MCCH is a channel used only by a UE during reception of the MBMS. The MCCH is mapped to the downlink shared channel (DL-SCH) or multicast channel (MCH) that is a transport channel. A dedicated control channel (DCCH) is a channel that transmits dedicated control information between a UE and a network. The DCCH is mapped to the uplink shared channel (UL-SCH) in uplink and mapped to the downlink shared channel (DL-SCH) in downlink. A dedicate traffic channel (DTCH) is a point-to-point communication channel for transmission of user information to a dedicated UE. The DTCH exists in uplink as well as downlink. The DTCH is mapped to the uplink shared channel (UL-SCH) in uplink and mapped to the downlink shared channel (DL-SCH) in downlink. A multicast traffic channel (MTCH) is a downlink channel for traffic data transmission from a network to a UE. The MTCH is a channel used only by a UE during reception of the MBMS. The MTCH is mapped to the downlink shared channel (DL-SCH) or multicast channel (MCH).

GCI represents a global cell identity. A closed subscriber group (CSG) cell is introduced in the LTE and universal mobile telecommunication system (UMTS). The CSG is described below (Chapter 3.1 of Non-Patent Document 3). The closed subscriber group (CSG) is a cell in which subscribers who are permitted to use are identified by an operator (cell for identified subscribers). The identified subscribers are permitted to access one or more E-UTRAN cells of a public land mobile network (PLMN). One or more E-UTRAN cells in which the identified subscribers are permitted to access are referred to as "CSG cell (s)". Note that access is limited in the PLMN. The CSG cell is part of the PLMN that broadcasts a specific CSG identity (CSG ID, CSG-ID). The members of the authorized subscriber group who have registered in advance access the CSG cells using the CSG-ID that is the access permission information. The CSG-ID is broadcast by the CSG cell or cells. A plurality of CSG-IDs exist in a mobile communication system. The CSG-IDs are used by UEs for making access from CSG-related members easy. The locations of UEs are traced based on an area composed of one or more cells. The locations are traced for enabling tracing of the locations of UEs and calling (calling of UEs) even in an idle state. An area for tracing locations of UEs is referred to as a tracking area. A CSG whitelist is a list stored in the USIM containing all the CSG IDs of the CSG cells to which the subscribers belong. The CSG whitelist is also referred to as an allowed CSG ID list.

A "suitable cell" is described below (Chapter 4.3 of Non-Patent Document 3). The "suitable cell" is a cell on which a UE camps to obtain normal service. Such a cell shall fulfill the following: (1) the cell is part of the selected PLMN or the registered PLMN, or part of the PLMN of an "equivalent PLMN list"; and (2) according to the latest information provided by a non-access stratum (NAS), the cell shall further fulfill the following conditions: (a) the cell is not a barred cell; (b) the cell is part of at least one tracking area (TA), not part of "forbidden LAs for roaming", where the cell needs to fulfill (1) mentioned above; (c) the cell shall fulfill the cell selection criteria; and (d) for a cell identified as CSG cell by system information (SI), the CSG-ID is part of a "CSG whitelist" of the UE (contained in the CSG whitelist of the UE).

An "acceptable cell" is described below (Chapter 4.3 of Non-Patent Document 3). This is the cell on which a UE camps to obtain limited service (emergency calls). Such a cell shall fulfill all the following requirements. That is, the minimum required set for initiating an emergency call in an E-UTRAN network are as follows: (1) the cell is not a barred cell; and (2) the cell fulfills the cell selection criteria.

Camping on a cell represents the state where a UE has completed the cell selection/reselection process, and has selected a cell for monitoring the system information and paging information.

3GPP is studying base stations referred to as Home-NodeB (Home-NB, HNB) and Home-eNodeB (Home-eNB, HeNB). An HNB in UTRAN or an HeNB in E-UTRAN is a base station for, for example, household, corporation or commercial access service. Non-Patent Document 4 discloses three different modes of the access to the HeNB and HNB. Those are an open access mode, a closed access mode and a hybrid access mode. The respective modes have the following characteristics. In the open access mode, the HeNB and HNB are operated as a normal cell of a normal operator. In the closed access mode, the HeNB and HNB are operated as a CSG cell. The CSG cell is a cell where only CSG members are allowed access. In the hybrid access mode, the HeNB and HNB are CSG cells where non-CSG members are allowed access at the same time. In other words, a cell in the hybrid access mode is the cell that supports both the open access mode and the closed access mode.

RELATED ART DOCUMENT

Nonpatent reference

Nonpatent reference 1: 3GPP TS36 0.300 V9.0.0 Chapters 4.6.1, 4.6.2, 5, and 6
Nonpatent reference 2: 3GPP R1-072963
Nonpatent reference 3: 3GPP TS36 0.304 V8.6.0 Chapters 3.1, 4.3, and 5.2.4.8.1
Nonpatent reference 4: 3GPP S1-083461
Nonpatent reference 5: 3GPP R2-082899

Nonpatent reference 6: 3GPP TS22.220 V9.1.1
Nonpatent reference 7: 3GPP TS23.401 V9.1.0 Chapters 4.3.13, 5.3.2.1, 5.3.3.2, 5.3.4.1, 5.3.4.3, and 5.7
Nonpatent reference 8: 3GPP TS23.122 V8.6.0 Chapter 4.5.3

SUMMARY OF THE INVENTION

Problems to be Solved by the Invention

3GPP has made decisions as to the paging method as mentioned below. There is paging optimisation as functions of an HeNBGW and an MME. The paging optimisation is a function which is accepted as an option when an allowed CSG ID list for a called mobile terminal which is managed by a network side (also referred to as "CSG Subscription Data" from here on) is included in the paging message. Expired CSG subscriptions are handled as valid CSG subscriptions for the paging optimisation (Chapter 5.3.4.3 of Nonpatent reference 7).

There is provided management of a paging procedure as a function of an MME or an SGSN (Serving General packet radio service Support Node). When not receiving any response from a mobile terminal to a paging request message, the MME or the SGSN repeats the paging. When repeating the paging, the MME or the SGSN does not carry out the paging optimisation.

As the number of mobile terminals which temporarily subscribe a CSG cell as a CSG member increases, the number of mobile terminals for which a time period during which a temporary member is accepted as a CSG member has expired also increases. Therefore, the number of mobile terminals included in expired CSG subscriptions which the network side manages increases.

Thus, as the number of mobile terminals which temporarily subscribe a CSG cell, the number of mobile terminals included in expired CSG subscriptions which the network side manages increases. Therefore, there arises a problem that the processing load resulting from the management of expired CSG subscriptions increases.

Further, because expired CSG subscriptions are handled as valid CSG subscriptions for the paging optimisation, the MME or the like cannot carry out the paging optimisation in many cases. As a result, useless paging is performed frequently. Therefore, there arises a problem that effective use of radio resources cannot be made.

It is therefore an object of the present invention to provide a mobile communication system which can reduce the processing load imposed on the network side, and prevent needless use of radio resources.

Means for Solving the Problem

In accordance with the present invention, there is provided a mobile communication system which includes a mobile terminal, a base station which carries out radio communications with this mobile terminal, and an access management device which manages access from the above-mentioned mobile terminal to the above-mentioned base station, and which, when an access group comprised of one or more mobile terminals and one or more base stations is registered with the access management device, grants a mobile terminal included in the above-mentioned access group permission to access to a base station included in the same access group, in which when a predetermined condition is satisfied after a mobile terminal subscribes to the above-mentioned access group in such a way that the mobile terminal is granted permission to temporarily access to the above-mentioned access group during an access permit period, and this access permit period expires, the mobile communication system excludes the mobile terminal for which the above-mentioned access permit period has expired from destinations to which a calling message is transmitted through a base station included in the same access group.

Advantages of the Invention

Because when the predetermined condition is satisfied after a mobile terminal subscribes to the access group in such a way that the mobile terminal is granted permission to temporarily access to the access group during an access permit period, and this access permit period expires, the mobile communication system in accordance with the present invention excludes the mobile terminal for which the above-mentioned access permit period has expired from destinations to which a calling message is transmitted through a base station included in the same access group, the mobile communication system does not have to transmit the calling message to the mobile terminal through a base station included in the same access group, and can reduce the processing load imposed on the network side and prevent needless use of radio resources.

BRIEF DESCRIPTION OF THE FIGURES

FIG. 5 is a diagram illustrating transport channels used in the LTE communication system;

FIG. 6 is a diagram illustrating logical channels used in the LTE communication system;

FIG. 32 is a conceptual diagram showing a method of managing a CSG list in an LTE communication system.

EMBODIMENTS OF THE INVENTION

Embodiment 1

Figure 1:
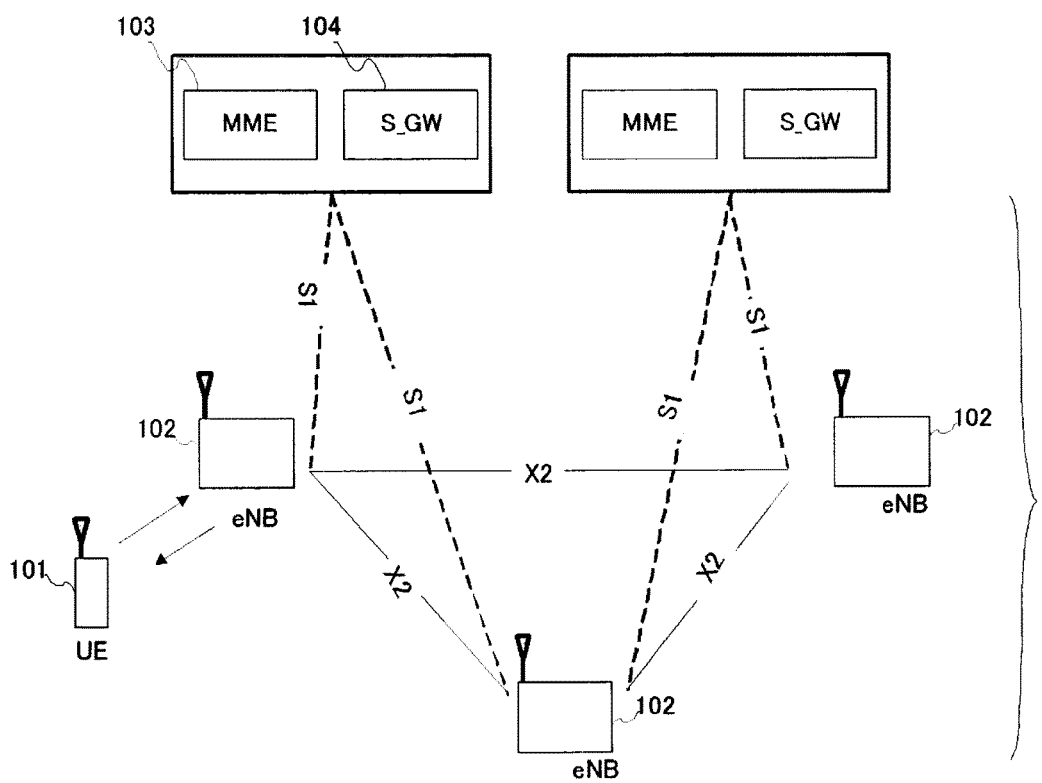
FIG. 1 is a diagram illustrating the configuration of an LTE communication system.
Figure 2:
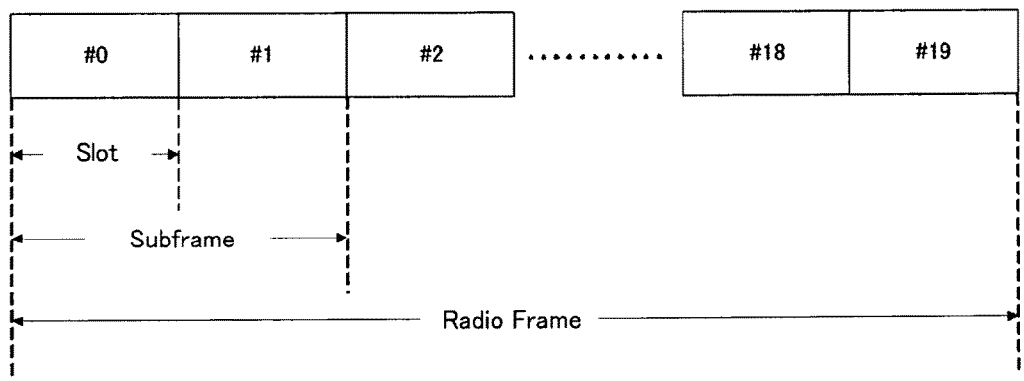
FIG. 2 is a diagram illustrating the configuration of a radio frame used in the LTE communication system.
Figure 3:
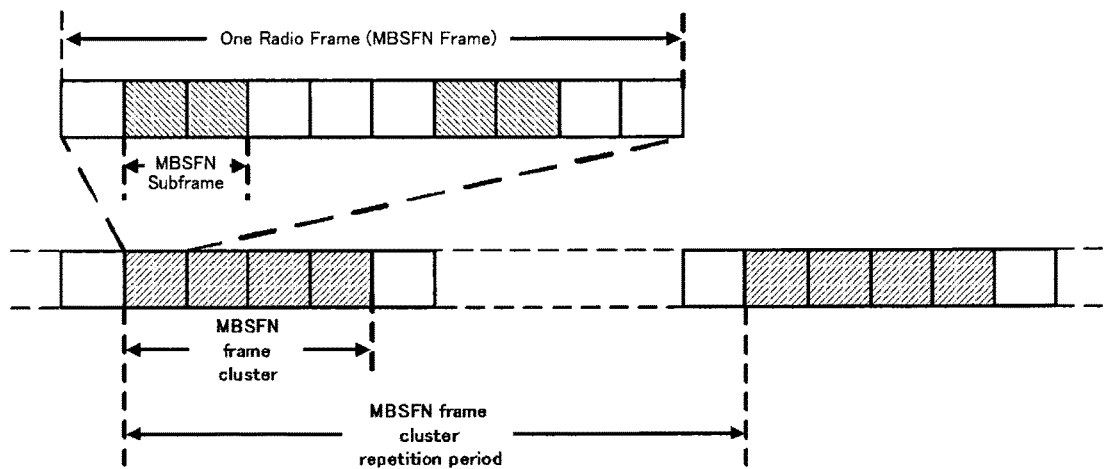
FIG. 3 is a diagram illustrating the configuration of a multimedia broadcast multicast service single frequency network (MBSFN) frame.
Figure 4:
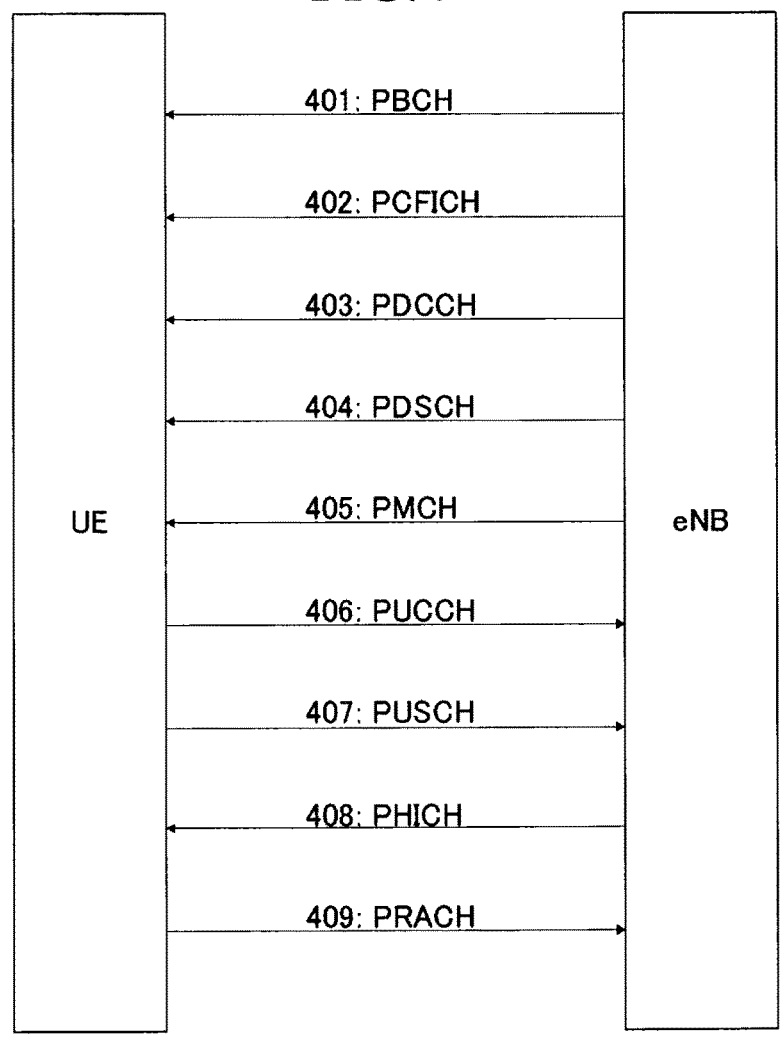
FIG. 4 is a diagram illustrating physical channels used in the LTE communication system.
Figure 7:
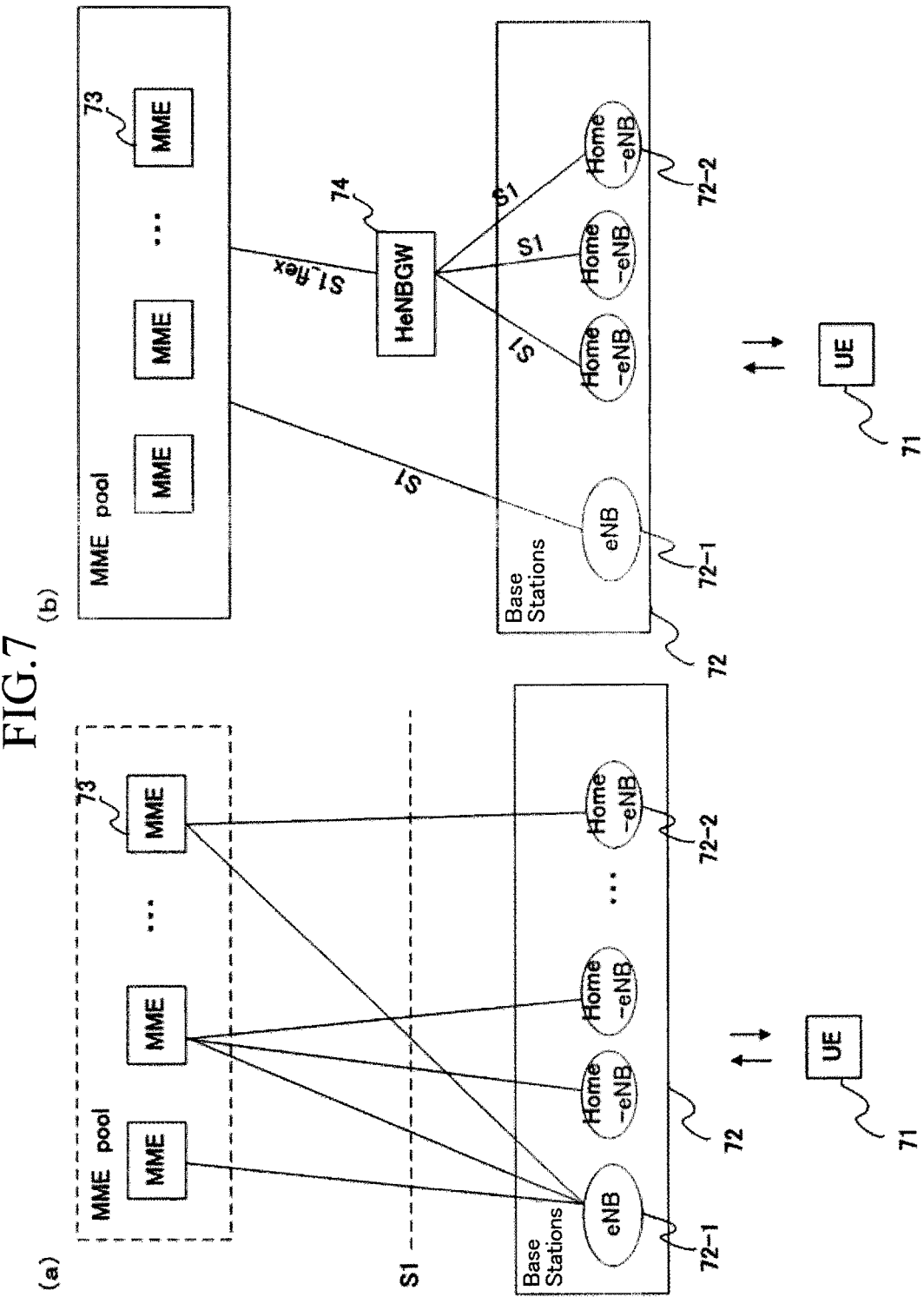
FIG. 7 is a block diagram showing the overall configuration of a mobile communication system currently under discussion of 3GPP.

FIG. 7 is a block diagram showing an overall configuration of an LTE mobile communication system, which is currently under discussion of 3GPP. Currently, 3GPP is studying an overall system configuration including closed subscriber group (CSG) cells (Home-eNodeBs (Home-eNB and HeNB) of e-UTRAN, Home-NB (HNB) of UTRAN) and non-CSG cells (eNodeB (eNB) of e-UTRAN, NodeB (NB) of UTRAN, and BSS of GERAN) and, as to e-UTRAN, is proposing a configuration as shown in FIG. 7 (Chapter 4.6.1 of Non-Patent Document 1).

FIG. 7 is now described. A user equipment (UE) 71 performs transmission/reception to/from a base station 72. Base stations 72 are classified into an eNB (non-CSG cell) 72-1 and Home-eNBs 72-2. The eNB 72-1 is connected to MMEs 73 through interfaces S1, and control information is communicated between the eNB and the MMEs. A plurality of MMES 73 may be connected to one eNB 72-1. eNBs are connected to each other through an interface X2, and control information is communicated between eNBs.

A Home-eNB 72-2 is connected to an MME 73 through an interface S1, and control information is communicated between the Home-eNB and the MME. A plurality of Home-eNBs are connected to one MME. A Home-eNB 72-2 is alternatively connected to an MME 73 through an HeN-BGW (Home-eNB GateWay) 74. The Home-eNB and the HeGW are connected to each other through an interface S1, and the HeNBGW 74 and the MME 73 are connected to each other through an interface S1. One or a plurality of Home-eNBs 72-2 are connected to one HeNBGW 74, and information is communicated therebetween through S1. The HeNBGW 74 is connected to one or a plurality of MMEs 73, and information is communicated therebetween through S1.

3GPP is further studying the following configuration. The interface X2 between Home-eNBs 72-2 is not supported. An HeNBGW 74 looks like an eNB 72-1 when viewed from MMEs 73. An HeNBGW 74 looks like an MME 73 when viewed from Home-eNBs 72-2. Regardless of whether or not a Home-eNB 72-2 is connected to an EPC through an HeNBGW 74, the interface S1 between the Home-eNB 72-2 and the EPC is the same. The mobility to the Home-eNB 72-2 or the mobility from the Home-eNB 72-2 that spans the MMEs 73 is not supported. A Home-eNB 72-2 supports only one cell.

Figure 8:
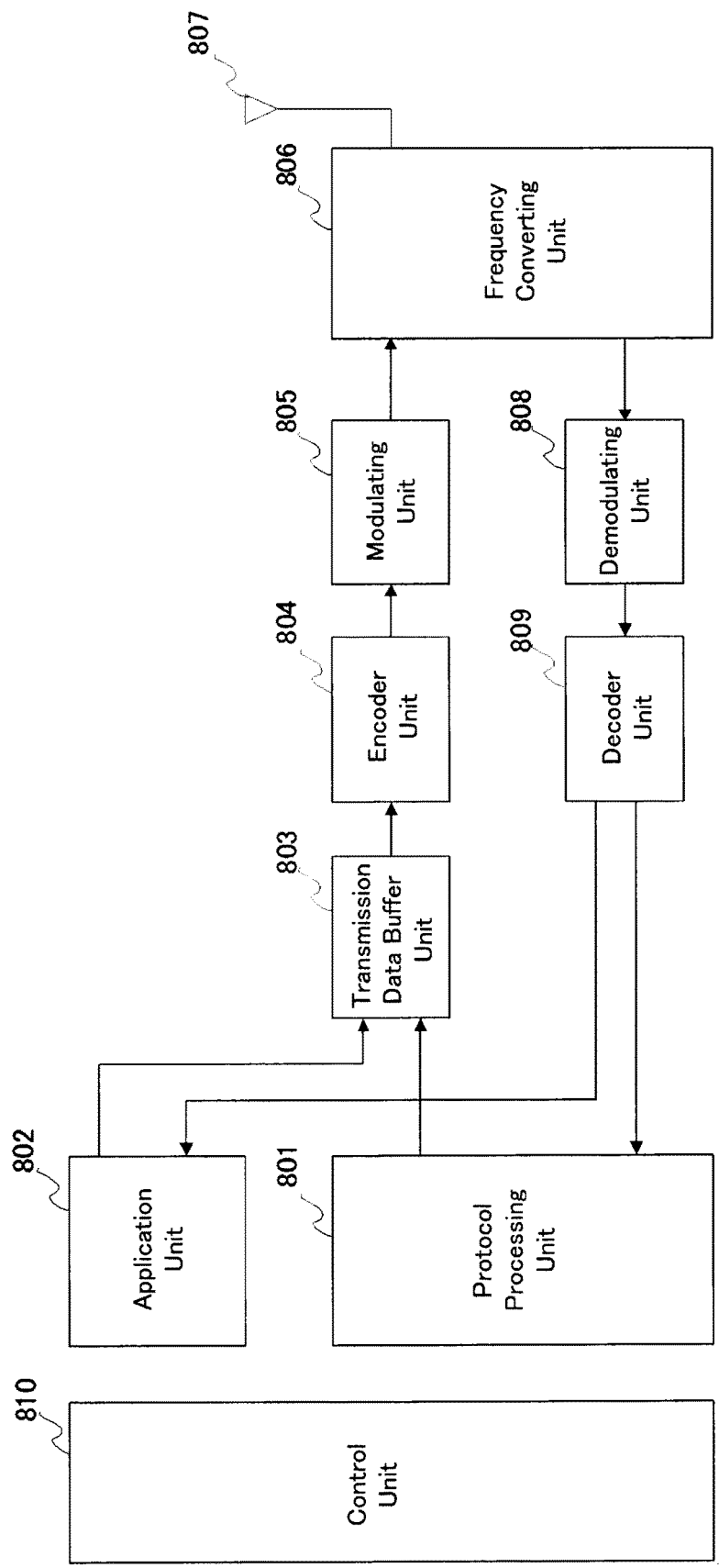
FIG. 8 is a block diagram showing the configuration of a mobile terminal 311 in accordance with the present invention.

FIG. 8 is a block diagram showing the configuration of the UE (equipment 71 of FIG. 7) in accordance with the present invention. The transmission process of the UE shown in FIG. 8 is described. First, a transmission data buffer unit 803 stores the control data from a protocol processing unit 801 and the user data from an application unit 802. The data stored in the transmission data buffer unit 803 is transmitted to an encoding unit 804 and is subjected to encoding process such as error correction. There may exist the data output from the transmission data buffer unit 803 directly to a modulating unit 805 without encoding process. The data encoded by the encoding unit 804 is modulated by the modulating unit 805. The modulated data is output to a frequency converting unit 806 after being converted into a baseband signal, and then is converted into a radio transmission frequency. After that, a transmission signal is transmitted from an antenna 807 to a base station 312. A UE 311 executes the reception process as follows. The antenna 807 receives the radio signal from the base station 312. The received signal is converted from a radio reception frequency to a baseband signal by the frequency converting unit 806 and is then demodulated by a demodulating unit 808. The demodulated data is transmitted to a decoding unit 809 and is subjected to decoding process such as error correction. Among the pieces of decoded data, the control data is transmitted to the protocol processing unit 801, while the user data is transmitted to the application unit 802. A series of processes of the UE are controlled by a control unit 810. This means that, though not shown, the control unit 810 is connected to the respective units (801 to 809).

Figure 9:
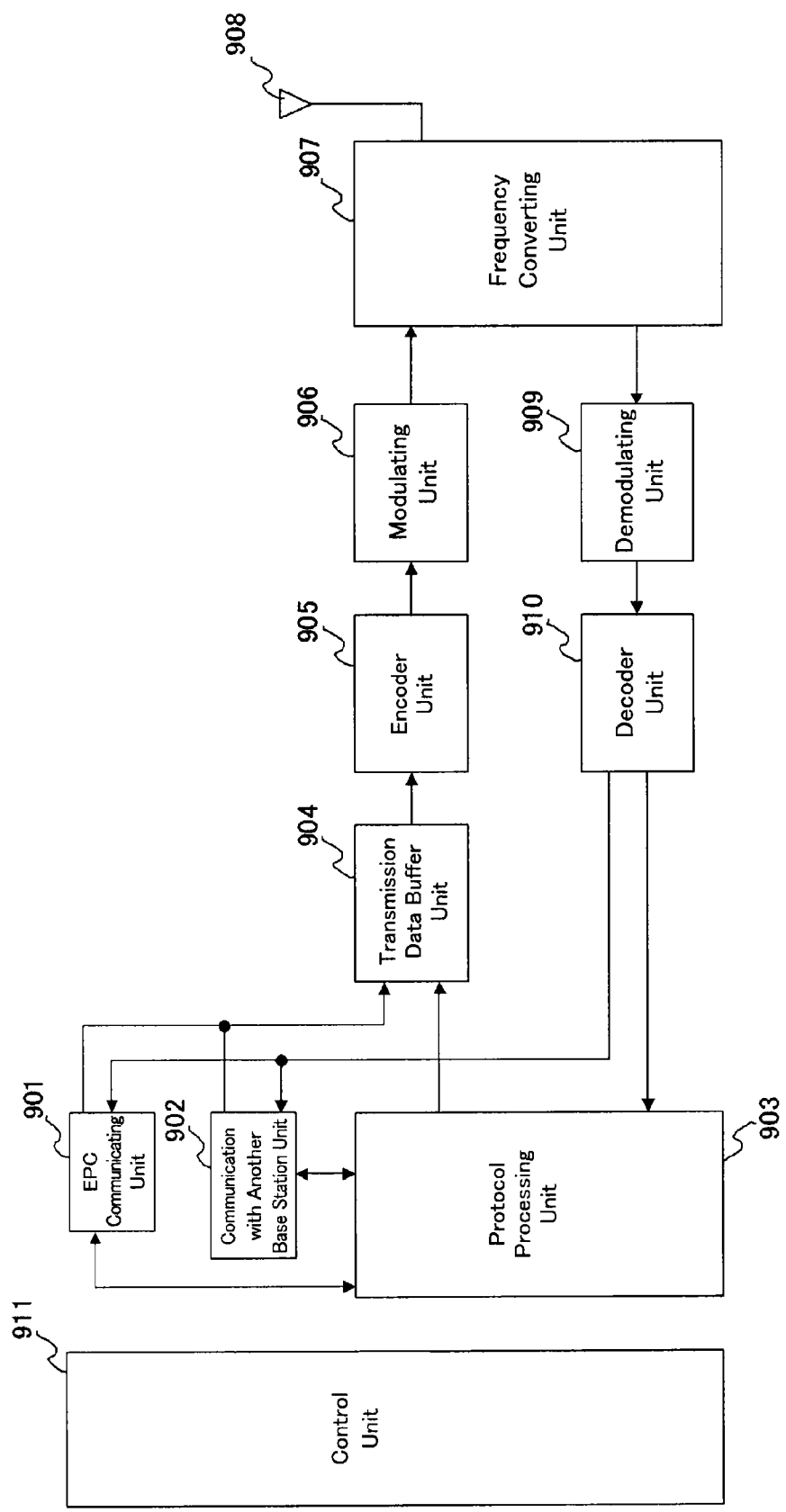
FIG. 9 is a block diagram showing the configuration of a base station 312 in accordance with the present invention.

FIG. 9 is a block diagram showing the configuration of the base station (base station 72 of FIG. 7) in accordance with the present invention. The transmission process of the base station shown in FIG. 9 is described. An EPC communication unit 901 performs data transmission/reception between the base station 72 and the EPCs (such as MME 73 and HeNBGW 74). A communication with another base station unit 902 performs data transmission/reception to/from another base station. Because the standardization is on its way to not supporting the interface X2 between Home-eNBs 72-2, it can also be considered that the communication with another base station unit 902 does not exist in each Home-eNB 72-2. The EPC communication unit 901 and the communication with another base station unit 902 respectively transmit/receive information to/from the protocol processing unit 903. The control data from the protocol processing unit 903, and the user data and control data from the EPC communication unit 901 and the communication with another base station unit 902 are stored in the transmission data buffer unit 904. The data stored in the transmission data buffer unit 904 is transmitted to an encoding unit 905 and is then subjected to encoding process such as error correction. There may exist the data output from the transmission data buffer unit 904 directly to a modulating unit 906 without encoding process. The encoded data is modulated by the modulating unit 906. The modulated data is output to a frequency converting unit 907 after being converted into a baseband signal, and is then converted into a radio transmission frequency. After that, a transmission signal is transmitted from an antenna 908 to one or a plurality of UEs 71. While, the reception process of the base station 72 is executed as follows. A radio signal from one or a plurality of UEs 311 is received by the antenna 908. The received signal is converted from a radio reception frequency into a baseband signal by the frequency converting unit 907, and is then demodulated by a demodulating unit 909. The demodulated data is transmitted to a decoding unit 910 and is then subjected to decoding process such as error correction. Among the pieces of decoded data, the control data is transmitted to the protocol processing unit 903, EPC communication unit 901, or communication with another base station unit 902, while the user data is transmitted to the EPC communication unit 901 and communication with another base station unit 902. A series of processes by the base station 72 are controlled by a control unit 911. This means that, though not shown, the control unit 911 is connected to the respective units (901 to 910).

Functions of a Home-eNB 72-2, which is currently under discussion of 3GPP, are shown below (Chapter 4.6.2 of Nonpatent reference 1). The Home-eNB 72-2 has the same function as an eNB 72-1. In addition, the Home-eNB 72-2 has a function as shown below at the time of connecting to an HeNBGW 74. The Home-eNB 72-2 has a function of discovering a suitable serving HeNBGW 74. The Home-eNB 72-2 is connected to only one HeNBGW 74. More specifically, when connected to an HeNBGW 74, the Home-eNB 72-2 does not use a Flex function in S1. When the Home-eNB 72-2 is connected to an HeNBGW 74, the Home-eNB 72-2 is not connected to another HeNBGW 74 or another MME 73 simultaneously. The TAC and PLMN ID of the Home-eNB 72-2 are supported by the HeNBGW 74. When the Home-eNB 72-2 is connected to an HeNBGW 74, a selection of an MME 73 in "UE attachment" is made by the HeNBGW 74 on behalf of the Home-eNB 72-2. Home-eNBs 72-2 may be deployed without network planning. Therefore, the Home-eNB 72-2 can be moved from one geographical area to another geographical area. Accordingly, the Home-eNB 72-2 may be moved from one geographical area to another geographical area, and accordingly, may be required to be connected to a different HeNBGW 74 depending on its location.

Figure 10:
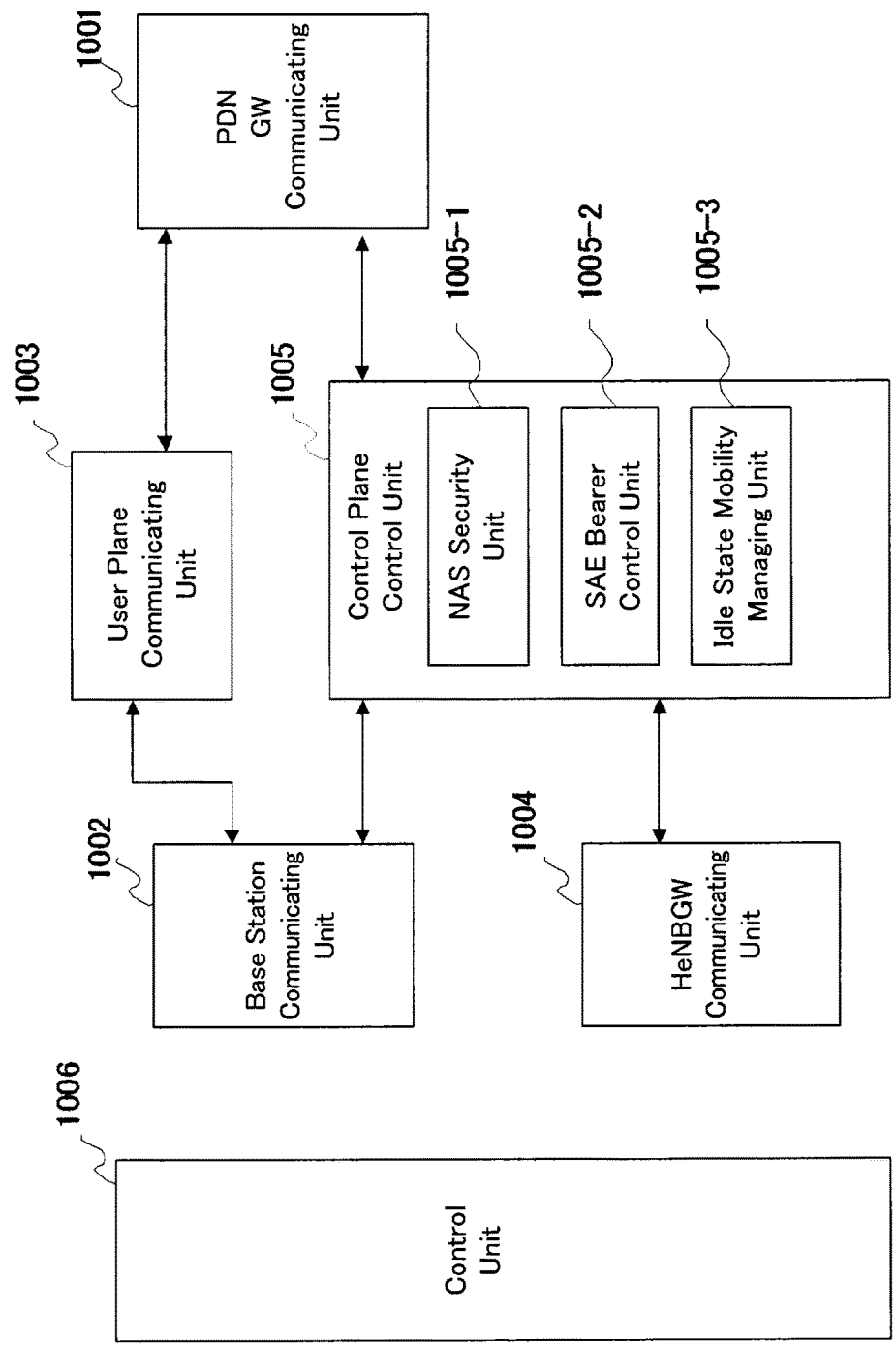
FIG. 10 is a block diagram showing the configuration of an MME in accordance with the present invention.

FIG. 10 is a block diagram showing the configuration of a mobility management entity (MME) in accordance with the present invention. A PDN GW communication unit 1001 performs data transmission/reception between an MME 73 and a PDN GW. A base station communication unit 1002 performs data transmission/reception between the MME 73 and the base station 72 through the S1 interface. In the case where the data received from the PDN GW is user data, the user data is transmitted from the PDN GW communication unit 1001 to the base station communication unit 1002 through a user plane processing unit 1003 and is then transmitted to one or a plurality of base stations 72. In the case where the data received from the base station 72 is user data, the user data is transmitted from the base station communication unit 1002 to the PDN GW communication unit 1001 through the user plane processing unit 1003 and is then transmitted to the PDN GW.

In the case where the data received from the PDN GW is control data, the control data is transmitted from the PDN GW communication unit 1001 to a control plane control unit 1005. In the case where the data received from the base station 72 is control data, the control data is transmitted from the base station communication unit 1002 to the control plane control unit 1005. A HeNBGW communication unit 1004 is provided in the case where the HeNBGW 74 is provided, which performs data transmission/reception by the interface (IF) between the MME 73 and the HeNBGW 74 according to an information type. The control data received from the HeNBGW communication unit 1004 is transmitted from the HeNBGW communication unit 1004 to the control plane control unit 1005. The processing results of the control plane control unit 1005 are transmitted to the PDN GW through the PDN GW communication unit 1001. The processing results of the control plane control unit 1005 are transmitted to one or a plurality of base stations 72 by the S1 interface through the base station communication unit 1002, or are transmitted to one or a plurality of HeNBGWs 74 through the HeNBGW communicating unit 1004.

The control plane control unit 1005 includes a NAS security unit 1005-1, an SAE bearer control unit 1005-2 and an idle state mobility managing unit 1005-3, and performs overall process for the control plane. The NAS security unit 1005-1 provides, for example, security of a non-access stratum (NAS) message. For example, the SAE bearer control unit 1005-2 manages a system architecture evolution (SAE) bearer. For example, the idle state mobility managing unit 1005-3 performs mobility management of an idle state (LTE-IDLE state, which is merely referred to as idle as well), generation and control of paging signaling in an idle state, addition, deletion, update and search of a tracking area (TA) of one or a plurality of UEs 71 being served thereby, and tracking area (TA) list management. The MME begins a paging protocol by transmitting a paging message to the cell belonging to a tracking area (TA) in which the UE is registered. The idle state mobility managing unit 1005-3 may manage the CSG of the Home-eNBs 72-2 to be connected to the MME, CSG-IDs and a whitelist. In the CSG-ID management, the relationship between a UE corresponding to the CSG-ID and the CSG cell is managed (added, deleted, updated or searched). For example, it may be the relationship between one or a plurality of UEs whose user access registration has been performed with a CSG-ID and the CSG cells belonging to this CSG-ID. In the whitelist management, the relationship between the UE and the CSG-ID is managed (added, deleted, updated or searched). For example, one or a plurality of CSG-IDs with which user registration has been performed by a UE may be stored in the whitelist. These management operations concerning the CSG can be performed by another part in the MME 73. A series of processes by an MME 313 are controlled by a control unit 1006. This means that, though not shown, the control unit 1006 is connected to the respective units (1001 to 1005).

The functions of the MME 73 which are currently under discussion of 3GPP are shown below (Chapter 4.6.2 of Nonpatent reference 1). The MME 73 performs access control of one or a plurality of mobile terminals which are members of CSG (Closed Subscriber Groups). The execution of paging optimisation is accepted as an option.

Figure 11:
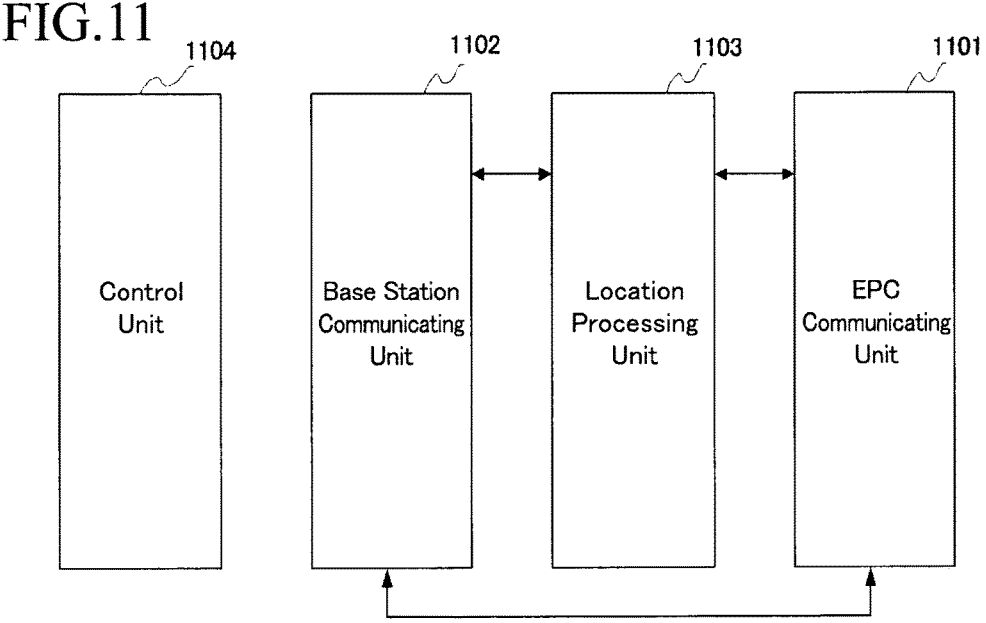
FIG. 11 is a block diagram showing the configuration of an HeNBGW in accordance with the present invention.

FIG. 11 is a block diagram showing the configuration of the HeNBGW in accordance with the present invention. An EPC communication unit 1101 performs data transmission/reception between the HeNBGW 74 and the MME 73 by the S1 interface. A base station communication unit 1102 performs data transmission/reception between the HeNBGW 74 and the Home-eNB 72-2 by the S1 interface. A location processing unit 1103 performs the process of transmitting, to a plurality of Home-eNBs, the registration information or the like among the data transmitted from the MME 73 through the EPC communication unit 1101. The data processed by the location processing unit 1103 is transmitted to the base station communication unit 1102 and is transmitted to one or a plurality of Home-eNBs 72-2 through the S1 interface. The data only caused to pass through (to be transparent) without requiring the process by the location processing unit 1103 is passed from the EPC communication unit 1101 to the base station communication unit 1102, and is transmitted to one or a plurality of Home-eNBs 72-2 through the S1 interface. A series of processes by the HeNBGW 74 is controlled by a control unit 1104. This means that, though not shown, the control unit 1104 is connected to the respective units (1101 to 1103).

The functions of the HeNBGW 74 which are currently under discussion of 3GPP are shown below (Chapter 4.6.2 of Nonpatent reference 1). The HeNBGW 74 relays S1 applications associated with the UE 71. The HeNBGW 74 terminates S1 application procedures toward the Home-eNB 72-2 and toward the MME 73 that are not associated with the UE 71. When the HeNBGW 74 is deployed, a procedure unrelated to the mobile terminal 71 is communicated between the Home-eNB 72-2 and the HeNBGW 74 and is also communicated between the HeNBGW 74 and the MME 73. The interface X2 is not established between the HeNBGW 74 and another node. The execution of paging optimisation is accepted as an option.

Figure 12:
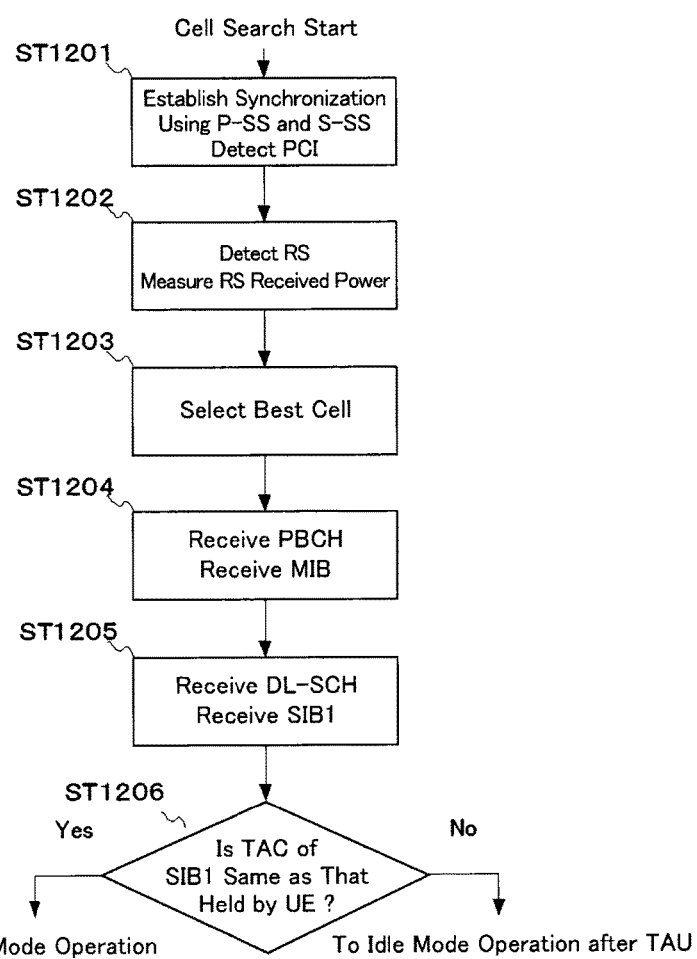
FIG. 12 is a flow chart showing an outline of a cell search made by a mobile terminal (UE) in the LTE communication system.

Next, an example of a typical cell search method in a mobile communication system is described. FIG. 12 is a flowchart showing an outline from cell search to idle state operation performed by a user equipment (UE) in the LTE communication system. When the cell search is started by the UE, in Step ST1201, the slot timing and frame timing are synchronized by a primary synchronization signal (P-SS) and a secondary synchronization signal (S-SS) transmitted from a nearby base station. Synchronization codes, which correspond to physical cell identities (PCIs) assigned per cell one by one, are assigned to the synchronization signals (SS) including the P-SS and S-SS. The number of PCIs is currently studied in 504 ways, and these 504 ways are used for synchronization, and the PCIs of the synchronized cells are detected (identified). Next, in Step ST1202, a reference signal RS of the synchronized cells, which is transmitted from the base station per cell, is detected and the received power is measured. The code corresponding to the PCI one by one is used for the reference signal RS, and separation from other cell is enabled by correlation using the code. The code for RS of the cell is derived from the PCI identified in ST1201, which makes it possible to detect the RS and measure the RS received power. Next, in ST1203, the cell having the best RS reception quality (for example, cell having the highest RS received power; best cell) is selected from one or more cells that have been detected up to ST1202. In ST1204, next, the PBCH of the best cell is received, and the BCCH that is the broadcast information is obtained. A master information block (MIB) containing the cell configuration information is mapped to the BCCH on the PBCH. Examples of MIB information include the down link (DL) system bandwidth (also referred to as a transmission bandwidth configuration: dl-bandwidth), the number of transmission antennas and system frame number (SFN).

In ST1205, next, the DL-SCH of the cell is received based on the cell configuration information of the MIB, to thereby obtain a system information block (SIB) 1 of the broadcast information BCCH. The SIB1 contains the information regarding access to the cell, information regarding cell selection and scheduling information of other SIB (SIBk; k is an integer equal to or larger than 2). A TAC (Tracking Area Code) is also included in the SIB1. In ST1206, next, the UE compares the TAC received in ST1205 with the TAC that has been already possessed by the UE. In a case where they are identical to each other as a result of comparison, the UE enters an idle state operation in the cell. In a case where they are different from each other as a result of comparison, the UE requires a core network (EPC) (including MME and the like) to change a TA through the cell for performing tracking area update (TAU). The core network updates the TA based on an identification number (such as a UE-ID) of the UE transmitted from the UE together with a TAU request signal. The core network updates the TA, and then transmits the TAU accept signal to the UE. The UE rewrites (updates) the TAC (or TAC list) of the UE. After that, the UE enters the idle state operation in the cell.

In an LTE or UMTS (Universal Mobile Telecommunication System), the introduction of a CSG (Closed Subscriber Group) cell has been studied. As mentioned above, a CSG cell is accessible only by one or more mobile terminals which are registered with the CSG cell. The CSG cell and the one or more registered mobile terminals construct one CSG. A specific identification number called a CSG-ID is given to each CSG which is constructed in this way. There can exist a plurality of CSG cells in each CSG. When a mobile terminal is registered with one CSG cell, the mobile terminal can access any other CSG cell in the CSG to which the CSG cell belongs. Furthermore, the Home-eNB in the LTE or the Home-NB in the UMTS is used as the CSG cell in some cases. Each mobile terminal registered with a CSG cell has a whitelist. Concretely, the whitelist is stored in an SIM/USIM of each mobile terminal. CSG information about the CSG cell with which each mobile terminal is registered is written in the whitelist. Concretely, a CSG-ID, a TAI (Tracking Area Identity), a TAC, etc. can be considered as the CSG information. Either one of the CSG-ID and the TAC is enough as long as the CSG-ID is brought into correspondence with the TAC. As an alternative, only a GCI (Global Cell Identity) is enough as long as the CSG-ID, the TAC, and the GCI are brought into correspondence with one another. As can be seen from the above explanation, a mobile terminal which does not have a whitelist (in the present invention, includes a mobile terminal whose whitelist is empty) cannot access any CSG cell, but can access only a non-CSG cell. In contrast, a mobile terminal having a whitelist can access not only a CSG cell having a CSG-ID with which the mobile terminal is registered, but also a non-CSG cell.

A split of all the PCIs (Physical Cell Identities) into PCIs for CSG cells and PCIs for non-CSG cells (referred to as a PCI split) has been debated in 3GPP (nonpatent reference 5). It has been further debated that the PCI information about PCI split is broadcast, in system information, from a base station to mobile terminals being served by the base station. A fundamental operation of a mobile terminal using the PCI split is disclosed hereafter. A mobile terminal which does not have the PCI information about PCI split needs to make a cell search by using all the PCIs (e.g., by using all the 504 codes). In contrast, a mobile terminal which has the PCI information about PCI split can make a cell search by using this PCI information about PCI split.

In 3GPP, a temporary CSG member is accepted. A temporary CSG member is also referred to as a temporary member or a visitor. For a temporary member, a time period (temporary time period) during which the temporary member is accepted as a CSG member can be set up (Nonpatent reference 6).

In 3GPP, there are two modes in the method of selecting or reselecting a CSG cell by a UE. The first one of the modes is an automatic mode. The features of the automatic mode are shown below. A mobile terminal makes a selection or reselection by using an allowed CSG ID list stored therein. After completing a selection of a PLMN, the mobile terminal camps on one cell in the PLMN which the mobile terminal has selected only when the cell is a non-CSG cell or a CSG cell with a CSG ID existing in the allowed CSG ID list. When the allowed CSG ID list of the mobile terminal is empty, the mobile terminal stops an autonomous search function of searching for a CSG cell (Chapter 5.2.4.8.1 of Nonpatent reference 3).

The second one is a manual mode. The features of the manual mode are shown below. The mobile terminal presents a list of CSGs available in the PLMN which the mobile terminal is currently selecting to the user. The list of CSGs which the mobile terminal provides for the user is not limited to CSGs included in the allowed CSG ID list stored in the mobile terminal. After the user selects a CSG on the basis of this list of CSGs, the mobile terminal camps on the cell with the CSG ID of the CSG which the user has selected, and tries to register itself with the cell (Chapter 5.2.4.8.1 of Nonpatent reference 3).

3GPP has decided a description of a method of updating the allowed CSG ID list stored in the mobile terminal, as shown below.

When receiving a reject message from the network side as a result of having executed "E-UTRAN initial attach" which is a method of establishing an EPS (Evolved Packet system) bearer, the mobile terminal deletes the CSG ID from the allowed CSG ID list stored therein. In contrast, when receiving an accept or attach accept message from the network side as a result of having executing the "E-UTRAN initial attach", the mobile terminal adds the CSG ID to the allowed CSG ID list stored therein (Chapter 5.3.2.1 of Nonpatent reference 7).

When receiving a reject message from the network side as a result of having executed "UE triggered service Request" which is a method of establishing a user plane (u-plane) radio bearer, the mobile terminal deletes the CSG ID which the cell which has started the service request has from the allowed CSG ID list stored therein (Chapter 5.3.4.1 of Nonpatent reference 7).

When receiving a reject message from the network side as a result of having executed "E-UTRAN Tracking Area update" which is a method of updating the tracking area, the mobile terminal deletes the CSG ID from the allowed CSG ID list stored therein. In a case in which the mobile terminal executes the manual mode as the method of making a selection or reselection of a CSG cell, the mobile terminal adds the CSG ID to the allowed CSG ID list stored therein when receiving a TAU accept message from the network side (Chapter 5.3.3.2 of Nonpatent reference 7).

3GPP has decided a description of a paging method as shown below.

An HeNBGW and an MME have paging optimisation as their functions. The paging optimisation is a function which is accepted as an option when the allowed CSG ID list (also referred to as "CSG Subscription Data" from here on) of a called mobile terminal, which is managed by the network side, is included in the paging message. Further, the paging optimisation function is used to filter paging messages based on the tracking area list, user's CSG subscription data and CSG access mode in order to avoid paging at CSG cells where the UE is not allowed to access. Further, it has been decided that expired CSG subscriptions are handled as valid CSG subscriptions for the paging optimisation (Chapters 4.3.13 and 5.3.4.3 of Nonpatent reference 7). In contrast, no decision has been made on a concrete operation of the paging optimisation.

An MME or SGSN (Serving General packet radio service Support Node) performs the management of a paging procedure as a function thereof. When an MME or SGSN does not receive any response from the mobile terminal to a paging request message, the MME or SGSN repeats the paging. When performing the paging repeatedly, the MME or SGSN does not carry out the paging optimisation.

A method of managing the CSG list is explained below.

The mobile terminal manages (stores) the allowed CSG ID list. The mobile terminal manages the CSG ID of each CSG of which this mobile terminal is a member and the PLMN (Public Land Mobile Network) as the allowed CSG ID list (Chapter 5.7 of Nonpatent reference 7). Concrete examples of a conceptual diagram of the allowed CSG ID list stored in the mobile terminal are shown in FIGS. 32(*a*)-(1) and 32(*a*)-(2). The allowed CSG ID list stored in the mobile terminal A in a case in which the mobile terminal A has not been registered with any CSG is shown in FIG. 32(*a*)-(1). No managed CSG ID exists in the allowed CSG ID list. That is, the allowed CSG ID list is empty. FIG. 32(*a*)-(2) shows the allowed CSG ID list stored in the mobile terminal when the mobile terminal A has been registered with a CSG group with a CSG ID of "1". The CSG ID of "1" is managed in the allowed CSG ID list.

The MME manages (stores) the allowed CSG ID list for each mobile terminal. The MME manages CSG IDs which are registered for each PLMN for each mobile terminal. In the case of a temporary subscription, the MME manages a temporary time period as well. A CSG subscription for which no temporary time period is managed is an indefinite subscription (Chapter 5.7 of Nonpatent reference 7). Concrete examples of a conceptual diagram of the allowed CSG ID list stored in the MME are shown in FIGS. 32(*b*)-(1), 32(*b*)-(2), and 32(*b*)-(3). FIG. 32(*b*)-(1) shows the allowed CSG ID list stored in the MME in a case in which the mobile terminal A has not been registered with any CSG. No managed CSG ID exists in the allowed CSG ID list of the mobile terminal A. That is, the allowed CSG ID list is empty. FIG. 32(*b*)-(2) shows the allowed CSG ID list stored in the MME in a case in which the mobile terminal A has temporarily subscribed to a CSG group with a CSG ID of "1" with a temporary time period for "A". The CSG ID of "1" and the temporary time period for "A" are managed in the allowed CSG ID list of the mobile terminal A. FIG. 32(*b*)-(3) shows the allowed CSG ID list stored in the MME in a case in which the temporary time period associated with the temporary subscription of the mobile terminal A to the CSG group with the CSG ID of "1" has expired. No managed CSG ID exists in the allowed CSG ID list of the mobile terminal A. That is, the allowed CSG ID list is empty. On the other hand, the subscription to the CSG ID of "1" of the mobile terminal A is managed as an expired CSG subscription.

The HSS manages (stores) the allowed CSG ID list for each mobile terminal, like the MME (Chapter 5.7 of Nonpatent reference 7). Because the HSS operates in the same way that the MME does, the detailed explanation of the operation of the HSS is omitted hereafter.

As the number of mobile terminals which have temporarily subscribed to a CSG cell as a CSG member increases, the number of mobile terminals whose time period during which temporary members are accepted as CSG members have expired increases as well. Therefore, the number of mobile terminals included in the expired CSG subscriptions which the network side manages increases. As a concrete case in which there are a large number of mobile terminals which have temporarily subscribed to a CSG cell as a CSG member, there can be a case in which customers visiting a restaurant have temporarily subscribed to the restaurant's CSG cell.

When there are a larger number of mobile terminals which have temporarily subscribed to a CSG cell in this way, the following situation occurs and the following problem 1 arises. The number of mobile terminals included in the expired CSG subscriptions which the network side manages increases. Therefore, there arises a problem that the processing load imposed on the management of the expired CSG subscriptions increases.

Further, because the expired CSG subscriptions are handled as valid CSG subscriptions for the paging optimisation, there frequently occurs a case in which the MME or the like cannot carry out the paging optimisation. As a result, the opportunity that useless paging occurs increases. A problem is therefore that effective use of radio resources cannot be made.

A method of, when the time period for a temporary subscription expires, deleting the CSG ID associated with this temporary subscription from the allowed CSG ID list stored in the mobile terminal is examined below. In accordance with a currently-used method of updating the allowed CSG ID list stored in the mobile terminal, the mobile terminal needs to receive a reject message from the cell with this CSG ID for which the time period for the temporary subscription has expired in order to delete the CSG ID. As a result, there is a possibility that the inconsistency between the allowed CSG ID list (CSG Subscription Data) managed by the network side and the allowed CSG ID list stored in the mobile terminal remains.

A concrete example in which the inconsistency between the allowed CSG ID lists remains is explained below. A customer visiting a restaurant makes a temporary subscription to the restaurant's CSG cell. There can be a case in which a sufficiently long temporary time period can be provided for the customer's mobile terminal when making a temporary subscription so that the temporary subscription continues during the customer's presence at the restaurant. The mobile terminal is not rejected by the restaurant's CSG cell because the sufficiently long temporary time period is provided for the mobile terminal.

When the inconsistency between the allowed CSG ID list managed by the network side and the allowed CSG ID list stored in the mobile terminal remains in this way, the following situation occurs and the following problem 2 arises. Because even a CSG ID which is included in the allowed CSG ID list managed by the network side no longer by reason of the expiration of the temporary time period is not deleted from the allowed CSG ID list stored in the mobile terminal, there occurs a situation in which the mobile terminal selects a cell with this CSG ID when making a CSG cell selection or reselection in the automatic mode, or camps on the cell. More specifically, there occurs a situation in which the mobile terminal selects a cell from which the mobile terminal cannot receive any service after that, or camps on the cell. A problem is therefore that needless power consumption occurs in the mobile terminal.

Further, there occurs a situation in which the allowed CSG ID list stored in the mobile terminal does not become empty (a situation in which the CSG ID associated with the temporary subscription is included) even when neither the CSG ID of a CSG from which the mobile terminal can receive a service nor the CSG ID of a CSG to which the mobile terminal has subscribed exists in the allowed CSG ID list as a result of deleting the CSG ID associated with the temporary subscription from the allowed CSG ID list managed by the network side by reason of, for example, the expiration of the temporary time period. As a result, there occurs a situation in which the mobile terminal cannot stop the autonomous search function of searching for a CSG cell. A problem is therefore that needless power consumption occurs in the mobile terminal.

Figure 13:
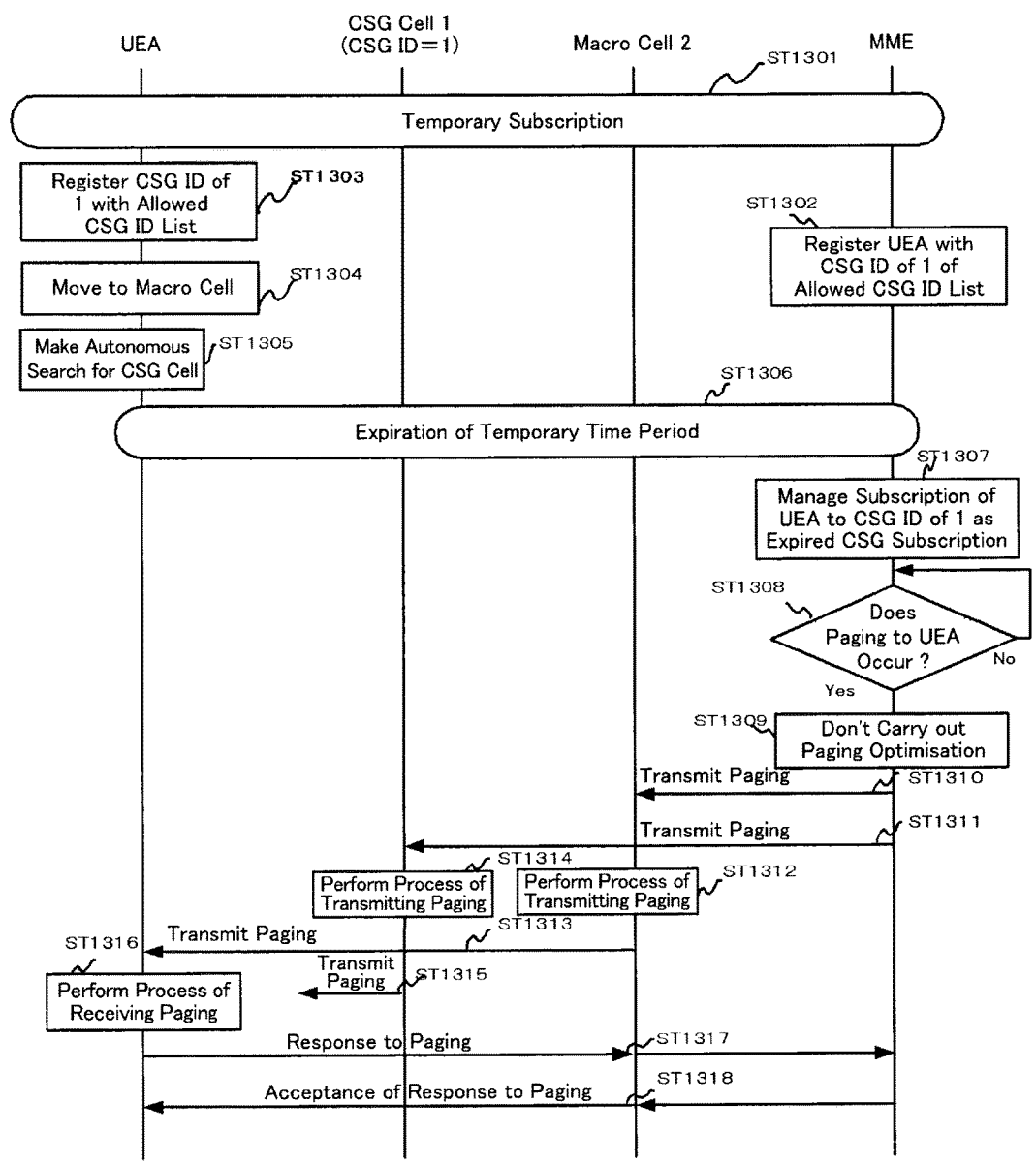
FIG. 13 is a sequence diagram of the operation of a mobile communication system for explaining a problem to be solved by Embodiment 1.

A concrete example of an operation which causes the above-mentioned problems 1 and 2 is explained below with reference to FIG. 13. A mobile terminal A (UEA), in step ST1301, is caused to temporarily subscribe to (be temporarily registered with) a CSG with a CSG ID of "1" with a temporary time period A. In this case, the CSG is an access group which is comprised of one or more mobile terminals and one or more cells (one or more base stations). In step ST1301, it is assumed that the mobile terminal A (UEA) is registered as a member of the CSG with the CSG ID of "1". Accordingly, the mobile terminal A is granted permission to access a cell (base station) which is a member of the same CSG. Further, because a temporary subscription which is of a type which permits temporary access to the cell (base station) is offered for the mobile terminal A, this mobile terminal is granted permission to access to the cell (base station) during the temporary time period A which is a predetermined access permit period.

The network side, more concretely, an MME, in step ST1302, manages the allowed CSG ID list including the CSG ID of "1" of the CSG to which the mobile terminal A has temporarily subscribed as a member of the CSG (FIG. 32(*b*)-(2)). In this case, the MME functions as an access management device which manages access from a CSG member. The mobile terminal A, in step ST1303, manages the allowed CSG ID list in which the CSG ID of "1" is contained. More specifically, the mobile terminal A is registered with the CSG with the CSG ID of "1" as a member, and the allowed CSG ID list in which the CSG ID of "1" is contained is managed by an access control unit disposed in the mobile terminal A (FIG. 32(*a*)-(2)).

The mobile terminal A in an idle state, in step ST1304, moves to (cell-reselects) a macro cell 2 belonging to the same tracking area as that of the CSG cell 1 with the CSG ID of "1". As mentioned above, there can be a case in which when a customer visiting a restaurant makes a temporary subscription to the restaurant's CSG cell, the customer's mobile terminal is granted a sufficiently long temporary time period so that the customer continues to be a temporary member during the customer's presence at the restaurant. This means that there occurs a situation in which the mobile terminal may move to a cell other than the cells belonging to this CSG before the expiration of the temporary time period.

The mobile terminal A, in step ST1305, makes an autonomous search for a CSG cell because the allowed CSG ID list stored in the mobile terminal is not empty, more concretely, the CSG ID of "1" is included in the allowed CSG ID list. The temporary time period for the mobile terminal A, which is associated with the CSG ID of "1", expires in step ST1306. The network side, more concretely, the MME, in step ST1307, manages the subscription of the mobile terminal A to the CSG ID of "1" as an expired CSG subscription (FIG. 32(b)-(3)).

The MME, in step ST1308, determines whether a paging destined for the mobile terminal A occurs. When a paging destined for the mobile terminal A occurs, the MME shifts to step ST1309, whereas when no paging destined for the mobile terminal A occurs, the MME repeats the determination of step ST1308.

The network side, more concretely, the MME, in step ST1309, does not perform the paging optimisation on the paging destined for the mobile terminal A. This is because it has been decided according to the current standards that expired CSG subscriptions are handled as valid CSG subscriptions for the paging optimisation. The network side, more concretely, the MME transmits the paging to a base station (cell) in the tracking area to which the mobile terminal A belongs. With reference to FIG. 13, the CSG cell 1 with the CSG ID of "1" and the macro cell 2 are included in the tracking area to which the mobile terminal A belongs, as an example.

The network side, more concretely, the MME, in step ST1310, transmits the paging destined for the mobile terminal A to the macro cell 2. The network side, more concretely, the MME, in step ST1311, transmits the paging destined for the mobile terminal A to the CSG cell 1.

The macro cell 2, in step ST1312, carries out a process of transmitting the paging destined for the mobile terminal A to the mobile terminal. As a concrete example of the process, there can be a scheduling for mapping a paging message to a physical downlink shared channel (PDSCH). The macro cell 2, in step ST1313, transmits the paging to the mobile terminal A.

The CSG cell 1, in step ST1314, carries out the process of transmitting the paging destined for the mobile terminal A to the mobile terminal. As a concrete example of the process, there can be a scheduling for mapping a paging message to the physical downlink shared channel (PDSCH). The CSG cell 1, in step ST1315, transmits the paging to the mobile terminal A.

As shown in steps ST1311, ST1314 and ST1315, the CSG cell 1 carries out a needless paging transmitting process of transmitting the paging to the mobile terminal A for which the CSG cell does not have to support any service originally because the time period for the temporary subscription has expired. As a result, the above-mentioned problem 1 that the opportunity that a needless paging occurs increases, and effective use of radio resources cannot be made arises.

The mobile terminal A, in step ST1316, receives the paging from the macro cell 2, and carries out a paging receiving process. The mobile terminal A, in step ST1317, transmits a response to paging to the MME through the macro cell 2. The MME, in step ST1318, transmits a message about acceptance of the response to paging to the mobile terminal A through the macro cell 2.

Because the mobile terminal A does not receive a reject message from the CSG cell 1 with the CSG ID of "1" for which the time period for the temporary subscription has expired in this way, the mobile terminal A does not delete the CSG ID of "1" from the allowed CSG ID list stored therein. That is, the CSG ID of "1" remains in the allowed CSG ID list stored in the mobile terminal (FIG. 32(a)-(2)). Therefore, the mobile terminal A continues searching for a CSG cell with the CSG ID of "1". Further, because the allowed CSG ID list stored in the mobile terminal does not become empty even when the CSG ID of a CSG from which the mobile terminal can receive the service does not exist, the mobile terminal cannot stop the autonomous search function of searching for a CSG cell (continues step ST1305). The above-mentioned problem 2 that needless power consumption occurs in the mobile terminal occurs in this way.

Next, a method of, when making a CSG subscription or a temporary subscription, adding a CSG ID associated with this subscription to the allowed CSG ID list stored in the mobile terminal is examined below. In accordance with the currently-used method of updating the allowed CSG ID list stored in the mobile terminal, in order to add the above-mentioned CSG ID to the allowed CSG ID list, the mobile terminal needs to receive an accept message from a cell having a registered CSG ID. Accordingly, there is a possibility that the inconsistency between the allowed CSG ID list (CSG Subscription Data) managed by the network side and the allowed CSG ID list stored in the mobile terminal remains.

A concrete example in which the inconsistency between the allowed CSG ID list managed by the network side and the allowed CSG ID list stored in the mobile terminal remains is explained below. A customer (mobile terminal A) visiting a restaurant makes a "prior" temporary subscription to the restaurant's CSG cell (with a CSG ID of "1"). The allowed CSG ID list managed by the network is as shown in FIG. 32(b)-(2). Because the subscription is a "prior" one, the mobile terminal is not located while being served by the above-mentioned CSG cell. Therefore, the mobile terminal is not accepted by the restaurant's CSG cell. As a result, the CSG ID of "1" is not added to the allowed CSG ID list stored in the mobile terminal (FIG. 32(a)-(1)). Thus, an inconsistency occurs between the allowed CSG ID list managed by the network and the allowed CSG ID list stored in the mobile terminal. In addition, in accordance with the currently-used method, in the automatic mode in which the mobile terminal selects or reselects a CSG cell, the mobile terminal camps on a cell only when this cell is a non-CSG cell or a CSG cell with a CSG ID which exists in the allowed CSG ID list thereof. In order to camp on a CSG cell with a CSG ID which does not exist in the allowed CSG ID list stored in the mobile terminal, the mobile terminal needs to operate in the manual mode to select a CSG cell with a newly-registered CSG ID.

The following problem 3 arises because of this currently-used CSG subscription method. There arises a problem that even if the mobile terminal makes a "prior" subscription, the mobile terminal cannot carry out a reselection on the above-mentioned CSG cell in the automatic mode. In other words, a problem is that because the mobile terminal cannot receive any service from a cell with the CSG ID to which the mobile terminal has made the prior subscription unless the mobile terminal makes a reselection in the manual mode while being served by the cell with the CSG ID to which the mobile terminal has made the prior subscription, this process is user-unfriendly. Further, there occurs a situation in which because the mobile terminal has made the prior subscription to the CSG ID, but the CSG ID is not included in the allowed CSG ID list stored in the mobile terminal even though the cell is essentially the best one for this mobile terminal, the mobile terminal excludes the cell from the target in the automatic mode, and hence the mobile terminal does not select the cell as a destination for camping on or a destination for handover when the mobile terminal is making a phone call. Because the mobile terminal selects another cell which is not the best one, the transmission power increases unnecessarily in both the mobile terminal and the base station. As a result, there causes a problem that the interference increases.

The problem 1 to be solved by Embodiment 1 is explained again. In accordance with the currently-used method, when the time period for a temporary subscription expires in the mobile terminal, the mobile terminal's subscription to the CSG ID to which the mobile terminal has made the temporary subscription is handled as an expired CSG subscription. Further, expired CSG subscriptions are handled as valid CSG subscriptions for the paging optimisation. As a result, because even if the mobile terminal in which the time period for the temporary subscription has expired continues camping on a cell with the CSG ID, the paging optimisation is not carried out on a paging destined for the mobile terminal, the paging destined for the mobile terminal is transmitted from the cell. Thus, in accordance with the currently-used method, the mobile communication system is constructed in such a way that the mobile terminal in which the time period for a temporary subscription has expired does not miss the paging.

However, this results in a harmful effect, i.e. the above-mentioned problem 1 that as the number of mobile terminals which temporarily subscribe a CSG increases, the number of temporary subscriptions which are managed as expired CSG subscriptions increases, and this results in an increase in the processing load imposed on the network side due to the management of expired CSG subscriptions, and needless use of radio resources due to needless paging messages.

A solution provided by Embodiment 1 is shown below. The management of a temporary subscription as an expired CSG subscription which is performed by the network side is ended when a given condition is satisfied. As an alternative, the mobile terminal in which the temporary time period has expired is handled, as a mobile terminal which does not subscribe to the CSG, when a given condition is satisfied. As an alternative, the subscription for which the temporary time period has expired is not handled, as a valid CSG subscription, for the paging optimisation when a given condition is satisfied. As an alternative, an MME or SGSN can carry out the paging optimisation on a paging destined for the mobile terminal in which the temporary time period has expired when a given condition is satisfied. As an alternative, the mobile terminal in which the temporary time period has expired is excluded from destinations to which a calling (paging) message is transmitted through a base station included in the same access group when a given condition is satisfied. As an alternative, in order to prevent the mobile terminal in which the temporary time period has expired from making a call in a CSG cell to which the mobile terminal is not allowed to access, the mobile communication system makes it possible to filter the paging message according to the tracking area list, the user's CSG subscription data, and the CSG access mode when a given condition is satisfied. As an alternative, the mobile communication system makes it possible to exclude a CSG cell which belongs to the CSG to which the mobile terminal has made the temporary subscription from destinations to which a calling message destined for the mobile terminal in which the temporary time period has expired is transmitted when a given condition is satisfied even if the CSG cell is located outside the tracking area to which the mobile terminal belongs.

A concrete example of the given condition is making a notification that the network side has rejected an access request which the mobile terminal in which the time period for a temporary subscription has expired has made through a cell with the CSG ID to which the mobile terminal has made the temporary subscription. As a result, when the above-mentioned CSG ID is deleted from the allowed CSG ID list stored in the mobile terminal, the mobile communication system can end the management of the temporary subscription as an expired CSG subscription managed by the network side while bringing the CSG ID into correspondence with the mobile terminal, and can be constructed in such a way as to provide consistency between the mobile terminal and the network side.

Three concrete examples of the notification showing that the network side has rejected an access request which the mobile terminal has made are disclosed below. (1) A reject message which the network side transmits as a result of "E-UTRAN initial attach", which is a method of establishing a EPS (Evolved Packet system) bearer, the E-UTRAN initial attach being executed by the mobile terminal. (2) A reject message which the network side transmits as a result of "UE triggered service Request", which is a method of setting up a user plane (u-plane) radio bearer, the UE triggered service Request being executed by the mobile terminal. (3) A reject message which the network side transmits as a result of "E-UTRAN Tracking Area update", which is a method of updating the tracking area, the E-UTRAN Tracking Area update being executed by the mobile terminal.

In a concrete example of a method of ending the management, information for identifying the mobile terminal which has made the temporary subscription, and information for identifying the CSG to which the mobile terminal has made the temporary subscription are deleted from the expired CSG subscriptions. As a concrete example of the information for identifying the mobile terminal, there can be considered a UE-ID, an IMSI (International Mobile Subscriber Identity), or temporary UE identification information. As a concrete example of the information for identifying the CSG, there can be considered a CSG ID, a PCI, or a GCI.

As a concrete example of an entity which ends the management of the temporary subscription as an expired CSG subscription which is carried out by the network side when the given condition is satisfied, there is an MME or an HSS (Home Subscriber Server). The HSS is a subscriber information database in a 3GPP mobile communications network, and is an entity for carrying out management of authentication information and location information.

Figure 14:
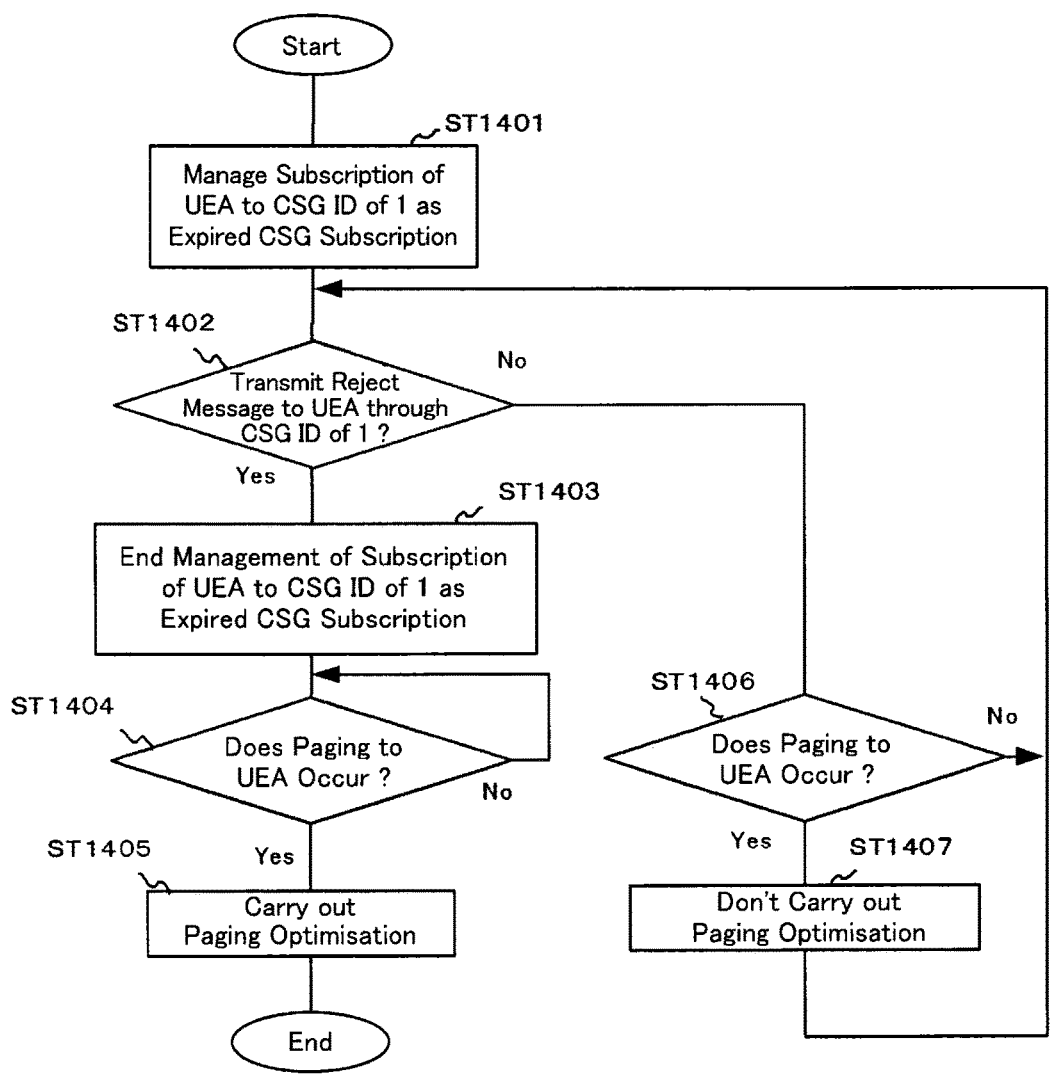
FIG. 14 is a flow chart showing the operation of an MME according to a solution provided by Embodiment 1.

An example of the operation of an MME which is a concrete example of the network side is shown in FIG. 14. A case in which a mobile terminal A (UEA) temporarily subscribes to a CSG ID of "1", and the temporary time period for the temporary subscription expires is shown below.

The network side, in step ST1401, manages the subscription of the mobile terminal A to the CSG ID of "1" as an expired CSG subscription. The network side, in step ST1402, determines whether the network side has transmitted a reject message for a request which the mobile terminal in which the time period for the temporary subscription has expired has made through a cell with the CSG ID to which the mobile terminal has made the temporary subscription. Concretely, the network side determines whether the network side has transmitted a reject message to the mobile terminal A through a cell with the CSG ID of "1". When having transmitted a reject message to the mobile terminal A, the network side shifts to step ST1403. In contrast, when not having transmitted a reject message to the mobile terminal A, the network side shifts to step ST1406. The network side, in step ST1403, ends the management of the subscription of the mobile terminal A to the CSG ID of "1" as an expired CSG subscription.

The MME, in step ST1404, determines whether a paging destined for the mobile terminal A occurs. When a paging destined for the mobile terminal A occurs, the MME shifts to step ST1405. In contrast, when no paging destined for the mobile terminal A occurs, the MME repeats the determination of step ST1404. The MME, in step ST1405, carries out the paging optimisation on the paging destined for the mobile terminal A. In a concrete example of the paging optimisation operation, when the allowed CSG ID list of the mobile terminal A which is managed by the network side is included in the paging message, the network side does not transmit the paging to a CSG cell with a CSG ID which is not included in the allowed CSG ID list even if the CSG cell is located in the tracking area with which the mobile terminal A is registered. In this example of the operation, the MME does not transmit the paging to a CSG cell with the CSG ID of "1" in the tracking area to which the mobile terminal A belongs.

The MME, in step ST1406, determines whether a paging destined for the mobile terminal A occurs. When a paging destined for the mobile terminal A occurs, the MME shifts to step ST1407, whereas when no paging destined for the mobile terminal A occurs, the MME returns to the process of step ST1402. The MME, in step ST1407, does not carry out the paging optimisation on the paging destined for the mobile terminal A. As an alternative, the MME can carry out the paging optimization on the paging to handle the expired CSG subscription as a valid CSG subscription. This is because it has been decided according to the current standards that expired CSG subscriptions are handled as valid CSG subscriptions for the paging optimisation. In this example of the operation, the MME transmits the paging to cells including a CSG cell with the CSG ID of "1" in the tracking area to which the mobile terminal A belongs.

Embodiment 1 can provide the following advantages. In accordance with Embodiment 1, the mobile communication system can end the management of a temporary subscription as an expired CSG subscription, and can prevent the number of temporary subscriptions which are managed as expired CSG subscriptions from increasing as the number of mobile terminals which temporarily subscribe a CSG increases. As a result, the above-mentioned problem 1 that the processing load imposed on the network side due to the management of expired CSG subscriptions increases can be solved.

Further, because the mobile communication system can end the management of a temporary subscription as an expired CSG subscription, the mobile communication system can carry out the paging optimisation. As a result, an MME or a CSG cell with the CSG ID can eliminate a needless paging transmitting process of transmitting a paging to a mobile terminal for which the MME or the CSG cell does not have to support any service originally because the time period for a temporary subscription has expired, and needless radio resources and so on used for the paging transmission can be reduced.

When the time period for a temporary subscription of a mobile terminal has expired, the mobile communication system handles the mobile terminal's subscription to the CSG ID to which the mobile terminal has made the temporary subscription as an expired CSG subscription. Further, expired CSG subscriptions are handled as valid CSG subscriptions for the paging optimisation. As a result, because even if the mobile terminal in which the time period for the temporary subscription has expired continues camping on a cell with the CSG ID, the paging optimisation is not carried out on a paging destined for the mobile terminal, the paging destined for the mobile terminal is transmitted from the cell. In addition, even when the network side transmits a reject message for a request or the like which a mobile terminal has made through a cell with a CSG ID to which the mobile terminal has executed the method in accordance with Embodiment 1 to make a temporary subscription, and the network side then ends the management of this temporary subscription as an expired CSG subscription, the mobile terminal deletes the CSG ID from the allowed CSG ID list stored therein according to the reject message transmitted thereto. Therefore, the mobile terminal does not continue camping on the cell with the above-mentioned CSG ID. Thus, this Embodiment 1 also inherits the advantage, which is provided by the currently-used method, of being able to construct a mobile communication system in which a mobile terminal in which the time period for a temporary subscription has expired does not miss a paging.

Variant 1 of Embodiment 1

A problem to be solved by Variant 1 of Embodiment 1 is explained below. Even in the case that the solution provided by Embodiment 1 is implemented, when a mobile terminal is granted a sufficiently long temporary time period at the time of making a temporary subscription to a CSG ID, i.e. a temporary time period longer than a time period during which the mobile terminal is in the coverage of a cell with the CSG ID to which the mobile terminal has made the temporary subscription, the given condition shown in Embodiment 1 is not satisfied and therefore the mobile communication system cannot end the management of this temporary subscription as an expired CSG subscription. In a concrete example, because the mobile terminal is granted a sufficiently long temporary time period at the time of making a temporary subscription to a CSG ID and hence the mobile terminal does not make any request through a cell having the CSGID to which the mobile terminal has made the temporary subscription, the mobile communication system cannot end the management of this temporary subscription as an expired CSG subscription. Therefore, the above-mentioned problem 1 arises again.

A solution provided by Variant 1 of Embodiment 1 is shown below. The network side ends the management of a temporary subscription as an expired CSG subscription which is carried out thereby after a given time has elapsed or after the expiration of a given time interval.

Two concrete examples of the given time (referred to as an "expired CSG subscription management timer" from here on) are disclosed below. (1) An expired CSG subscription management timer value is set commonly for all temporary subscriptions. As a result, there is provided an advantage of eliminating the necessity to carry out the management on each temporary subscription, thereby reducing the processing load imposed on the network side. The timer value can be static or semi-static. The expired CSG subscription management timer value which is set commonly for all temporary subscriptions can also be set commonly for all mobile terminals. As a result, there is provided an advantage of eliminating the necessity to carry out the management on each mobile terminal, thereby reducing the processing load imposed on the network side. As an alternative, the expired CSG subscription management timer value which is set commonly for all temporary subscriptions can be set to be different for each mobile terminal. In this case, there is provided an advantage of being able to set the timer value according to the performance of each mobile terminal, and to construct the mobile communication system in such a way that it has a higher degree of flexibility. (2) Different expired CSG subscription management timer values are set for temporary subscriptions, respectively. As a result, there is provided an advantage of being able to construct the mobile communication system in such a way that it has a higher degree of flexibility. What is necessary is just to manage an expired CSG subscription management timer value together with each temporary subscription. This management method offers an advantage of making it easy to manage the timer value which is different for each temporary subscription. Further, the expired CSG subscription management timer values can be managed together with the allowed CSG ID list which is managed by the network side. This management method also offers an advantage of making it easy to manage the timer value which is different for each temporary subscription. The timer value can be static or semi-static. The different expired CSG subscription management timer values which are respectively set for temporary subscriptions can be set commonly for all mobile terminals. As a result, there is provided an advantage of eliminating the necessity to carry out the management on each mobile terminal, thereby reducing the processing load imposed on the network side. As an alternative, the different expired CSG subscription management timer values which are respectively set for temporary subscriptions can be set to be different for each mobile terminal. In this case, there is provided an advantage of being able to set the timer values according to the performance of each mobile terminal, and to construct the mobile communication system in such a way that it has a higher degree of flexibility.

Because a concrete example of a method of ending the management is the same as that in accordance with Embodiment 1, the explanation of the method is omitted hereafter. Because a concrete example of an entity which ends the management of a temporary subscription as an expired CSG subscription which is performed by the network side when the given condition is satisfied is the same as that in accordance with Embodiment 1, the explanation of the concrete example is omitted hereafter.

Figure 15:
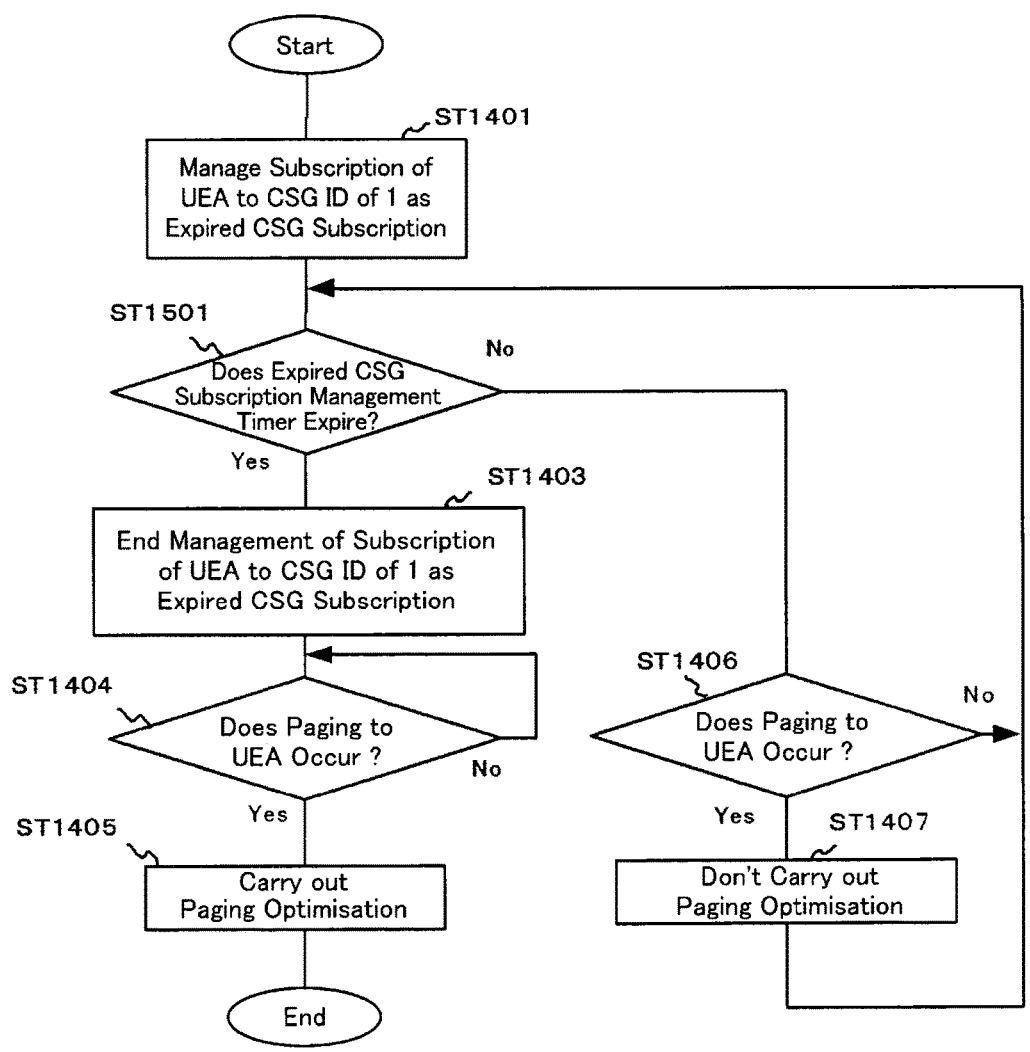
FIG. 15 is a flow chart showing the operation of an MME according to a solution provided by Variant 1 of Embodiment 1.

An example of the operation of an MME which is a concrete example of the network side is shown in FIG. 15. Because the same reference numerals as those shown in FIG. 14 denote like parts, the explanation of the parts is omitted hereafter. A case in which a mobile terminal A (UEA) is caused to temporarily subscribe to a CSG ID of "1", and the temporary time period for the temporary subscription expires is shown below. The MME, in step ST1501, determines whether the expired CSG subscription management timer has expired. When the expired CSG subscription management timer has expired, the MME shifts to step ST1403. In contrast, when the expired CSG subscription management timer has not expired, the MME shifts to step ST1406.

Variant 1 of Embodiment 1 can provide the following advantages. In accordance with Embodiment 1, the mobile communication system can end the management of a temporary subscription as an expired CSG subscription even in a case in which a mobile terminal is granted a sufficiently longer temporary time period at the time of making a temporary subscription to a CSG, and can prevent the number of temporary subscriptions which are managed as expired CSG subscriptions from increasing as the number of mobile terminals which temporarily subscribe the CSG increases. As a result, the above-mentioned problem 1 that the processing load imposed on the network side due to the management of expired CSG subscriptions increases can be solved.

Further, because the mobile communication system can end the management of a temporary subscription as an expired CSG subscription, the mobile communication system can carry out the paging optimisation, like that in accordance with Embodiment 1. As a result, the MME or the CSG cell with the CSG ID can eliminate a needless paging transmitting process of transmitting a paging to a mobile terminal for which the MME or the CSG cell does not have to support any service originally because the time period for a temporary subscription has expired, and needless radio resources and so on used for the paging transmission can be reduced.

When the time period for the temporary subscription has expired, the mobile communication system handles the mobile terminal's subscription to the CSG ID to which the mobile terminal has made the temporary subscription as an expired CSG subscription. Further, expired CSG subscriptions are handled as valid CSG subscriptions for the paging optimisation. As a result, because even if the mobile terminal for which the time period for the temporary subscription has expired continues camping on a cell with the CSG ID, the paging optimisation is not carried out on a paging destined for the mobile terminal, the paging destined for the mobile terminal is transmitted from the cell. In addition, in the case of implementing Variant 1 of Embodiment 1, even when the network side determines that the expired CSG subscription management timer value has expired and ends the management of the temporary subscription as an expired CSG subscription, and the mobile terminal then continues camping on a cell with the CSG ID, the network side repeats the paging unless the network side receives a response to paging from the mobile terminal. The paging optimisation is not carried out while the network side repeats the paging. Therefore, this Variant 1 of Embodiment 1 also inherits the advantage, which is provided by the currently-used method, of being able to construct a mobile communication system in which a mobile terminal for which the time period for the temporary subscription has expired does not miss the paging.

Variant 1 of Embodiment 1 can be used in combination with Embodiment 1. With this combination, when the mobile terminal deletes the CSG ID from the allowed CSG ID list stored therein, the mobile communication system ends the management of the temporary subscription as an expired CSG subscription managed by the network side while bringing the CSG ID into correspondence with the mobile terminal. As a result, the mobile communication system can be constructed in such a way as to provide consistency between the mobile terminal and the network, and can certainly end the management of the temporary subscription as an expired CSG subscription after the given time elapses.

Embodiment 2

A problem to be solved by Embodiment 2 is the above-mentioned problem 2. A solution provided by Embodiment 2 is shown below. A mobile terminal deletes information for identifying a CSG to which the mobile terminal has made a temporary subscription from the allowed CSG ID list stored therein when a given condition is satisfied. Because a concrete example of the information for identifying the CSG is the same as that in accordance with Embodiment 1, the explanation of the concrete example is omitted hereinafter. As a concrete example of the given condition, there is a condition that a given time has elapsed or a given time interval has expired.

A concrete example of the given time (referred to as the "local temporary time period" from here on) is disclosed below. The local temporary time period is decided on the basis of the temporary time period. Two concrete examples of the method of deciding the local temporary time period on the basis of the temporary time period are disclosed below. (1) The local temporary time period is set to be equal to the temporary time period. (2) The local temporary time period is set to have a value which is acquired by adding a given time to the temporary time period. When the local temporary time period is set to have a value which is acquired by adding the given time to the temporary time period, there is provided an advantage of being able to maintain the registration to the allowed CSG ID list stored in the mobile terminal during a time period during which the mobile terminal is enabled to receive a service, the time period being registered with the mobile terminal by the network side, even though a difference occurs between the start times of the local temporary time period and the temporary time period by making the given time settable.

Two concrete examples of the given time which is added to the temporary time period are disclosed below. (1) The given time is set to have a value identical for all temporary subscriptions. As a result, there is provided an advantage of eliminating the necessity to carry out the management for each temporary subscription, thereby reducing the processing load imposed on the mobile terminal. The given time which is added to the temporary time period can be static or semi-static. (2) The given time is set to have a value different for each temporary subscription. As a result, there is provided an advantage of being able to construct the mobile communication system in such a way that it has a higher degree of flexibility.

As another concrete example of the given time which is added to the temporary time period, there is an "expired CSG subscription management timer value" shown in Variant 1 of Embodiment 1. When the local temporary time period is set to have a value which is acquired by adding the "expired CSG subscription management timer value", which is shown in Variant 1 of Embodiment 1, to the temporary time period, there is provided an advantage of being able to maintain the registration to the allowed CSG ID list stored in the mobile terminal during a time period during which the network side manages the mobile terminal's temporary subscription as "the allowed CSG ID list managed by the network side" or an "expired CSG subscription" while bringing the mobile terminal into correspondence with the CSG ID.

Two concrete examples of the start time of the local temporary time period are disclosed below. (1) When the information for identifying the CSG to which the mobile terminal has made a temporary subscription is registered in the allowed CSG ID list stored in the mobile terminal, the mobile terminal starts the local temporary time period. (2) When receiving an accept or attach accept message to a request which the mobile terminal has made through a cell with the CSG ID to which the mobile terminal has subscribed from the network side, the mobile terminal starts the local temporary time period.

A concrete example of a method of determining whether the subscription is a temporary subscription or a normal subscription (having no setup of the temporary time period) by the mobile terminal is disclosed below. Whether the subscription is a temporary subscription or a normal subscription (having no setup of the temporary time period) is transmitted from the network side to the mobile terminal. In a concrete example of a method of transmitting the determination result, when the network side transmits an accept or attach accept message to a request which the mobile terminal has made through a cell with the CSG ID to which the mobile terminal has subscribed to the mobile terminal, the network side also transmits information indicating whether or not the subscription is a temporary subscription, whether or not the subscription is a normal subscription, or whether the subscription is a temporary subscription or a normal subscription to the mobile terminal.

Two concrete examples of the transmission of the accept message are disclosed below. (1) The network side transmits the accept or attach accept message as a result of "E-UTRAN initial attach" being executed by the mobile terminal, which is a method of establishing an EPS (Evolved Packet system) bearer. (2) The network side transmits a TAU accept message as a result of "E-UTRAN Tracking Area update", which the mobile terminal performs when executing a manual mode as a method of making a selection or reselection of a CSG cell.

When transmitting the information indicating whether or not the subscription is a temporary subscription, whether or not the subscription is a normal subscription, or whether the subscription is a temporary subscription or a normal subscription to the mobile terminal, the network side can notify the temporary time period or the "expired CSG subscription management timer value", which is shown in Variant 1 of Embodiment 1, as well as the temporary time period, to the mobile terminal.

The mobile terminal which has received the information indicating whether or not the subscription is a temporary subscription, whether or not the subscription is a normal subscription, or whether the subscription is a temporary subscription or a normal subscription, and the notification of either the temporary time period or the "expired CSG subscription management timer value", which is shown in Variant 1 of Embodiment 1, as well as the temporary time period, from the network side can store these pieces of information, together with the CSG ID to which the mobile terminal has made the temporary subscription, in the allowed CSG ID list stored in the mobile terminal. As a result, there can be provided an advantage of making it easy to store the information about the temporary subscription in the mobile terminal while bringing the information about the temporary subscription into correspondence with the CSG ID. Further, in a case in which the allowed CSG ID list is stored in a SIM card or the like, even though the user changes to a new mobile terminal, the mobile communication system enables the new mobile terminal to operate on the same conditions, and can provide a user-friendly communication environment for users.

In addition, by implementing a solution as shown below, the mobile communication system can solve the above-mentioned problem 1. Two solutions are disclosed below. (1) Use this embodiment in combination with Embodiment 1 and Variant 1 of Embodiment 1. (2) Send information showing that the information for identifying the CSG to which the mobile terminal has made a temporary subscription from the allowed CSG ID list stored in the mobile terminal from the mobile terminal to the network side through a base station (a CSG cell or a non-CSG cell). As an alternative, information showing that the local temporary time period has expired can be transmitted from the mobile terminal to the network side. A concrete example of an entity of the network side to which the information is transmitted is an MME, an HSS, or the like. The network side which has received the information showing that the information for identifying the CSG to which the mobile terminal has made a temporary subscription is deleted from the allowed CSG ID list stored in the mobile terminal from the mobile terminal deletes the CSG ID for the mobile terminal from the target for the management of expired CSG subscriptions. As a result, it is possible for the network to end the management carried out with bringing the CSG ID into correspondence with the mobile terminal as an expired CSG subscription when the above-mentioned CSG ID is deleted from the allowed CSG ID list stored in the mobile terminal. Therefore, the mobile communication system in which there is a consistency between the mobile terminal and the network side can be constructed. As a concrete example of the information which is transmitted from the mobile terminal to the network side, there is information for identifying the CSG to which the mobile terminal has canceled the temporary subscription. Because a concrete example of the information for identifying the CSG is the same as that shown in Embodiment 1, the explanation of the concrete example is omitted hereafter.

Figure 16:
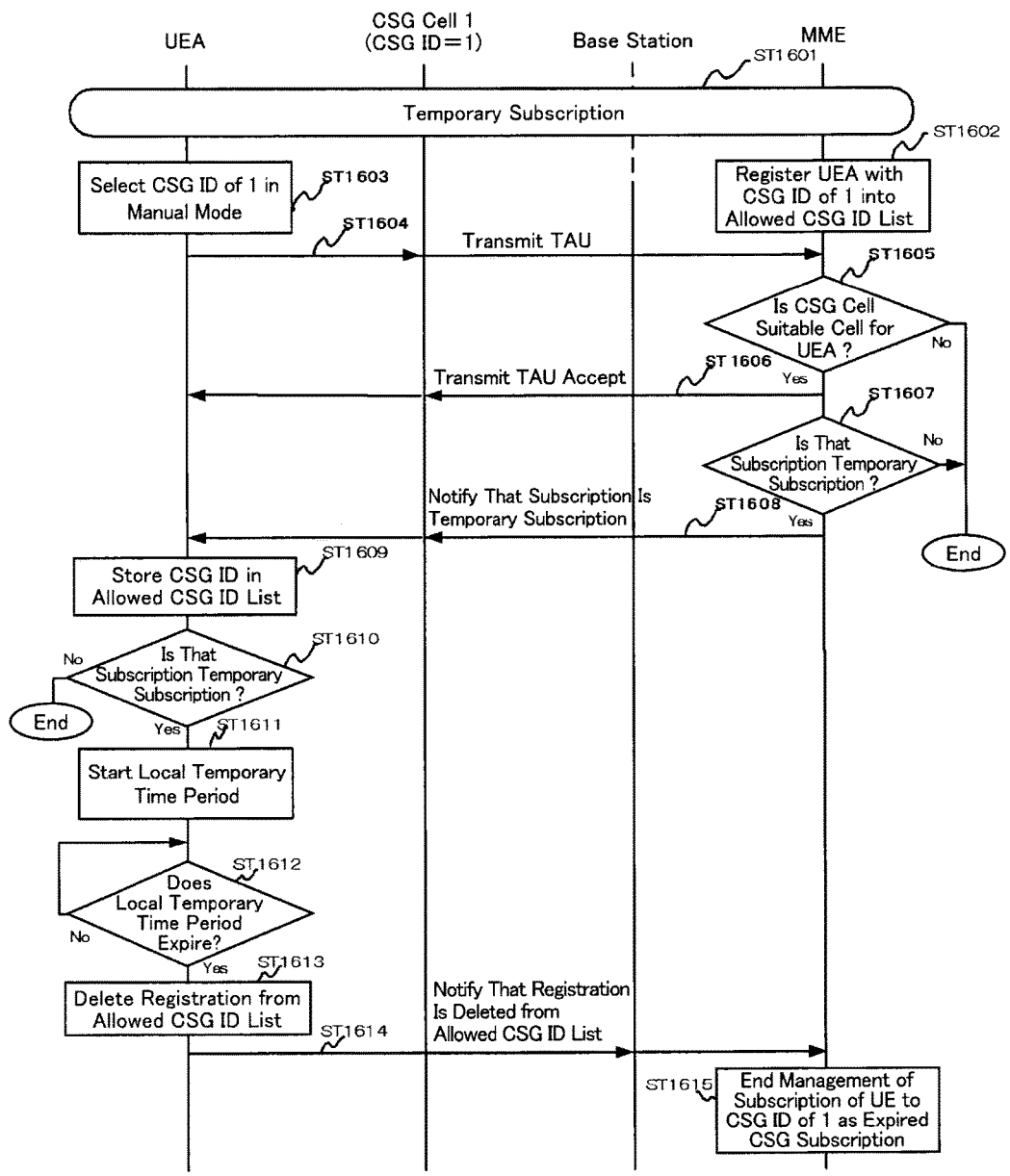
FIG. 16 is a sequence diagram of the operation of a mobile communication system according to a solution provided by Embodiment 2.

An example of the operation of the mobile communication system is shown in FIG. 16. A mobile terminal A (UEA), in step ST1601, is caused to temporarily subscribe to a CSG with a CSG ID of "1". The network side, more concretely, an MME, in step ST1602, registers the mobile terminal A with the CSG ID of "1", and then manages the allowed CSG ID list in which the CSG with the CSG ID of "1" is registered. The mobile terminal A, in step ST1603, selects the CSG ID of "1" in a manual mode in which the mobile terminal make a selection or reselection of a CSG cell. The mobile terminal A, in step ST1604, transmits a TAU (Tracking Area update) message to the MME through a CSG cell 1 with the CSG ID of "1".

The MME, in step ST1605, determines whether or not the cell which the mobile terminal A has used to transmit the TAU message, i.e. the CSG cell 1 is a "suitable cell" for the mobile terminal A. In other words, the MME determines whether or not the mobile terminal A is registered, as CSG, with the CSG ID (CSG ID of "1") of the CSG cell 1. When determining whether or not the mobile terminal A is registered with the CSG ID, the MME can refer to the allowed CSG ID list. When determining that the CSG cell is a "suitable cell", the MME shifts to step ST1606. Because a process which the MME performs when determining that the CSG cell is not a "suitable cell" is not a feature of this embodiment, the explanation of the process is omitted hereafter.

The MME, in step ST1606, transmits a TAU accept message to the mobile terminal A through the CSG cell 1. The MME, in step ST1607, determines whether or not the subscription of the mobile terminal A is a temporary one. When determining whether or not the subscription is a temporary one, the MME can refer to the allowed CSG ID list. When determining that the subscription is a temporary one, the MME shifts to step ST1608. Because a process which the MME performs when determining that the subscription is not a temporary one is not a feature of this embodiment, the explanation of the process is omitted hereafter.

The MME, in step ST1608, notifies the mobile terminal A that the subscription is a temporary one through the CSG cell 1. The MME can carry out steps ST1606 and ST1608 at a time. When the MME can carry out these steps at a time, the CSG cell 1 can perform a downlink scheduling on the mobile terminal A only once. In this case, there can be provided an advantage of reducing the scheduling load imposed on the base station, and making effective use of radio resources. Further, the information indicating whether or not the subscription is a temporary one, whether or not the subscription is a normal one, or whether the subscription is a temporary one or a normal one can be a part of information elements included in the TAU accept message.

Being triggered by the reception of the TAU accept message transmitted in step ST1606, the mobile terminal A, in step ST1609, stores the CSG ID in the allowed CSG ID list. The mobile terminal A, in step ST1610, determines whether or not the subscription to the CSG ID is a temporary one. The mobile terminal can use the information received in step ST1608 for the determination. When determining that the subscription to the CSG ID is a temporary one, the mobile terminal shifts to step ST1611. Because a process which the mobile terminal performs when determining that the subscription is not a temporary one is not a feature of this embodiment, the explanation of the process is omitted hereafter. The mobile terminal A, in step ST1611, starts the local temporary time period. The mobile terminal A, in step ST1612, determines whether the local temporary time period expires. When determining that the local temporary time period expires or has expired, the mobile terminal A shifts to step ST1613. In contrast, when determining that the local temporary time period does not expire, the mobile terminal A repeats the determination of step ST1612. The mobile terminal A, in step ST1613, deletes the CSG ID from the allowed CSG ID list.

The mobile terminal A, in step ST1614, notifies the MME that the mobile terminal has deleted the information for identifying the CSG to which the mobile terminal has made a temporary subscription from the allowed CSG ID list stored in the mobile terminal through a base station (including a CSG cell and a non-CSG cell). The base station through which the mobile terminal notifies the MME that the mobile terminal has deleted the information for identifying the CSG can be the CSG cell 1 or a cell different from the CSG cell 1. As a result, even after the temporary subscription of the mobile terminal A to the CSG ID of "1" has expired, the mobile terminal A can notify the MME that the mobile terminal has deleted the information for identifying the CSG to which the mobile terminal has made the temporary subscription from the allowed CSG ID list stored in the mobile terminal. The MME, in step ST1615, ends the management of the temporary subscription of the mobile terminal A to the CSG ID of "1" as an expired CSG subscription.

Further, when a given condition is satisfied, e.g. when the local temporary time period has expired, the mobile terminal can notify the user to that effect. As a result, the mobile communication system enables the user to know that the temporary time period has expired, and can provide a user-friendly communication environment for users.

The time that the mobile terminal notifies the user that the mobile terminal has deleted the information for identifying the CSG is not limited to the time that the local temporary time period expires. As an alternative, the time that the mobile terminal notifies the user that the mobile terminal has deleted the information for identifying the CSG to which the mobile terminal has made the temporary subscription from the allowed CSG ID list stored in the mobile terminal can be a time before or after the local temporary time period expires, or before, at the time that, or after the mobile terminal deletes the information for identifying the CSG. In this case, the same advantages can be provided.

Three concrete examples of a method of notifying the user to that effect are disclosed below. (1) The mobile terminal displays the information thereon or on a display to which the mobile terminal is connected. The information displayed can be the CSG ID for which the local temporary time period has expired, or the name of the HeNB (the name of the home eNB: hnb-Name). (2) The mobile terminal notifies the user to that effect by using a notification sound. (3) The mobile terminal notifies the user to that effect by using a vibrator function. The mobile terminal can notify the user to that effect by using a combination of two or more of these examples.

Embodiment 2 can provide the following advantages. In accordance with Embodiment 2, the mobile terminal can delete a CSG ID from which the mobile terminal cannot receive any service because a temporary subscription to the CSG ID has expired from the allowed CSG ID list stored therein without receiving any command from the network side.

As a result, a situation in which the mobile terminal selects or camps on a cell with the CSG ID from which the mobile terminal cannot receive any service when making a CSG cell selection or reselection in the automatic mode thereof can be prevented from occurring, and needless operations of the mobile terminal can be reduced. As a result, there can be provided an advantage of reducing the power consumption of the mobile terminal.

Further, when not making any CSG subscription other than a temporary subscription, the mobile terminal can empty the allowed CSG ID list thereof, and stop its autonomous search function of searching for a CSG cell. As a result, there can be provided an advantage of reducing the power consumption of the mobile terminal.

Further, when the mobile terminal is turned off, the mobile terminal can start up automatically without the user's turning-on operation of turning on the mobile terminal, and delete the information for identifying the CSG to which the mobile terminal has made a temporary subscription from the allowed CSG ID list stored therein when a given condition is satisfied. Because the mobile terminal does not have to receive any command from the network side in this way, there can be provided an advantage of enabling the mobile terminal to delete the CSG ID included in the allowed CSG ID list stored therein even when the electric power of the mobile terminal is turned off.

Variant 1 of Embodiment 2

A problem to be solved by Variant 1 of Embodiment 2 is the above-mentioned problem 2. In Variant 1 of Embodiment 2, a solution different from that shown in Embodiment 2 is shown below. The mobile terminal inquires of the network side about the CSG subscription status thereof when a given condition is satisfied. When determining, as a result of the inquiry, that the CSG subscription for which the temporary time period has expired is a canceled one, the mobile terminal deletes the CSG ID from the allowed CSG ID list stored therein.

As a concrete example of the given condition, there is a condition that a given time has elapsed or a given time interval has expired. Because a concrete example of the given time is the same as that shown in Embodiment 2, the explanation of the concrete example is omitted hereafter. Because a concrete example of the start time of the local temporary time period is the same as that shown in Embodiment 2, the explanation of the concrete example is omitted hereafter. Because a concrete example of a method of determining whether or not the subscription is a temporary one or a normal one (having no setup of the temporary time period) which the mobile terminal uses is the same as that shown in Embodiment 2, the explanation of the concrete example is omitted hereafter.

Two concrete examples of a method of inquiring of the network side about the CSG subscription status of the mobile terminal, which the mobile terminal uses, are disclosed below. (1) The mobile terminal transmits "information showing the inquiry about the CSG subscription status of the mobile terminal" to the network side. (2) The mobile terminal transmits "information showing the expiration of the local temporary time period" to the network side.

Two concrete examples of the information showing the inquiry about the CSG subscription status of the mobile terminal are disclosed below.

(1) The mobile terminal transmits information showing that the mobile terminal intends to check to see the CSG subscription status of the mobile terminal, or information showing a distinction about whether or not the mobile terminal intends to check to see the CSG subscription status of the mobile terminal to the network side. Because this information can be transmitted with at least one bit of information, there can be provided an advantage of making effective use of radio resources. (2) The mobile terminal transmits information about the CSG ID the subscription status of which the mobile terminal intends to check to see to the network side. Even in a case in which the number of CSG types which the mobile terminal can temporarily subscribe increases, the mobile terminal can specify the CSG ID the CSG subscription status of which the mobile terminal intends to check to see. The mobile terminal can transmit both the information shown in the case (2) and information shown in the case (1) to the network side.

Two concrete examples of the information showing the expiration of the local temporary time period are disclosed below. (1) The mobile terminal transmits the information showing that the local temporary time period has expired or whether the local temporary time period has expired to the network side. Because this information can be transmitted with at least one bit of information, there can be provided an advantage of making effective use of radio resources. (2) The mobile terminal transmits the information about the CSG ID which is associated with the timer and to which the mobile terminal has made a temporary subscription to the network side. As a result, even in a case in which the number of CSG types which the mobile terminal can temporarily subscribe increases, the mobile terminal can specify the CSG ID for which the local temporary time period has expired. The mobile terminal can transmit both the information shown in the case (2) and information shown in the case (1) to the network side.

Two concrete examples of a method of transmitting the information to the network side, which the mobile terminal uses, are disclosed below. (1) The mobile terminal transmits the information showing that the mobile terminal intends to check to see the CSG subscription status thereof, or the like to the network side by using an RACH transmission method. More specifically, the mobile terminal maps the information to an RACH which is a transport channel to transmit the information to the network side by using a physical channel PRACH. The information showing that the mobile terminal intends to check to see the CSG subscription status thereof, or the like can be one of information elements of the RACH which is a transport channel. As an alternative, the information can be one of information elements of a message 3 according to a random access procedure. As a result, there is provided an advantage of enabling the mobile terminal to notify the network side that the uplink transmission from the mobile terminal is aimed at showing that "the mobile terminal intends to check to see the CSG subscription status thereof" in an early stage of the uplink transmission from the mobile terminal. (2) The mobile terminal transmits information showing that the mobile terminal intends to check to see the CSG subscription status thereof, or the like to the network side by using an established connection between the mobile terminal and the network side. The mobile terminal transmits the information showing that the mobile terminal intends to check to see the CSG subscription status thereof, or the like to the network side by using control information (c-plane) in the connection. Further, in a concrete example, the mobile terminal maps the information showing that the mobile terminal intends to check to see the CSG subscription status thereof, or the like to a CCCH which is a logical channel, or a DCCH to transmit the information to the network side by using a transport channel UL-SCH and a physical channel PUSCH. An increase in the amount of information of the PUSCH as a result of using the UL-SCH and the PUSCH is accepted relatively easily when constructing the mobile communication system. Therefore, the notification of the "information showing that the mobile terminal intends to check to see the CSG subscription status thereof" by using the PUSCH, which is newly provided by this embodiment, can provide an advantage of making it easy to construct the mobile communication system.

The network side which has received the "information showing that the mobile terminal intends to check to see the CSG subscription status thereof", or the like, from the mobile terminal notifies the "CSG subscription status of the mobile terminal" to the mobile terminal.

Four concrete examples of the CSG subscription status of the mobile terminal are disclosed below. (1) The network side transmits information showing that the temporary time period has expired or the temporary time period has not expired, or whether the temporary time period has expired to the mobile terminal. Because this information can be transmitted with at least one bit of information, there can be provided an advantage of making effective use of radio resources. (2) The network side transmits information showing the CSG ID for which the temporary time period has expired. As a result, even in a case in which the number of CSG types which the mobile terminal can temporarily subscribe increases, the network side can specify the CSG ID for which the network side notifies the CSG subscription status to the mobile terminal. The network side can transmit both the information shown in the case (2) and information shown in the case (1) to the mobile terminal. In either of the cases (1) and (2), the network side can transmit information showing that the CSG subscription is canceled, instead of the information showing that the temporary time period has expired, to the mobile terminal. (3) The network side notifies the expired CSG subscription of the mobile terminal to the mobile terminal. (4) The network side notifies the allowed CSG ID list of the mobile terminal which is managed thereby to the mobile terminal.

A concrete example of a method of transmitting the information to the mobile terminal, which the network side (an MME, a base station, or the like) uses, is disclosed below. (1) The network side notifies the CSG subscription status of the mobile terminal, or the like to the mobile terminal by using an established connection between the mobile terminal and network side. The network side notifies the CSG subscription status of the mobile terminal, or the like to the mobile terminal by using control information (c-plane) in the connection. In a further concrete example, the network side maps the CSG subscription status of the mobile terminal, or the like to a CCCH which is a logical channel, or a DCCH to transmit the information to the mobile terminal by using a transport channel DL-SCH and a physical channel PDSCH. An increase in the amount of information of the PUSCH as a result of using the DL-SCH and the PUSCH is accepted relatively easily when constructing the mobile communication system. Therefore, the notification of the "CSG subscription status of the mobile terminal" by using the PUSCH, which is newly provided by this embodiment, can provide an advantage of making it easy to construct the mobile communication system.

In addition, by implementing a solution as shown below, the mobile communication system can solve the above-mentioned problem 1. Two solutions are disclosed below. (1) Use this variant in combination with Embodiment 1 and Variant 1 of Embodiment 1. (2) The network side, which has received the "information showing that the mobile terminal intends to check to see the CSG subscription status of the mobile terminal", or the like from the mobile terminal, removes the CSG ID for which the network side has notified the mobile terminal that the temporary time period has expired by using an ack to the mobile terminal and which is registered for the mobile terminal from the target for the management of expired CSG subscriptions. As a result, the mobile communication system can be constructed in such a way as to, when the above-mentioned CSG ID is deleted from the allowed CSG ID list stored in the mobile terminal, end the management of the temporary subscription as an expired CSG subscription managed by the network while bringing the CSG ID into correspondence with the mobile terminal, thereby providing consistency between the mobile terminal and the network side. A concrete example of an entity of the network side is an MME, an HSS, or the like. (3) The network side, which has received the "information showing that the mobile terminal intends to check to see the CSG subscription status thereof", or the like from the mobile terminal, deletes the CSG ID for which the network side has notified the mobile terminal that the CSG subscription is canceled by using an ack to the mobile terminal and which is registered for the mobile terminal from the allowed CSG ID list managed by the network side. As a result, the mobile communication system can be constructed in such a way as to, when the above-mentioned CSG ID is deleted from the allowed CSG ID list stored in the mobile terminal, also delete the CSG ID from the allowed CSG ID list managed by the network side, thereby providing consistency between the mobile terminal and the network side. A concrete example of an entity of the network side is an MME, an HSS, or the like.

Further, when the mobile terminal is turned off, the mobile terminal can start up automatically and check to see the CSG subscription status thereof when a given condition is satisfied without the user's turning-on operation of turning on the mobile terminal. When finding a CSG subscription for which the temporary time period has expired or a canceled CSG subscription as a result of checking to see the CSG subscription status of the mobile terminal, the mobile terminal should just delete the CSG ID from the allowed CSG ID list stored therein. Because the details of the deleting operation are the same as that of the above-mentioned deleting operation, the explanation of the deleting operation is omitted hereafter.

Further, when a given condition is satisfied, e.g. when the local temporary time period expires, the mobile terminal can notify the user to that effect. As a result, the mobile communication system enables the user to know that the temporary time period has expired, and can provide a user-friendly communication environment for users. As an alternative, when there exists a CSG ID which is deleted from the allowed CSG ID list stored in the mobile terminal, the mobile terminal can notify the user to that effect. As a result, the mobile communication system enables the user to know that the CSG ID is deleted from the allowed CSG ID list, and can provide a user-friendly communication environment for users.

The time that the mobile terminal notifies the user that the mobile terminal has deleted the information for identifying the CSG is not limited to the time that the local temporary time period expires. As an alternative, the time that the mobile terminal notifies the user that the mobile terminal itself has deleted the information for identifying the CSG to which the mobile terminal has made a temporary subscription from the allowed CSG ID list stored in the mobile terminal can be a time before or after the local temporary time period expires, or before, at the time that, or after the mobile terminal deletes the information for identifying the CSG. In this case, the same advantages can be provided.

Three concrete examples of a method of notifying the user to that effect are disclosed below. (1) The mobile terminal displays the information thereon or on a display to which the mobile terminal is connected. The information displayed can be the CSG ID for which the local temporary time period has expired, or the CSG ID which is deleted from the allowed CSG ID list stored in the mobile terminal. (2) The mobile terminal notifies the user to that effect by using a notification sound. (3) The mobile terminal notifies the user to that effect by using a vibrator function.

Figure 17:
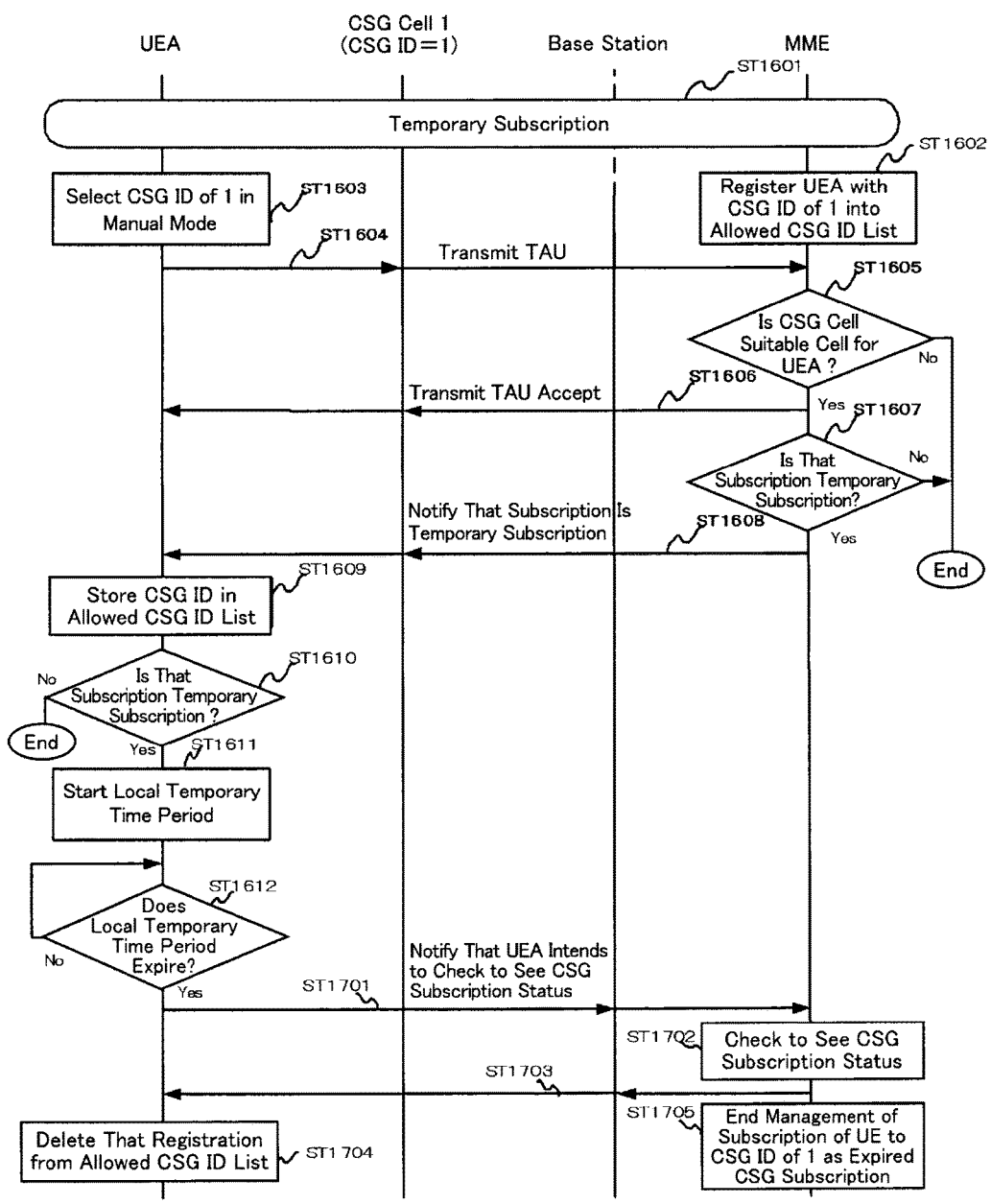
FIG. 17 is a sequence diagram of the operation of a mobile communication system according to a solution provided by Variant 1 of Embodiment 2.

An example of the operation of the mobile communication system is shown in FIG. 17. Because the same reference numerals as those shown in FIG. 16 denote like parts, the explanation of the parts is omitted hereafter. A mobile terminal A, in step ST1701, notifies an MME that the mobile terminal intends to check to see the CSG subscription status thereof through a base station (including a CSG cell or a non-CSG cell). The base station through which the mobile terminal notifies the MME that the mobile terminal intends to check to see the CSG subscription status thereof can be a CSG cell 1 or a cell different from the CSG cell 1. As a result, even after a temporary subscription of the mobile terminal A to a CSG ID of "1" has expired, the mobile terminal A can notify the MME that the mobile terminal intends to check to see the CSG subscription status thereof. The MME, in step ST1702, checks to see the CSG subscription status of the mobile terminal A. For example, the MME checks the allowed CSG ID list managed by the network side, which is stored in the MME or an HSS, expired CSG subscriptions, or the like.

The MME, in step ST1703, notifies the CSG subscription status to the mobile terminal A through a base station (including a CSG cell or a non-CSG cell). The base station through which the MME notifies the CSG subscription status to the mobile terminal A can be the CSG cell 1 or a cell different from the CSG cell 1. As a result, even after the temporary subscription of the mobile terminal A to the CSG ID of "1" has expired, the MME can notify the CSG subscription status to the mobile terminal A. When the mobile terminal A, in step ST1704, receives the CSG subscription status transmitted thereto in step ST1703, and finding out the CSG ID of "1" which is the one for which the temporary time period has expired, the mobile terminal A deletes this CSG ID from the allowed CSG ID list stored therein. The MME, in step ST1705, ends the management of the subscription of the mobile terminal A to the CSG ID of "1", which is included in the CSG subscription status notified to the mobile terminal A in ST1703 and for which the temporary time period has expired, as an expired CSG subscription.

Variant 1 of Embodiment 2 can provide the following advantages. In accordance with Variant 1 of Embodiment 2, the mobile terminal can check to see the CSG subscription status thereof independently without receiving any command from the network side. When determining that there is a CSG subscription for which the temporary time period has expired, or a canceled CSG subscription as a result of checking to see the CSG subscription status thereof, the mobile terminal can delete the CSG ID from the allowed CSG ID list stored therein. As a result, Variant 1 of Embodiment 2 can provide the same advantages as those provided by Embodiment 2. Further, while the mobile terminal in accordance with Variant 1 of Embodiment 2 can independently operate without receiving any command from the network side in the same way that the mobile terminal in accordance with Embodiment 2 does, the mobile terminal in accordance with Variant 1 of Embodiment 2 inquires of the network side about the CSG subscription status thereof. Therefore, there can be provided a further advantage of being able to construct the mobile communication system in such a way that consistency between the mobile terminal and the network side is provided.

Embodiment 3

A problem to be solved by Embodiment 3 is the above-mentioned problem 2. Hereafter, Embodiment 3 shows another solution different from those shown in Embodiment 2 and Variant 1 of Embodiment 2. When the network side responds to a request which a mobile terminal has made through a CSG cell with a CSG ID different from a CSG ID for which the temporary time period has expired, a CSG cell with a CSG ID different from a CSG ID for which a CSG subscription is canceled, or a non-CSG cell, the network side notifies the CSG subscription status of the mobile terminal to the mobile terminal. The mobile terminal checks to see the CSG subscription status thereof, and, when finding out a CSG subscription for which the temporary time period has expired or and a canceled CSG subscription as a result of checking to see the CSG subscription status thereof, deletes the CSG ID from the allowed CSG ID list stored therein.

Three concrete examples of the request to the network side from the mobile terminal are disclosed below. (1) A message based on "E-UTRAN initial attach" which is a method of establishing an EPS (Evolved Packet system) bearer which the mobile terminal uses. (2) A message based on "UE triggered service Request" which is a method of setting up a user plane (u-plane) radio bearer which the mobile terminal uses. (3) A message based on "E-UTRAN Tracking Area update" which is a method of updating a tracking area which the mobile terminal uses.

A concrete example of an entity of the network side which transmits a response to the request made by the mobile terminal can be an MME, an HSS (Home Subscriber Server), or a base station (including a CSG cell or a non-CSG cell).

Three concrete examples of the response from the network side to the mobile terminal are disclosed below. (1) An accept, attach accept, or reject message which the network side transmits to the mobile terminal as a result of the "E-UTRAN initial attach" which is the method of establishing an EPS (Evolved Packet system) bearer, the E-UTRAN initial attach being executed by the mobile terminal. (2) An accept, attach accept, or reject message which the network side transmits to the mobile terminal as a result of the "UE triggered service Request" which is the method of setting up a user plane (u-plane) radio bearer, the UE triggered service Request being executed by the mobile terminal. (3) An accept, attach accept, or reject message which the network side transmits to the mobile terminal as a result of the "E-UTRAN Tracking Area update" which is the method of updating the tracking area, the E-UTRAN Tracking Area update being executed by the mobile terminal.

Because a concrete example of the CSG subscription status of the mobile terminal which is notified from the network side to the mobile terminal is the same as that shown in Variant 1 of Embodiment 2, the explanation of the concrete example is omitted hereafter.

A concrete example of a method of notifying the "CSG subscription status of the mobile terminal" to the mobile terminal, which the network side (an MME, a base station, or the like) uses, is disclosed below. (1) The network side notifies the CSG subscription status of the mobile terminal, or the like to the mobile terminal by using an established connection between the mobile terminal and network side after transmitting the above-mentioned response to the mobile terminal, like that according to Variant 1 of Embodiment 2. The network side notifies the CSG subscription status of the mobile terminal, or the like to the mobile terminal by using control information (c-plane) in the connection. In a further concrete example, the network side maps the CSG subscription status of the mobile terminal, or the like to a CCCH which is a logical channel, or a DCCH to transmit the information to the mobile terminal by using a transport channel DL-SCH and a physical channel PDSCH. Because of this, an increase in the amount of information of the PDSCH is accepted relatively easily when constructing the mobile communication system. Therefore, the notification of the "CSG subscription status of the mobile terminal" by using the PDSCH, which is newly provided by this embodiment, can provide an advantage of making it easy to construct the mobile communication system. (2) The network side notifies the CSG subscription status of the mobile terminal, or the like, as an information element of the above-mentioned response signal, to the mobile terminal. As a result, the base station does not have to perform a scheduling for new downlink data, and can provide an advantage of reducing the scheduling load imposed on the base station, and making effective use of radio resources.

Two concrete examples of a range in which the network side implements the solution shown in Embodiment 3 are disclosed below. (1) The network side implements the solution for the inside of an MME which manages a cell with a CSG ID for which the temporary time period has expired, or a cell with a CSG ID for which a CSG subscription is canceled. In a case in which an HSS manages the allowed CSG ID list managed by the network side, expired CSG subscriptions, etc., the number of MMES to which an HSS notifies the CSG subscription status of the mobile terminal can be limited. As a result, there can be provided an advantage of reducing the volume of traffic in the network side. Further, because the number of MMEs which implement Embodiment 3 is limited, there can be provided an advantage of reducing the processing load imposed on the MMEs. (2) The network side implements the solution for the entire range of the network. As a result, there can be provided an advantage of being able to implement Embodiment 3 also when the mobile terminal makes the request of the network side after the mobile terminal has moved within a wide area.

In addition, by implementing a solution as shown below, the mobile communication system can solve the above-mentioned problem 1. Two solutions are disclosed below. (1) Use this embodiment in combination with Embodiment 1 and Variant 1 of Embodiment 1. (2) The network side deletes the CSG ID for which the network side has notified the mobile terminal, as the "CSG subscription status of the mobile terminal", that the temporary time period has expired, for example, by using an ack to the mobile terminal, and which is registered for the mobile terminal from the target for the management of expired CSG subscriptions. As a result, the mobile communication system can be constructed in such a way as to, when the above-mentioned CSG ID is deleted from the allowed CSG ID list stored in the mobile terminal, end the management of the temporary subscription as an expired CSG subscription managed by the network while bringing the CSG ID into correspondence with the mobile terminal, thereby providing consistency between the mobile terminal and the network side. A concrete example of an entity of the network side is an MME, an HSS, or the like. (3) The network side deletes the CSG ID for which the network side has notified the mobile terminal, as the "CSG subscription status of the mobile terminal", that the CSG subscription is canceled, for example, by using an ack to the mobile terminal, and which is registered for the mobile terminal from the allowed CSG ID list managed by the network side. As a result, the mobile communication system can be constructed in such a way as to, when the above-mentioned CSG ID is deleted from the allowed CSG ID list stored in the mobile terminal, also delete the CSG ID from the allowed CSG ID list managed by the network side, thereby providing consistency between the mobile terminal and the network side. A concrete example of an entity of the network side is an MME, an HSS, or the like.

Further, when there exists a CSG ID which is deleted from the allowed CSG ID list stored in the mobile terminal, the mobile terminal can notify the user to that effect. As a result, the mobile communication system enables the user to know that a CSG ID is deleted from the allowed CSG ID list, and can provide a user-friendly communication environment for users. The time that the mobile terminal notifies the user that the mobile terminal has deleted a CSG ID can be a time before the mobile terminal deletes the information for identifying the CSG to which the mobile terminal has subscribed from the allowed CSG ID list stored therein, the time that the mobile terminal deletes the information for identifying the CSG, or a time after the mobile terminal deletes the information for identifying the CSG. As an alternative, the time that the mobile terminal notifies the user that the mobile terminal has deleted a CSG ID can be the time that the mobile terminal receives the CSG subscription status including the CSG subscription for which the temporary time period has expired or the canceled CSG subscription from the network side, or a time after the mobile terminal receives the CSG subscription status. Because a concrete example of a method of notifying the user to that effect is the same as that shown in Variant 1 of Embodiment 2, the explanation of the concrete example is omitted hereafter.

Figure 18:
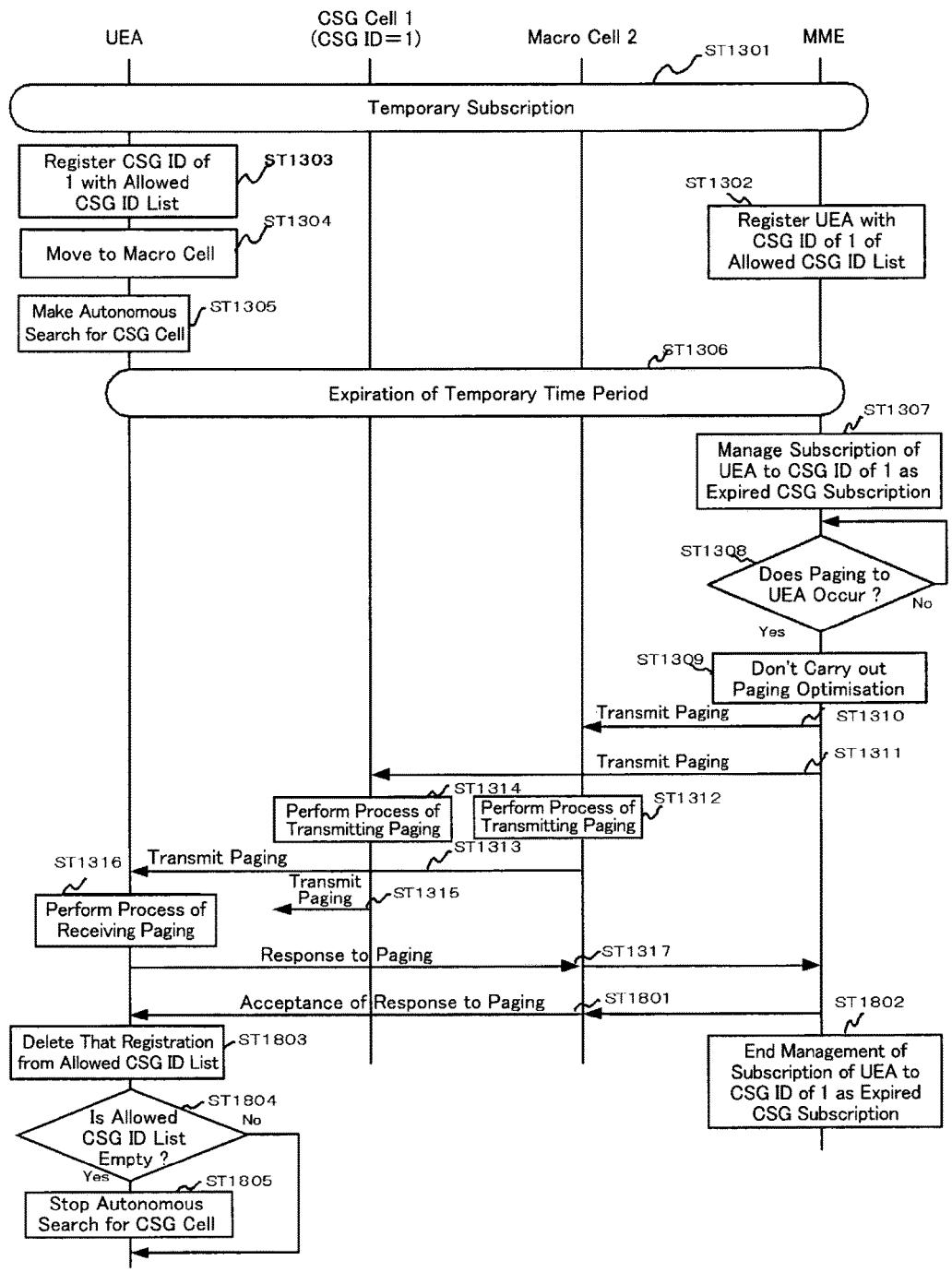
FIG. 18 is a sequence diagram of the operation of a mobile communication system according to a solution provided by Embodiment 3.

An example of the operation of the mobile communication system is shown in FIG. 18. Because the same reference numerals as those shown in FIG. 13 denote like parts, the explanation of the parts is omitted hereafter. An MME, in step ST1801, transmits a message about acceptance of a response to paging to a mobile terminal A through a macro cell 2. At this time, the MME also notifies the CSG subscription status of the mobile terminal A to the mobile terminal A. In this example of the operation, the MME notifies a CSG ID of "1" to the mobile terminal as a CSG subscription for which the temporary time period has expired. The MME, in step ST1802, deletes the CSG ID for which the MME has notified the mobile terminal, as the "CSG subscription status of the mobile terminal", that the temporary time period has expired, for example, by using the ack to the mobile terminal, and which is registered for the mobile terminal from the target for the management of expired CSG subscriptions. In this example of the operation, the MME deletes the CSG ID of "1" registered for the mobile terminal A from the target for the management of expired CSG subscriptions.

The mobile terminal A, in step ST1803, receives the CSG subscription status transmitted in step ST1801, and, when finding out a CSG subscription for which the temporary time period has expired or a canceled CSG subscription in the CSG subscription status, deletes the CSG ID from the allowed CSG ID list stored therein. In this example of the operation, the mobile terminal A recognizes the CSG ID of "1" as a CSG subscription for which the temporary time period has expired and deletes the CSG ID of "1" from the allowed CSG ID list stored therein. The mobile terminal A, in step ST1804, determines whether or not the allowed CSG ID list stored therein is empty. When the allowed CSG ID list is empty, the mobile terminal A shifts to step ST1805. In contrast, when the allowed CSG ID list is not empty, i.e. when a CSG ID is registered in the allowed CSG ID list, the mobile terminal A ends the processing without processing step ST1805. The mobile terminal A, in step ST1805, stops its autonomous search function of searching for a CSG cell.

Embodiment 3 can provide the following advantages. Even in a case in which the mobile terminal is granted a sufficiently long temporary time period at the time of making a temporary subscription and the mobile terminal then moves to outside the coverage of the cell with the CSG ID to which the mobile terminal has made the temporary subscription, the mobile communication system can end the management of the temporary subscription as an expired CSG subscription. As a result, the mobile communication system can prevent the number of temporary subscriptions which are managed as expired CSG subscriptions from increasing as the number of mobile terminals which temporarily subscribe the CSG increases. As a result, the above-mentioned problem 1 that the processing load imposed on the network side due to the management of expired CSG subscriptions increases can be solved.

Further, because the mobile communication system can end the management of a temporary subscription as an expired CSG subscription, the mobile communication system can carry out the paging optimisation, like that in accordance with Embodiment 1. As a result, the MME or the CSG cell with the CSG ID can eliminate a needless process of transmitting a paging to a mobile terminal for which the MME or the CSG cell does not have to support any service originally because the time period for a temporary subscription has expired, and needless radio resources and so on used for the paging transmission can be reduced.

Further, when finding out a CSG subscription for which the temporary time period has expired or a canceled CSG subscription in the notification from the network, the mobile terminal deletes the CSG ID from the allowed CSG ID list stored therein. As a result, this embodiment can provide the same advantages as those provided by Embodiment 2. Further, because the mobile terminal in accordance with Embodiment 3 checks to see the CSG subscription status thereof notified thereto from the network side, there can be provided a further advantage of being able to construct the mobile communication system in such a way that consistency between the mobile terminal and the network side is provided.

In accordance with the currently-used method, a CSG cell with a CSG ID which is not included in the allowed CSG ID list stored in the mobile terminal does not fall within the target for the automatic mode of the mobile terminal. This results in an advantage of preventing the mobile terminal from making an unnecessary request or performing unnecessary transmission of a TAU of or to a cell from which the mobile terminal cannot receive any service because of unsubscription to a CSG. While this Embodiment 3 inherits the fact that a CSG cell with a CSG ID which is not included in the allowed CSG ID list stored in the mobile terminal does not fall within the target for the automatic mode of the mobile terminal, and also inherits the above-mentioned advantage, Embodiment 3 can solve the problem 1 and the problem 2.

Further, in accordance with Embodiment 3, the notification of the CSG subscription status from the network side to the mobile terminal can include the following information. The notification can include not only a CSG ID for which the temporary time period has expired or a CSG ID for which a CSG subscription has been canceled, but also a CSG ID to which a temporary subscription has been made or a CSG ID to which a CSG subscription has been made. In this case, information showing whether the CSG ID is added or deleted, or information that the CSG ID is added or deleted can also be transmitted.

As a result, there can be provided an advantage of solving the problem 3 as follows. Even though the mobile terminal does not make a reselection in the manual mode while being served by a cell with a CSG ID to which the mobile terminal newly makes a subscription, the mobile terminal can register the CSG ID to which the mobile terminal has newly made the subscription into the allowed CSG ID list stored therein without user intervention. As a result, even in a case of making a subscription to a CSG ID in advance, the mobile terminal can select a cell with the CSG ID to which the mobile terminal has newly made the subscription when making a reselection operation in the automatic mode. Therefore, the mobile communication system can be constructed to be user-friendly.

Further, because after the mobile terminal newly subscribes to a CSG, the CSG ID of this CSG is registered into the allowed CSG ID list stored in the mobile terminal at an early time, there hardly occurs a situation that because the CSG ID has been registered, but is not included in the allowed CSG ID list stored in the mobile terminal even though the cell is essentially the best one for this mobile terminal, the mobile terminal excludes the cell from the target for the automatic mode, and hence the mobile terminal does not select the cell as a destination for camping on or a destination for handover when the mobile terminal is making a phone call. As a result, the mobile communication system prevents the mobile terminal from selecting another cell which is not the best one, thereby preventing the transmission power from increasing unnecessarily in both the mobile terminal and the base station. The mobile communication system can thus suppress the interference.

Further, while Embodiment 3 inherits the fact that a CSG cell with a CSG ID which is not included in the allowed CSG ID list stored in the mobile terminal does not fall within the target for the automatic mode of the mobile terminal, and also inherits the above-mentioned advantage of preventing the mobile terminal from making an unnecessary request or performing unnecessary transmission of a TAU of or to a cell from which the mobile terminal cannot receive any service because of unsubscription to a CSG, Embodiment 3 can solve the problem 3.

Variant 1 of Embodiment 3

A problem to be solved by Variant 1 of Embodiment 3 is explained below. Unless the mobile terminal makes any request even in the case that the solution provided by Embodiment 3 is implemented, the above-mentioned problem 2 remains to be solved. A periodic tracking area update is provided in accordance with the currently-used method. This periodic tracking area update is applied when the system information of the mobile terminal indicates that the periodic tracking area update should be applied (Chapter 4.5.3 of Nonpatent reference 8).

A solution provided by this Variant 1 of Embodiment 3 is shown below. In addition to the operation shown in Embodiment 3, the mobile terminal which has made a temporary subscription carries out a periodic tracking area update. As an alternative, the mobile terminal which has made a temporary subscription can carry out a periodic tracking area update even though the mobile terminal does not receive any command from the network side. The mobile terminal which has made a temporary subscription can also carry out a periodic tracking area update even when the system information does not indicate that the periodic tracking area update should be applied The mobile terminal carries out an "E-UTRAN Tracking Area update" as an example of a concrete operation. Because the mobile terminal can use the method of determining whether or not the subscription is a temporary one or a normal one (having no setup of the temporary time period), which is disclosed in Embodiment 2, as a concrete example of a method of determining whether the mobile terminal has made a temporary subscription, the explanation of the concrete example is omitted hereafter.

Further, the mobile terminal can continue carrying out the periodic tracking area update until the mobile terminal receives a notification included in the notification of the CSG subscription status thereof from the network side and showing that the temporary time period for the temporary subscription has expired. As a result, there can be provided an advantage of eliminating the necessity to needlessly continue carrying out the periodic tracking area update, thereby making effective use of radio resources and reducing the power consumption of the mobile terminal.

Further, in accordance with Variant 1 of Embodiment 3, the mobile terminal which has made a CSG subscription can carry out the periodic tracking area update in addition to the operation shown in Embodiment 3. Further, when a CSG ID to which the mobile terminal has made a subscription is included in the allowed CSG ID list stored in the mobile terminal, the mobile terminal can carry out the periodic tracking area update.

Variant 1 of Embodiment 3 can provide the following advantage in addition to those provided by Embodiment 3. Because the mobile terminal carries out the tracking area update periodically, the mobile terminal makes a TAU request periodically. As a result, there can be provided an advantage of being able to shorten the time period during which the above-mentioned problem 2 continues arising.

Variant 2 of Embodiment 3

A problem to be solved by Variant 2 of Embodiment 3 is explained below. The case that the solution provided by Variant 1 of Embodiment 3 is implemented is examined below. In a case in which the period of the periodic tracking area update is set to be short in order to shorten the time period during which the problem 2 continues arising, a mobile terminal which has made neither a temporary subscription nor a CSG subscription carries out the tracking area update at intervals which are shorter than required when the mobile terminal is commanded to apply the periodic tracking area update. As a result, there arises a problem that needless use of radio resources occurs and the power consumption of the mobile terminal increases. In contrast, in a case in which the period of the periodic tracking area update is set to be long in consideration of the operation of a mobile terminal which has made neither a temporary subscription nor a CSG subscription, there arises again a problem that the time period during which the problem 2 continues arising becomes long.

A solution provided by this Variant 2 of Embodiment 3 is shown below. In addition to the solutions provided by Embodiment 3 and Variant 1 of Embodiment 3, two different periods are provided for the periodic tracking area update. Further, these two different periods are used separately in such a way that a first one of them is used for mobile terminals each of which has made neither a temporary subscription nor a CSG subscription while a second one of them is used for mobile terminals each of which has made either a temporary subscription or a CSG subscription. The above-mentioned two different periods are notified from the network side to the mobile terminal by using system information.

As an alternative, the mobile terminal can decide the period set for mobile terminals each of which has made either a temporary subscription or a CSG subscription by itself. As a result, there can be provided an advantage of being able to reduce the amount of information which is transmitted from the network side to the mobile terminal, and making effective use of radio resources.

Further, the mobile terminal can continue carrying out the periodic tracking area update using the period set for mobile terminals each of which has made either a temporary subscription or a CSG subscription until the mobile terminal receives a notification showing that the temporary time period for the temporary subscription has expired as a notification of the CSG subscription status from the network side. After receiving the notification showing that the temporary time period for the temporary subscription has expired as a notification of the CSG subscription status from the network side, the mobile terminal carries out the periodic tracking area update using the period set for mobile terminals each of which has made neither a temporary subscription nor a CSG subscription. As a result, there can be provided an advantage of eliminating the necessity to needlessly continue carrying out the periodic tracking area update, thereby making effective use of radio resources and reducing the power consumption of the mobile terminal.

In addition to the advantages provided by Embodiment 3 and Variant 1 of Embodiment 3, Variant 2 of Embodiment 3 can provide the following advantages. The periods of the periodic tracking area update can be used separately in such a way that the first one (1) of them is used for mobile terminals each of which has made neither a temporary subscription nor a CSG subscription while the second one (2) of them is used for mobile terminals each of which has made either a temporary subscription or a CSG subscription. Therefore, there can be provided an advantage of preventing a mobile terminal which has made neither a temporary subscription nor a CSG subscription from carrying out the tracking area update at intervals which are shorter than required, and making the period set for mobile terminals each of which has made either a temporary subscription or a CSG subscription adjustable. As a result, there can be provided an advantage of enabling the mobile communication system to adjust the time period during which the above-mentioned problem 2 continues arising with flexibility to shorten the time period.

Embodiment 4

A problem to be solved by Embodiment 4 is the above-mentioned problem 2. Hereafter, Embodiment 4 shows a solution different from those shown in Embodiment 2, Variant 1 of Embodiment 2, Embodiment 3, Variant 1 of Embodiment 3, and Variant 2 of Embodiment 3.

When there is a change in the allowed CSG ID list for a mobile terminal, which is managed by the network side, the network side notifies this change to the mobile terminal. The mobile terminal which has received the notification responds to this notification. The network side notifies the allowed CSG ID list for the mobile terminal, which is managed thereby, to the mobile terminal by using an established connection between the mobile terminal and the network side. The network side notifies the allowed CSG ID list for the mobile terminal, which is managed thereby, to the mobile terminal by using control information (c-plane) in the connection. The mobile terminal overwrites or updates the allowed CSG ID list stored therein by using the allowed CSG ID list managed by the network side which the mobile terminal has received.

A change in the allowed CSG ID list managed by the network side occurs concretely when the mobile terminal makes a subscription to a new CSG, when a CSG subscription which the mobile terminal has made is canceled, when the temporary time period for a temporary subscription which the mobile terminal has made has expired, or when the temporary time period for the mobile terminal is changed. A concrete example of an entity of the network side which notifies the change to the mobile terminal is an MME, an HSS, or the like. Further, the MME, the HSS, or the like notifies the change to the mobile terminal through one or a plurality of base stations (including a CSG cell and a non-CSG cell) belonging to one or a plurality of tracking areas with which the mobile terminal is registered. As a concrete example of the time that the MME, the HSS, or the like notifies the change to the mobile terminal, there can be considered a time before or after the allowed CSG ID list for the mobile terminal which is managed by the network side is changed, or the time that the allowed CSG ID list is changed.

As a concrete example of a method of notifying the change from the network side to the mobile terminal, there is a method of notifying the change in the allowed CSG ID list for the mobile terminal, which is managed by the network side, to the mobile terminal by using a paging method.

Figure 19:
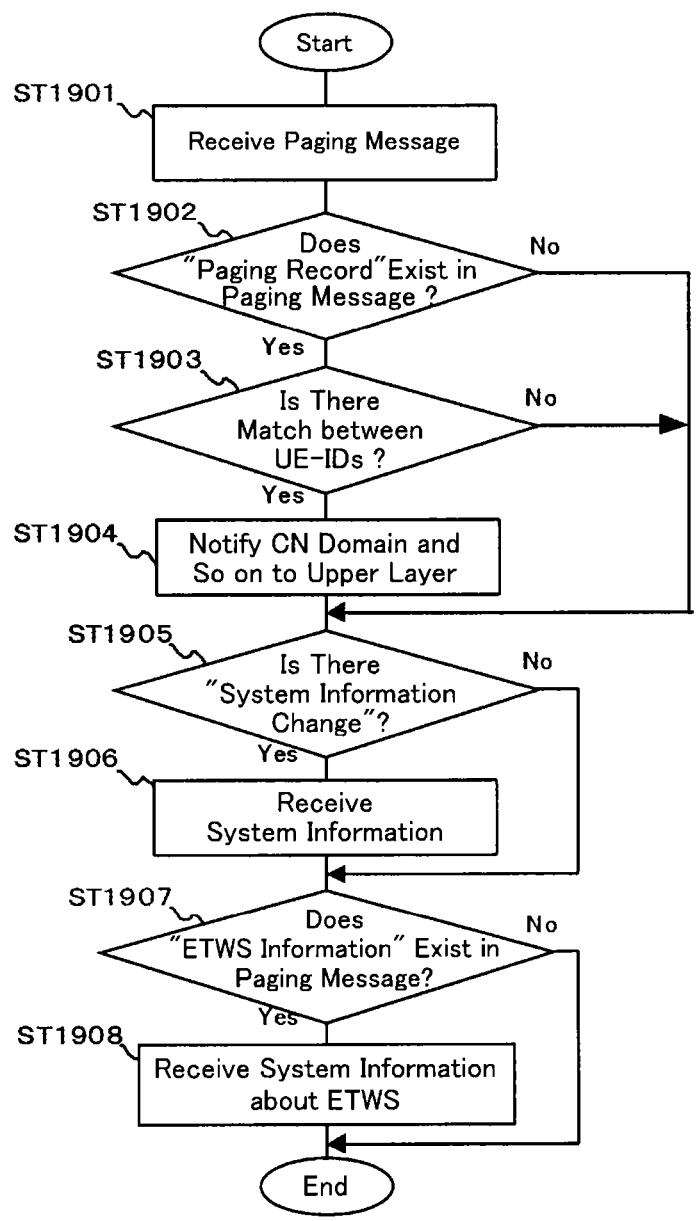
FIG. 19 is a flow chart showing the operation of a mobile terminal according to a conventional paging procedure.

First, the operation of the mobile terminal using a conventional paging method is explained below with reference to FIG. 19. The mobile terminal, in step ST1901, receives a paging message. The mobile terminal, in step ST1902, determines whether paging record information exists in the paging message. When paging record information exists in the paging message, the mobile terminal shifts to step ST1903. In contrast, when no paging record information exists in the paging message, the mobile terminal shifts to step ST1905. The mobile terminal, in step ST1903, determines whether the identifier of the mobile terminal included in the paging record matches that of the mobile terminal which is assigned by an upper layer. In other words, the mobile terminal determines whether or not the paging record is the one destined for the mobile terminal. When the identifier of the mobile terminal included in the paging record matches that of the mobile terminal which is assigned by the upper layer, i.e. when the paging record is the one destined for the mobile terminal, the mobile terminal shifts to step ST1904. In contrast, when the identifier of the mobile terminal included in the paging record does not match that of the mobile terminal which is assigned by the upper layer, i.e. when the paging record is not the one destined for the mobile terminal, the mobile terminal shifts to step ST1905. The mobile terminal, in step ST1904, notifies the identifier of a core network domain (CN domain) and that of the mobile terminal to the upper layer. The mobile terminal, in step ST1905, determines whether information showing a change in the system information, also referred to as "SysteminforModification", exists in the paging message. When the information showing a change in the system information exists in the paging message, the mobile terminal shifts to step ST1906. In contrast, when no information showing a change in the system information exists in the paging message, the mobile terminal shifts to step ST1907. The mobile terminal, in step ST1906, performs reception of the system information. The mobile terminal, in step ST1907, determines whether information showing ETWS (Earthquake and Tsunami Warning System) information, also referred to as "etws-Indication", exists in the paging message. When the information showing ETWS information exists in the paging message, the mobile terminal shifts to step ST1908. In contrast, when no information showing ETWS information exists in the paging message, the mobile terminal ends the processing. The mobile terminal, in step ST1908, receives the information about ETWS.

Three concrete examples of the method of notifying a change in the allowed CSG ID list of the mobile terminal which is managed by the network side to the mobile terminal by using the paging method, the notifying method being used by the network side, are disclosed below.

(1) The network side transmits a paging message to the mobile terminal when there is a change in the allowed CSG ID list managed by the network side. By including the identifier assigned to the mobile terminal in the paging message, the network side transmits the identifiable information to the mobile terminal. The network side can use a paging record based on a conventional method. By using a conventional paging message, the mobile communication system can provide an advantage of being able to add the new function while avoiding the complexity of the mobile communication system. Because the operation of the mobile terminal when the network side notifies a change in the allowed CSG ID list to the mobile terminal by using the method (1) is the same as that shown in FIG. 19, the explanation of the operation is omitted hereafter.

(2) The network side notifies a paging message to the mobile terminal when there is a change in the allowed CSG ID list managed by the network side. Unlike in the case of using the method (1), information different from a paging record based on a conventional method is provided newly. Hereinafter, this new information is referred to as an "allowed CSG ID list change indicator". The "allowed CSG ID list change indicator" is information identifiable by using the identifier assigned to the mobile terminal. As a result, when a change has occurred in the allowed CSG ID list for a mobile terminal which is managed by the network side, the network side can notify the change only to the mobile terminal. As a result, there can be provided an advantage of preventing needless processing load resulting from a mobile terminal for which no change has occurred in the allowed CSG ID list managed by the network side from being imposed on the mobile communication system. Further, by disposing the "allowed CSG ID list change indicator" separately from the conventional "paging record", the mobile communication system enables the mobile terminal or the user to perform a flexible operation. For example, according to either the processing load or the like imposed on the mobile terminal or the user's convenience, intention, or the like, the mobile terminal promptly performs a post-"paging record" reception process associated with call receiving processing, while the mobile terminal performs a post-"allowed CSG ID list change indicator" reception process not associated with the call receiving processing after the processing load imposed on the mobile terminal is reduced.

Figure 20:
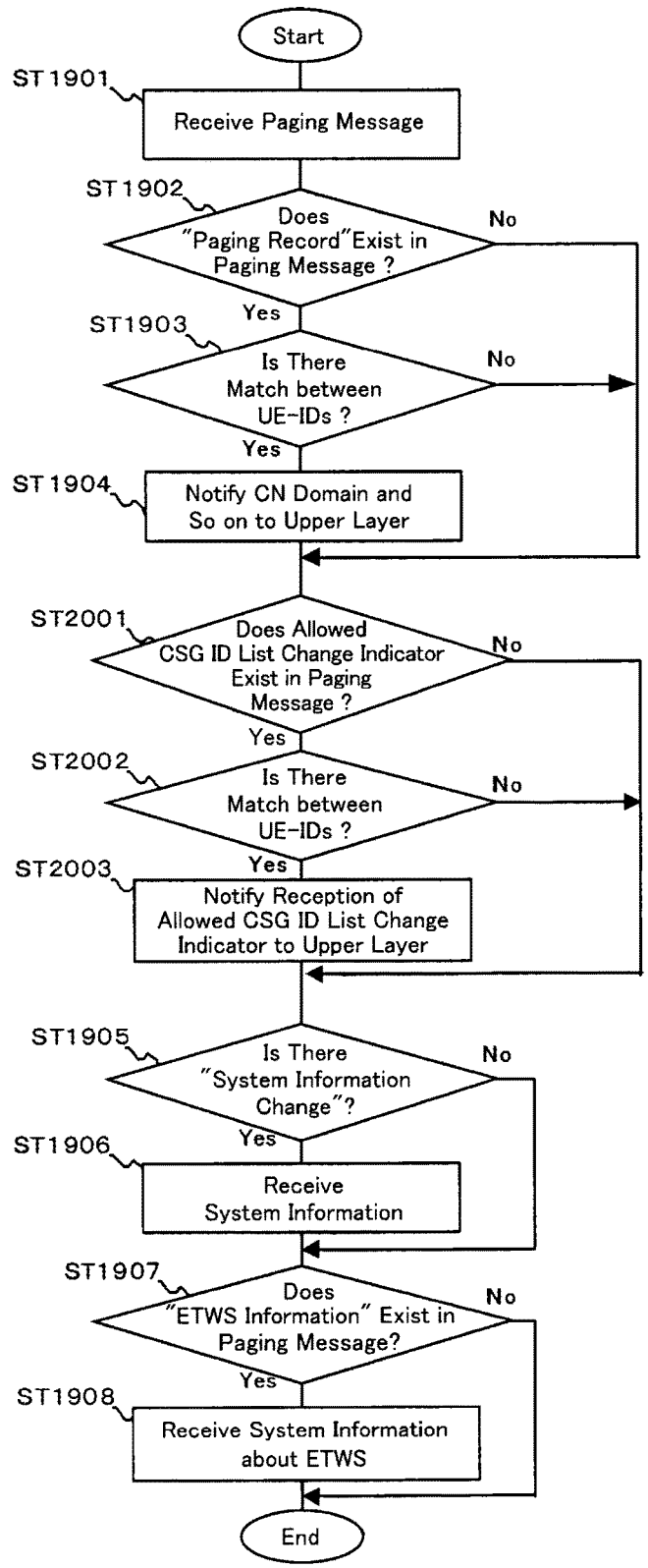
FIG. 20 is a flow chart showing the operation of a mobile terminal according to a solution based on a notification method (2) of Embodiment 4.

An example of the operation of the mobile terminal when the network side notifies a change in the allowed CSG ID list to the mobile terminal by using the method (2) is shown in FIG. 20. Because the same reference numerals as those shown in FIG. 19 denote like parts, the explanation of the parts is omitted hereafter. The mobile terminal, in step ST1902, determines whether paging record information exists in the paging message. When paging record information exists in the paging message, the mobile terminal shifts to step ST1903. In contrast, when no paging record information exists in the paging message, the mobile terminal shifts to step ST2001. The mobile terminal, in step ST1903, determines whether the identifier of the mobile terminal included in the paging record matches that of the mobile terminal which is assigned by an upper layer. In other words, the mobile terminal determines whether or not the paging record is the one destined for the mobile terminal. When the identifier of the mobile terminal included in the paging record matches that of the mobile terminal which is assigned by the upper layer, i.e. when the paging record is the one destined for the mobile terminal, the mobile terminal shifts to step ST1904. In contrast, when the identifier of the mobile terminal included in the paging record does not match that of the mobile terminal which is assigned by the upper layer, i.e. when the paging record is not the one destined for the mobile terminal, the mobile terminal shifts to step ST2001. The mobile terminal, in step ST2001, determines whether an "allowed CSG ID list change indicator" exists in the paging message. When an "allowed CSG ID list change indicator" exists in the paging message, the mobile terminal shifts to step ST2002. In contrast, when no "allowed CSG ID list change indicator" exists in the paging message, the mobile terminal shifts to step ST1905. The mobile terminal, in step ST2002, determines whether the identifier of the mobile terminal included in the "allowed CSG ID list change indicator" matches that of the mobile terminal which is assigned by the upper layer. In other words, the mobile terminal determines whether or not the "allowed CSG ID list change indicator" is the one destined for the mobile terminal. When the identifier of the mobile terminal included in the "allowed CSG ID list change indicator" matches that of the mobile terminal which is assigned by the upper layer, i.e. when the "allowed CSG ID list change indicator" is the one destined for the mobile terminal, the mobile terminal shifts to step ST2003. In contrast, when the identifier of the mobile terminal included in the "allowed CSG ID list change indicator" does not match that of the mobile terminal which is assigned by the upper layer, i.e. when the "allowed CSG ID list change indicator" is not the one destined for the mobile terminal, the mobile terminal shifts to step ST1905. The mobile terminal, in step ST2003, reports the reception of the "allowed CSG ID list change indicator" and the identifier of the mobile terminal to the upper layer.

(3) The network side transmits a paging message to the mobile terminal when there is a change in the allowed CSG ID list managed by the network side. In a paging record based on a conventional method, conventional incoming call information and the information newly added in this embodiment and showing that there is a change in the allowed CSG ID list managed by the network side are disposed separately. As a result, in addition to the same advantage as that provided by the method (2), there is provided an advantage of being able to reduce the number of times that the comparison between the identifier of the mobile terminal included in the message and that of the mobile terminal assigned by the upper layer needs to be made from twice for the "paging record" and for the "allowed CSG ID list change indicator" (steps ST1903 and ST2002 of FIG. 20) in the case of using the method (2) to once (step ST1903 of FIG. 21 which is mentioned below). This can lead to low power consumption of the mobile terminal.

Figure 21:
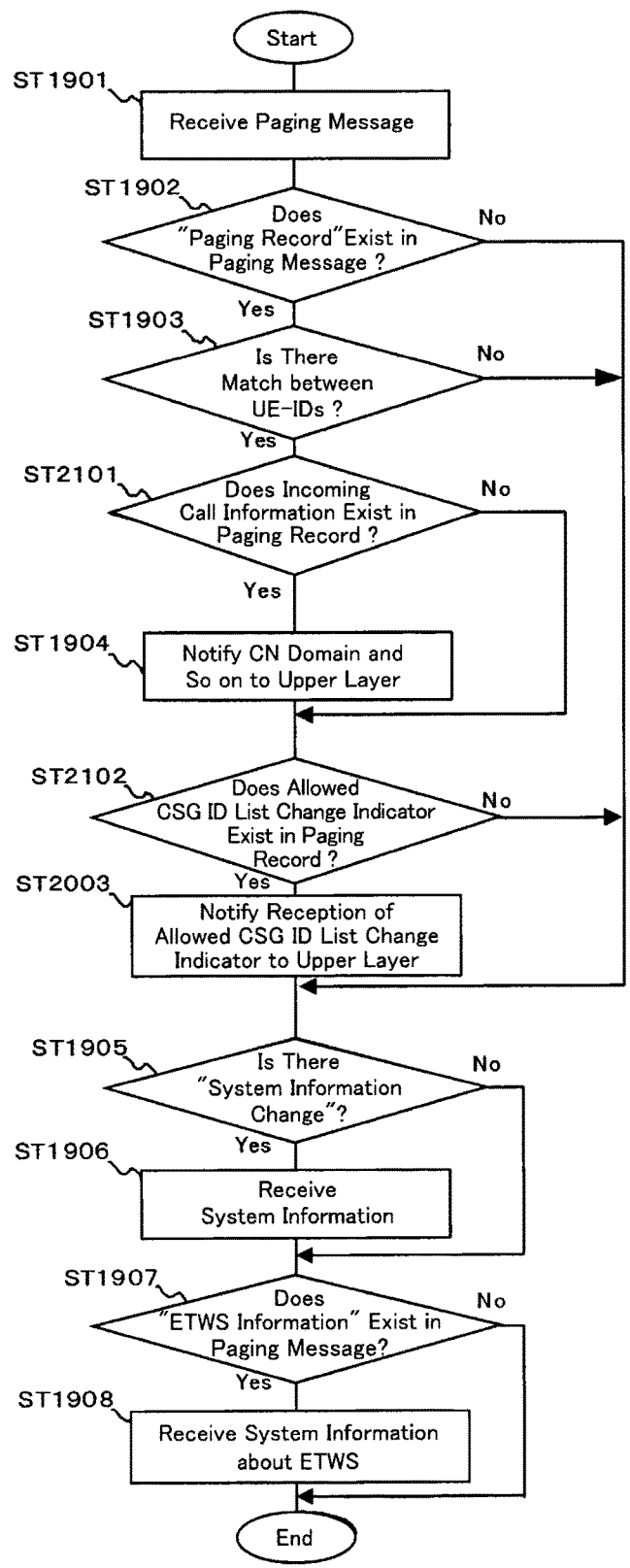
FIG. 21 is a flow chart showing the operation of a mobile terminal according to a solution based on a notification method (3) of Embodiment 4.

An example of the operation of the mobile terminal when the network side notifies a change in the allowed CSG ID list to the mobile terminal by using the method (3) is shown in FIG. 21. Because the same reference numerals as those shown in FIGS. 19 and 20 denote like parts, the explanation of the parts is omitted hereafter. The mobile terminal, in step ST1902, determines whether paging record information exists in the paging message. When paging record information exists in the paging message, the mobile terminal shifts to step ST1903. In contrast, when no paging record information exists in the paging message, the mobile terminal shifts to step ST1905. The mobile terminal, in step ST1903, determines whether the identifier of the mobile terminal included in the paging record matches that of the mobile terminal which is assigned by an upper layer. In other words, the mobile terminal determines whether or not the paging record is the one destined for the mobile terminal. When the identifier of the mobile terminal included in the paging record matches that of the mobile terminal which is assigned by the upper layer, i.e. when the paging record is the one destined for the mobile terminal, the mobile terminal shifts to step ST2101. In contrast, when the identifier of the mobile terminal included in the paging record does not match that of the mobile terminal which is assigned by the upper layer, i.e. when the paging record is not the one destined for the mobile terminal, the mobile terminal shifts to step ST1905. The mobile terminal, in step ST2101, determines whether or not incoming call information is included in the paging record. The mobile terminal can alternatively determine whether or not incoming call information is included in an information area included in the paging record and matching the identifier of the mobile terminal. In other words, the mobile terminal determines whether an incoming call destined for the mobile terminal has come. When incoming call information is included in the paging record, i.e. when an incoming call destined for the mobile terminal has come, the mobile terminal shifts to step ST1904. In contrast, when no incoming call information is included in the paging record, i.e. when no incoming call destined for the mobile terminal has come, the mobile terminal shifts to step ST2102. The mobile terminal, in step ST2102, determines whether an "allowed CSG ID list change indicator" exists in the paging record. The mobile terminal can alternatively determine whether or not an "allowed CSG ID list change indicator" is included in an information area included in the paging record and matching the identifier of the mobile terminal. When an "allowed CSG ID list change indicator" exists in the paging record, the mobile terminal shifts to step ST2003. In contrast, when no "allowed CSG ID list change indicator" exists in the paging record, the mobile terminal shifts to step ST1905.

In addition, by implementing a solution as shown below, the mobile communication system can solve the above-mentioned problem 1. Three solutions are disclosed below. (1) Use this embodiment in combination with Embodiment 1 and Variant 1 of Embodiment 1. (2) When notifying the mobile terminal of a change in the allowed CSG ID list managed by the network side, such as a deletion of a CSG ID or an update, the network side deletes the CSG ID from the allowed CSG ID list for the mobile terminal which is managed by the network side, stops the addition of the CSG ID for the mobile terminal to the management of expired CSG subscriptions, or removes the CSG ID for the mobile terminal from the target for the management of expired CSG subscriptions. As a result, when the above-mentioned CSG ID is deleted from the allowed CSG ID list stored in the mobile terminal, the mobile communication system can end the management of the temporary subscription as either the allowed CSG ID list managed by the network side or an expired CSG subscription while bringing the CSG ID into correspondence with the mobile terminal. Accordingly, the mobile communication system can be constructed in such a way that consistency is provided between the mobile terminal and the network side. (3) After the network side notifies the mobile terminal of a change in the allowed CSG ID list managed by the network side, such as a deletion of a CSG ID or an update, a connection is established between the mobile terminal and the network side. When the network side notifies the allowed CSG ID list for the mobile terminal which is managed thereby to the mobile terminal by using this connection, the network side deletes the CSG ID from the allowed CSG ID list of the mobile terminal which is managed by the network side, stops the addition of the CSG ID for the mobile terminal to the target for the management of expired CSG subscriptions, or removes the CSG ID for the mobile terminal from the target for the management of expired CSG subscriptions. As a result, when the above-mentioned CSG ID is deleted from the allowed CSG ID list stored in the mobile terminal, the mobile communication system can end the management of the temporary subscription as either the allowed CSG ID list managed by the network side or an expired CSG subscription while bringing the CSG ID into correspondence with the mobile terminal. Accordingly, the mobile communication system can be constructed in such a way that consistency is provided between the mobile terminal and the network side.

Figure 22:
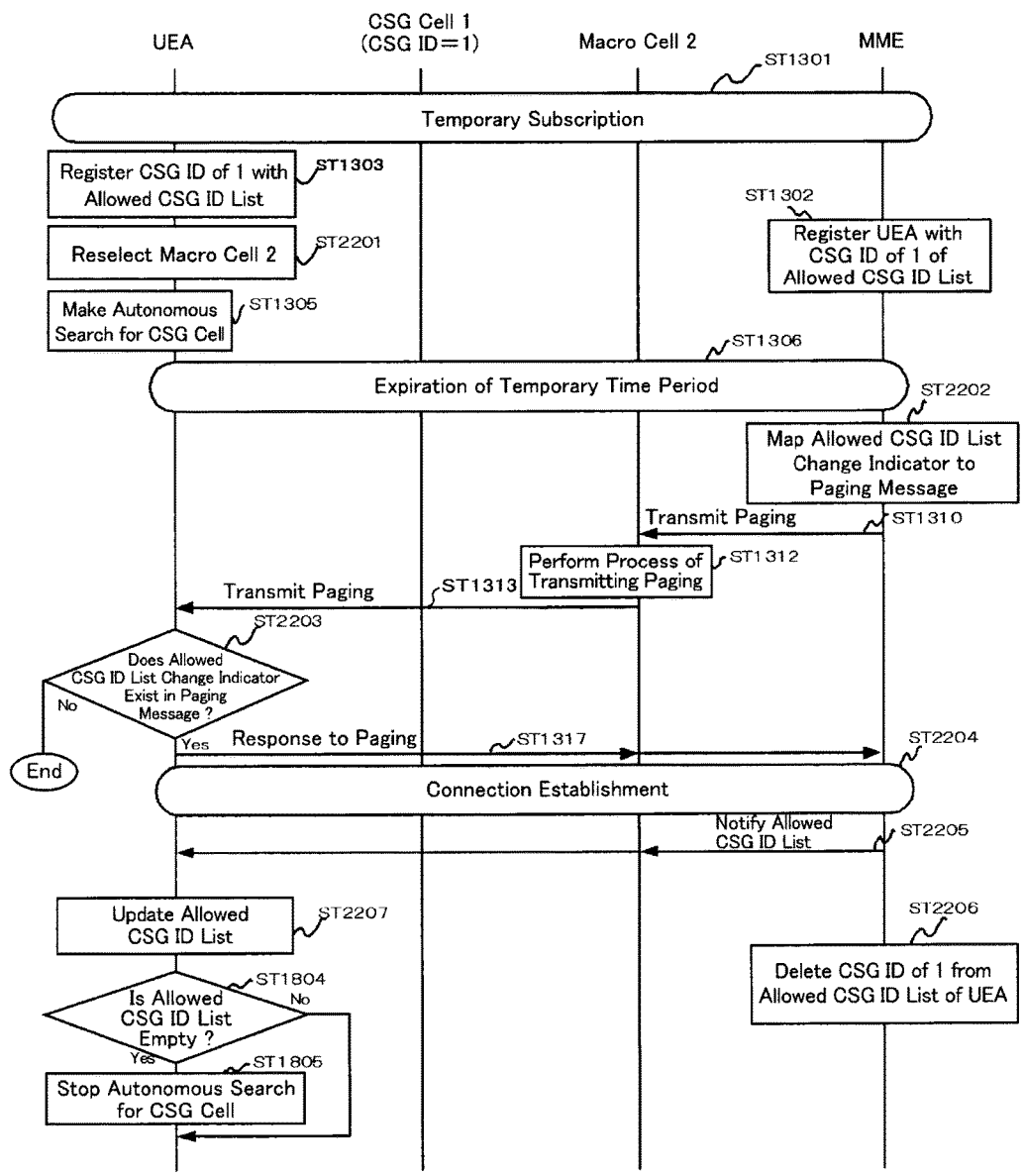
FIG. 22 is a sequence diagram of the operation of a mobile communication system according to a solution provided by Embodiment 4.

An example of the operation of the mobile communication system is shown in FIG. 22. Because the same reference numerals as those shown in FIGS. 13 and 18 denote like parts, the explanation of the parts is omitted hereafter. A mobile terminal A, in step ST2201, moves from a CSG cell 1 with a CSG ID of "1" to a macro cell 2 (cell-reselects the macro cell 2). Because a change has occurred in the allowed CSG ID list for the mobile terminal A, which is managed by the network side, i.e. because the temporary time period for a temporary subscription of the mobile terminal A to the CSG ID of "1" has expired, an MME, in step ST2202, notifies this change to the mobile terminal. In a concrete example, the MME maps an "allowed CSG ID list change indicator" to a paging message. The mobile terminal A, in step ST2203, receives a paging from the macro cell 2, and carries out a paging receiving process. Because a concrete example of the operation of the mobile terminal at the time of receiving the paging message is as explained with reference to FIGS. 20 and 21, the detailed explanation of the concrete example is omitted hereafter. The mobile terminal A determines whether an "allowed CSG ID list change indicator" exists in the paging message. When an "allowed CSG ID list change indicator" exists in the paging message, the mobile terminal shifts to step ST1317. In contrast, when no "allowed CSG ID list change indicator" exists in the paging message, the mobile terminal shifts to a process which is not a characterized part of this embodiment. Therefore, the explanation of the process is omitted. The mobile terminal A, in step ST2204, establishes a connection between itself and the network side.

The MME, in step ST2205, notifies the allowed CSG ID list for the mobile terminal A which is managed by the network side to the mobile terminal A by using the connection established in step ST2204. Because a change, which is caused by a deletion, has occurred in the allowed CSG ID list for the mobile terminal A which is managed by the network side, when, in step ST2205, notifying the allowed CSG ID list for the mobile terminal A which is managed by the network side to the mobile terminal A, the MME, in step ST2206, deletes the CSG ID from the allowed CSG ID list for the mobile terminal A which is managed by the network side. In this example of the operation, the MME deletes the CSG ID of "1" from the allowed CSG ID list for the mobile terminal A which is managed by the network side. The mobile terminal A, in step ST2207, overwrites or updates the allowed CSG ID list stored in the mobile terminal by using the allowed CSG ID list managed by the network side which the mobile terminal receives in step ST2205.

Further, when the allowed CSG ID list stored in the mobile terminal is changed, the mobile terminal can notify the user to that effect. As a result, the mobile communication system enables the user to know the current CSG ID subscription status, and can provide a user-friendly communication environment for users. Three concrete examples of a method of notifying the user to that effect are disclosed below. (1) The mobile terminal displays the information thereon or on a display to which the mobile terminal is connected. The information displayed can be the current CSG subscription list, the CSG ID for which a change (addition, deletion, or update) has been made, or the type of the change. (2) The mobile terminal notifies the user to that effect by using a notification sound. (3) The mobile terminal notifies the user to that effect by using a vibrator function.

Embodiment 4 can provide the following advantages. Even in a case in which the mobile terminal is granted a sufficiently long temporary time period at the time of making a temporary subscription and the mobile terminal then moves to outside the coverage of the cell with the CSG ID to which the mobile terminal has made the temporary subscription, immediately after the temporary time period has expired, the mobile communication system can notify this expiration of the subscription to the mobile terminal. In accordance with this Embodiment 4, because when the change has occurred in the allowed CSG ID list managed by the network side, the network can notify the expiration of the subscription to the mobile terminal on its own, there is provided an advantage of being able to make the notification regardless of whether the mobile terminal has made a request operation. The mobile communication system can end the management of the temporary subscription as an expired CSG subscription or stop a start of the management of a temporary subscription as an expired CSG subscription. The mobile communication system can also prevent the number of temporary subscriptions which are managed as expired CSG subscriptions from increasing as the number of mobile terminals which temporarily subscribe the CSG increases. As a result, the above-mentioned problem 1 that the processing load imposed on the network side due to the management of expired CSG subscriptions increases can be solved.

Further, because the mobile communication system can end the management of a temporary subscription as an expired CSG subscription, the mobile communication system can carry out the paging optimisation, like that in accordance with Embodiment 1. As a result, the MME or the CSG cell with the CSG ID can eliminate a needless paging transmitting process of transmitting a paging to a mobile terminal for which the MME or the CSG cell does not have to support any service originally because the time period for a temporary subscription has expired or a CSG subscription has been canceled, and needless radio resources and so on used for the paging transmission can be reduced.

Further, the mobile terminal can update the allowed CSG ID list stored therein according to the notification of the allowed CSG ID list managed by the network side from the network. As a result, the same advantages as those provided by Embodiment 2 can be provided. Further, because the mobile terminal in accordance with Embodiment 4 updates the allowed CSG ID list stored therein according to the notification of the allowed CSG ID list managed by the network side from the network side, there can be provided a further advantage of being able to construct the mobile communication system in such a way that consistency between the mobile terminal and the network side is provided.

Further, in accordance with the currently-used method, a CSG cell with a CSG ID which is not included in the allowed CSG ID list stored in the mobile terminal does not fall within the target for the automatic mode of the mobile terminal. This results in an advantage of preventing the mobile terminal from making an unnecessary request or performing unnecessary transmission of a TAU of or to a cell from which the mobile terminal cannot receive any service because of unsubscription to the CSG. While this Embodiment 4 inherits the fact that a CSG cell with a CSG ID which is not included in the allowed CSG ID list stored in the mobile terminal does not fall within the target for the automatic mode of the mobile terminal, and also inherits the above-mentioned advantage, Embodiment 4 can solve the problem 1 and the problem 2.

Further, the mobile terminal in accordance with Embodiment 4 updates the allowed CSG ID list stored therein according to the notification of the allowed CSG ID list managed by the network side from the network. As a result, there can be provided an advantage of solving the problem 3 as follows. Even though the mobile terminal does not make a reselection in the manual mode while being served by a cell with a CSG ID to which the mobile terminal newly makes a subscription, the mobile terminal can register the CSG ID to which the mobile terminal has newly made the subscription into the allowed CSG ID list stored therein without user intervention. As a result, even in a case of making a subscription to a CSG ID in advance, the mobile terminal can select a cell with the CSG ID to which the mobile terminal has newly made the subscription when performing a reselection operation in the automatic mode. Therefore, the mobile communication system can be constructed to be user-friendly.

Further, because after the mobile terminal newly subscribes to a CSG, the CSG ID of this CSG is registered into the allowed CSG ID list stored in the mobile terminal at an early time, there hardly occurs a situation that because the CSG ID has been registered, but is not included in the allowed CSG ID list stored in the mobile terminal even though the cell is essentially the best one for this mobile terminal, the mobile terminal excludes the cell from the target for the automatic mode, and hence the mobile terminal does not use the cell as a destination for camping on or a destination for handover when the mobile terminal is making a phone call. As a result, the mobile communication system prevents the mobile terminal from selecting another cell which is not the best one, thereby preventing the transmission power from increasing unnecessarily in both the mobile terminal and the base station. The mobile communication system can thus suppress the interference. Further, while Embodiment 4 inherits the fact that a CSG cell with a CSG ID which is not included in the allowed CSG ID list stored in the mobile terminal does not fall within the target for the automatic mode of the mobile terminal, and also inherits the advantage of preventing the mobile terminal from making an unnecessary request or performing unnecessary transmission of a TAU of or to a cell from which the mobile terminal cannot receive any service because of unsubscription to the CSG, Embodiment 4 can solve the problem 3.

Variant 1 of Embodiment 4

A problem to be solved by Variant 1 of Embodiment 4 is explained below. In the case that the solution provided by Embodiment 4 is implemented, the following new problem arises when there area large number of types of CSGs to which the mobile terminal subscribes. There arises a problem that when the network side notifies the allowed CSG ID list managed thereby to the mobile terminal (in step ST2205 of FIG. 22 as a concrete example), the amount of information transmitted via a wireless section increases and therefore needless use of radio resources occurs.

A solution provided by Variant 1 of Embodiment 4 is shown below. When there is a change in the allowed CSG ID list for the mobile terminal which is managed by the network side, the network side notifies this change to the mobile terminal. The mobile terminal which has received the notification responds to this notification. The network side notifies not all of the allowed CSG ID list for the mobile terminal which is managed by the network side, but information about a part associated with the change to the mobile terminal by using a connection established between the mobile terminal and the network side. The network side notifies not all of the allowed CSG ID list for the mobile terminal which is managed by the network side, but the information about the part associated with the change to the mobile terminal by using control information (c-plane) in the connection. The mobile terminal overwrites or updates the allowed CSG ID list stored in the mobile terminal by using the received information about the part associated with the change in the allowed CSG ID list managed by the network side.

Hereafter, a portion different from Embodiment 4 is explained mainly. The network side notifies not all of the allowed CSG ID list for the mobile terminal which is managed by the network side, but only information about a CSG ID which is deleted (including a CSG ID for which the temporary time period has expired) or a CSG ID which is added as the information about the part associated with the change. Two concrete examples of a method of transmitting the information about the part associated with the change are disclosed below. (1) The network side notifies both the type of the change and the CSG ID associated with the change to the mobile terminal by way of the connection established between the mobile terminal and the network side. Concrete examples of the type of the change include information showing whether the change is addition or deletion, information showing whether or not the change is addition, and information showing whether or not the change is deletion. (2) The network side notifies the type of the change to the mobile terminal by using a paging message and then notifies the CSG ID associated with the change to the mobile terminal by way of the connection established between the mobile terminal and the network side. Concrete examples of the type of the change are the same as those according to the method (1).

Variant 1 of Embodiment 4 can provide the following advantage in addition to the advantages provided by Embodiment 4. The amount of information required for the notification of the allowed CSG ID list managed by the network side from the network side to the mobile terminal can be reduced, and needless use of radio resources, which is pronounced particularly when there is a larger number of types of CSGs to which the mobile terminal subscribes, can be reduced.

Variant 2 of Embodiment 4

A problem to be solved by Variant 2 of Embodiment 4 is explained below.

In the case that the solution provided by Embodiment 4 or Variant 1 of Embodiment 4 is implemented, it is necessary to establish a connection between the network and the mobile terminal (step ST2204 of FIG. 22 as a concrete example). A procedure for notifying a change in the allowed CSG ID list after waiting for establishment of a connection between them causes the occurrence of a control delay in the mobile communication system.

A solution provided by Variant 2 of Embodiment 4 is shown below. When there is a change in the allowed CSG ID list for the mobile terminal which is managed by the network side, the network side notifies this change to the mobile terminal. The network side includes information about apart associated with the change in the information about the change notification or in the allowed CSG ID list managed by the network side, and transmits either the change notification or the allowed CSG ID list together with the change notification to the mobile terminal. This mobile terminal overwrites or updates the allowed CSG ID list stored therein by using the information about the part associated with the change which is included in the received allowed CSG ID lists managed by the network side.

Hereafter, a portion different from Embodiment 4 is explained mainly. The network side includes information about a part associated with the change in the information about the change notification or in the allowed CSG ID list managed by the network side, and transmits either the change notification or the allowed CSG ID list together with the change notification to the mobile terminal. The network side can alternatively transmit the information about the part associated with the change to the mobile terminal by using a paging method. The network side can alternatively map the information about the part associated with the change to a paging message destined for the mobile terminal. A concrete example of the method is disclosed below. The information about the part associated with the change can be information about a CSG ID which is deleted (including a CSG ID for which the temporary time period has expired) or a CSG ID which is added. Three concrete examples of the method of transmitting the information about the part associated with the change are disclosed below. (1) In the case of using the method (2) in accordance with Embodiment 4 which is a concrete example of notifying the change to the mobile terminal, the network side includes the information about the part associated with the change in an "allowed CSG ID list change indicator" and transmits this indicator to the mobile terminal, or transmits the information about the part associated with the change, together with the "allowed CSG ID list change indicator", to the mobile terminal. (2) In the case of using the method (3) in accordance with Embodiment 4 which is a concrete example of notifying the change to the mobile terminal, the network side includes the information about the part associated with the change in "information showing that there is a change in the allowed CSG ID list managed by the network side" and transmits this information to the mobile terminal, or transmits the information about the part associated with the change, together with the "allowed CSG ID list change indicator", to the mobile terminal.

Figure 23:
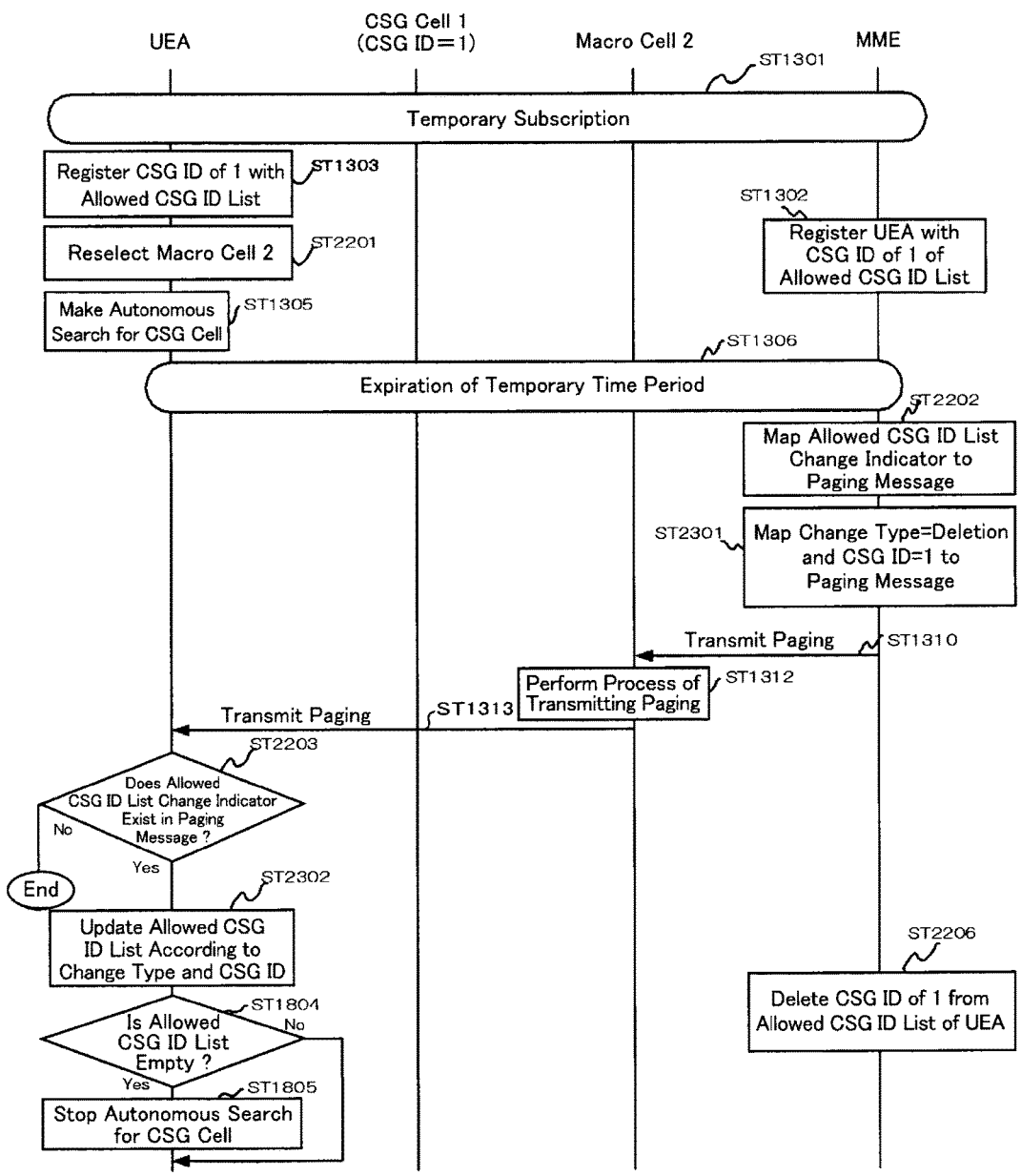
FIG. 23 is a sequence diagram of the operation of a mobile communication system according to a solution provided by Variant 2 of Embodiment 4.

An example of the operation of the mobile communication system is shown in FIG. 23. Because the same reference numerals as those shown in FIGS. 13, 18 and 22 denote like parts, the explanation of the parts is omitted hereafter. An MME, in step ST2301, maps the information about the part associated with the change in the allowed CSG ID list managed by the network side to a paging message. In this example of the operation, the MME maps "deletion", as the type of the change, and a "CSG ID" of "1", as the CSG ID associated with change, to the paging message. The mobile terminal A, in step ST2302, updates the allowed CSG ID list stored therein according to the type of the change and the CSG ID associated with the change which are included in the paging message which the mobile terminal receives in step ST1313.

Variant 2 of Embodiment 4 can provide the following advantage in addition to the advantages provided by Embodiment 4 and Variant 1 of Embodiment 4. The network side can notify a change in the allowed CSG ID list managed by the network side to the mobile terminal by using the paging method without having to wait for both a response to paging from the mobile terminal and establishment of a connection between the network and the mobile terminal which is made after receiving a response to paging from the mobile terminal. As a result, there can be provided an advantage of preventing a control delay from occurring in the mobile communication system.

Embodiment 5

A problem to be solved by Embodiment 5 is explained below. A case in which the temporary time period expires when a mobile terminal is making a phone call while being served by a CSG cell with a CSG ID to which the mobile terminal has made a temporary subscription is considered below. Because the temporary time period for the temporary subscription has expired, the mobile terminal becomes a non-CSG member for the CSG. Therefore, the CSG cell with the CSG does not have to provide any service for the mobile terminal. Thus, in a case in which the temporary time period expires when a mobile terminal is making a phone call while being served by a CSG cell with a CSG ID to which the mobile terminal has made a temporary subscription, the connection with the CSG cell is disconnected, and this results in inconvenience for the user.

A solution provided by Embodiment 5 is shown below. In a case in which the temporary time period expires when a mobile terminal is making a phone call while being served by a CSG cell with a CSG ID to which the mobile terminal has made a temporary subscription, the network side extends the temporary time period. As an alternative, the network side delays the start of the management of the CSG ID for the mobile terminal as an expired CSG subscription. After extending the temporary time period and the extension has expired, the network side manages the CSG ID for the mobile terminal as an expired CSG subscription. As an alternative, the network side delays deleting the CSG ID for the mobile terminal from the allowed CSG ID list managed by the network side. After extending the temporary time period and the extension has expired, the network side deletes the CSG ID for the mobile terminal from the allowed CSG ID list managed by the network side. As an alternative, also in a case in which the mobile terminal has handed over to another CSG cell with the same CSG ID as that to which the mobile terminal has made a temporary subscription, the network side can carry out the above-mentioned process when the temporary time period expires.

A concrete example of an entity of the network side which extends the temporary time period is an MME, an HSS, or the like.

The extension period which is the extension of the temporary time period or the delay time by which the start of the management of the CSG ID as an expired CSG subscription is delayed is referred to as the "temporary extension period" from here on. Three concrete examples of the temporary extension period are disclosed below. (1) Define a given time period as the temporary extension period. This given time period can be static or semi-static. If the mobile terminal is making a phone call while being served by the CSG cell with the CSG ID even after the temporary time period is extended by the given time period, the temporary time period can be extended again by the given time period. (2) Define a time period during which the mobile terminal continues making a phone call (also referred to as RRC connected, connected mode, or connected state) as the temporary extension period. In other words, a time period which elapses until the mobile terminal shifts from the active state to an idle state (also referred to as RRC idle, idle mode, or idle state) is defined as the temporary extension period. (3) Define a time period which elapses until the mobile terminal carries out a handover from the CSG cell with the CSG ID to another CSG cell not with the CSG ID, an open mode, or a macro cell as the temporary extension period. A combination of some of above-mentioned (1), (2), and (3) can be used.

In addition, by implementing a solution as shown below, the mobile communication system can solve the above-mentioned problems 1, 2, and 3 at a time. Two solutions are disclosed below. (1) Use this embodiment in combination with Embodiment 1, Variant 1 of Embodiment 1, Embodiment 2, Variant 1 of Embodiment 2, Embodiment 3, Variant 1 of Embodiment 3, Variant 2 of Embodiment 3, Embodiment 4, Variant 1 of Embodiment 4, or Variant 2 of Embodiment 4.

(2) The network side notifies the mobile terminal that the temporary time period has expired by using a connection established between the network side and the mobile terminal when the mobile terminal shifts from the active state to the idle state. The network side notifies the mobile terminal that the temporary time period has expired by using control information (c-plane) in the connection. A concrete example of information showing that the temporary time period has expired is information for identifying the CSG for which the temporary time period has expired. Because a concrete example of the information for identifying the CSG for which the temporary time period has expired is the same as that shown in Embodiment 1, the explanation of the concrete example is omitted hereafter. As a result, in the mobile communication system in which the mobile terminal is allowed to make a temporary subscription to a plurality of CSGs, the network side can correctly notify the mobile terminal of to which CSG the temporary subscription whose temporary time period has expired has been made. A concrete example of an entity of the network side is an MME, an HSS, or the like. The network side which has notified the mobile terminal that the temporary time period has expired ends the management of the CSG ID as an expired CSG subscription while bringing the CSG ID into correspondence with the mobile terminal, or does not start the management of the CSG ID for the mobile terminal as an expired CSG subscription. Further, the mobile terminal which has received the notification showing that the temporary time period has expired deletes the CSG ID from the allowed CSG ID list stored therein. Accordingly, the mobile communication system can be constructed in such a way that consistency is provided between the mobile terminal and the network side.

Figure 24:
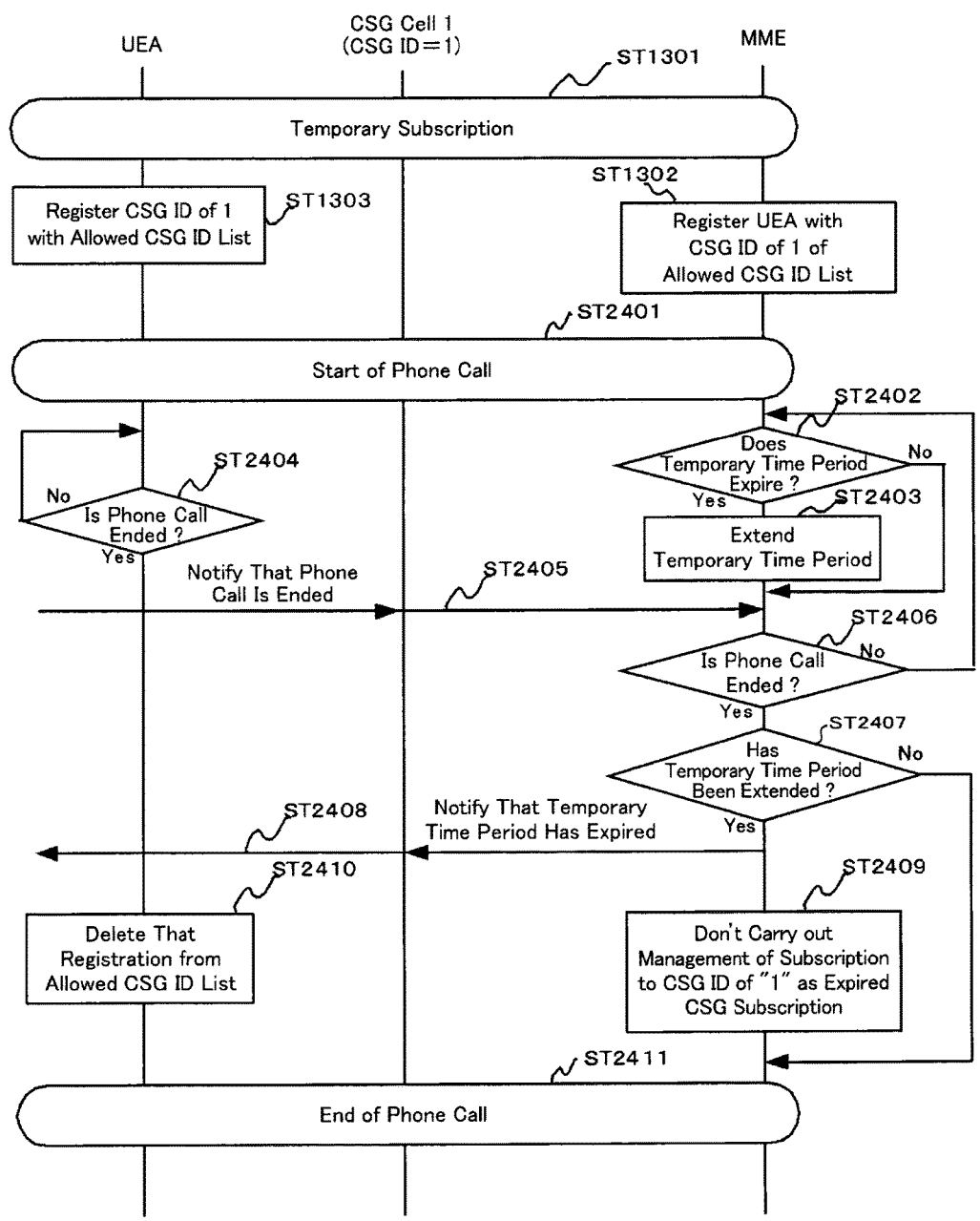
FIG. 24 is a sequence diagram of the operation of a mobile communication system according to a solution provided by Embodiment 5 in a case of using a concrete example (1) for a "temporary extension time period"

A case in which the concrete example (1) is used as the "temporary extension period" is shown in FIG. 24 as an example of the operation of the mobile communication system. Because the same reference numerals as those shown in FIG. 13 denote like parts, the explanation of the parts is omitted hereafter. A mobile terminal A, in step ST2401, starts making a phone call while being served by a CSG cell 1 with a CSG ID of "1" to which the mobile terminal has made a temporary subscription as a serving cell. An MME, in step ST2402, determines whether the temporary time period for the temporary subscription with which the mobile terminal is making the phone call expires. When the temporary time period expires, the MME shifts to step ST2403. In contrast, when the temporary time period does not expire, the MME shifts to step ST2406. The MME, in step ST2403, extends the temporary time period for the temporary subscription with which the mobile terminal is making the phone call by a given time period.

The mobile terminal A, in step 2404, determines whether the user or the like has ended the phone call. When the user or the like has ended the phone call, the mobile terminal shifts to step ST2405. In contrast, when the user or the like has not ended the phone call, the mobile terminal repeats the determination of step ST2404. The mobile terminal A, in step ST2405, notifies the MME that the user or the like has ended the phone call. The MME, in step ST2406, determines whether or not to end the phone call. When ending the phone call, the MME shifts to step ST2407. In contrast, when not ending the phone call, the MME returns to step ST2402.

The MME, in step ST2407, determines whether the MME has extended the temporary time period for the temporary subscription with which the mobile terminal is making the phone call. More specifically, the MME determines whether the original temporary time period for the temporary subscription made by the mobile terminal A has expired. When having extended the temporary time period or when the original temporary time period has expired, the MME shifts to step ST2408. When not having extended the temporary time period and the original temporary time period has not expired, the MME shifts to step ST2411.

The MME, in step ST2408, notifies the mobile terminal that the temporary time period has expired through the CSG cell with the CSG ID associated with the temporary subscription. In this example of the operation, the MME transmits the information to the mobile terminal through the CSG cell 1. The MME, in step ST2409, does not start managing the CSG ID associated with the subscription as an expired CSG subscription. In this example of the operation, the MME does not start the management of the CSG ID of "1" for the mobile terminal A as an expired CSG subscription. The mobile terminal A, in step ST2410, deletes the CSG ID from the allowed CSG ID list thereof. In this example of the operation, the mobile terminal A deletes the CSG ID of "1" from the allowed CSG ID list thereof. The mobile terminal A, in step ST2411, ends the phone call.

The series of processes in steps ST2407 to ST2410 do not have to be carried out. Further, the order in which the series of processes in steps ST2407 to ST2410 and the process in step ST2411 are carried out is arbitrary.

Figure 25:
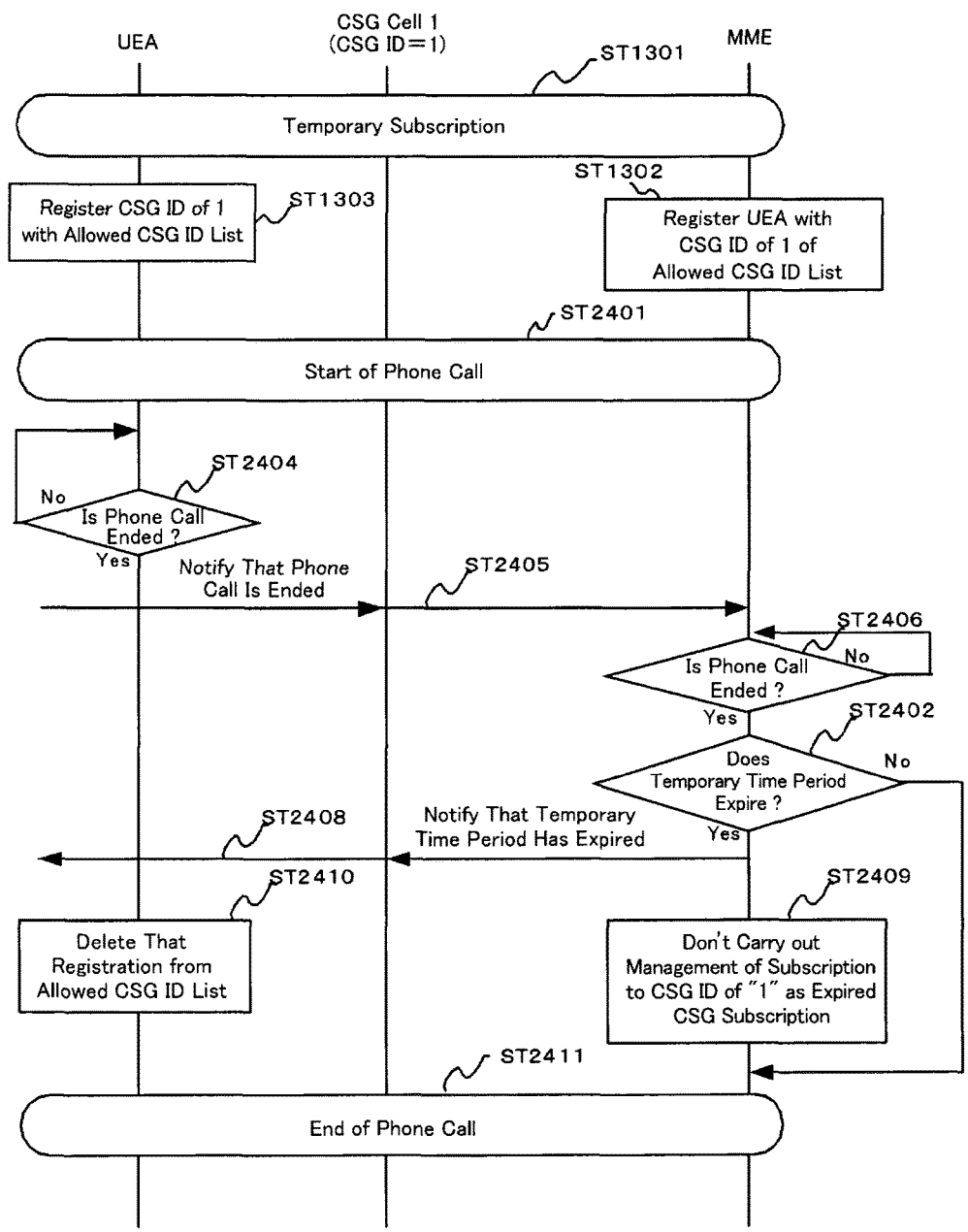
FIG. 25 is a sequence diagram of the operation of a mobile communication system according to the solution provided by Embodiment 5 in a case of using a concrete example (2) for the "temporary extension time period"

A case in which the concrete example (2) is used as the "temporary extension period" is shown in FIG. 25 as an example of the operation of the mobile communication system. Because the same reference numerals as those shown in FIGS. 13 and 24 denote like parts, the explanation of the parts is omitted hereafter. The MME, in step ST2406, determines whether or not to end the phone call. When ending the phone call, the MME shifts to step ST2402. In contrast, when not ending the phone call, the MME repeats the determination of step ST2406. The MME, in step ST2402, determines whether the temporary time period for the temporary subscription with which the mobile terminal is making the phone call expires. When the temporary time period expires, the MME shifts to step ST2408. In contrast, when the temporary time period does not expire, the MME shifts to step ST2411.

Further, when receiving the notification showing that the temporary time period has expired or when deleting the CSG ID associated with the temporary subscription from the allowed CSG ID list, the mobile terminal can notify the user to that effect. As a result, the mobile communication system enables the user to know that the temporary time period has expired, and can provide a user-friendly communication environment for users.

Three concrete examples of a method of notifying the user to that effect are disclosed below. (1) The mobile terminal displays the information thereon or on a display to which the mobile terminal is connected. The information displayed can be the CSG ID for which the local temporary time period has expired. (2) The mobile terminal notifies the user to that effect by using a notification sound. (3) The mobile terminal notifies the user to that effect by using a vibrator function.

Embodiment 5 can provide the following advantages. Even in a case in which the temporary time period has expired when a mobile terminal is making a phone call while being served by a CSG cell with a CSG ID to which the mobile terminal has made a temporary subscription, the mobile communication system enables the mobile terminal to continue the phone call and can therefore provide a user-friendly communication environment for the user.

Further, the mobile communication system can end the management of the temporary subscription as an expired CSG subscription or stop a start of the management of a temporary subscription as an expired CSG subscription. The mobile communication system can also prevent the number of temporary subscriptions which are managed as expired CSG subscriptions from increasing as the number of mobile terminals which temporarily subscribe the CSG increases.

As a result, the above-mentioned problem 1 that the processing load imposed on the network side due to the management of expired CSG subscriptions increases can be solved.

Further, because the mobile communication system can end the management of a temporary subscription as an expired CSG subscription, the mobile communication system can carry out the paging optimisation, like that in accordance with Embodiment 1. As a result, the MME or the CSG cell with the CSG ID can eliminate a needless paging transmitting process of transmitting a paging to a mobile terminal for which the MME or the CSG cell does not have to support any service originally because the time period for a temporary subscription has expired or a CSG subscription has been canceled, and needless radio resources and so on used for the paging transmission can be reduced.

Further, because the mobile terminal can delete the CSG ID associated with the temporary subscription from the allowed CSG ID list stored therein in response to the notification from the network showing that the temporary time period has expired, the problem 2 can be solved. As a result, the same advantages as those provided by Embodiment 2 can be provided.

Variant 1 of Embodiment 5

Because a problem to be solved by Variant 1 of Embodiment 5 is the same as that solved by Embodiment 5, the explanation of the problem is omitted hereafter.

A solution provided by Variant 1 of Embodiment 5 is shown below. The network side carries out a handover in a case in which the temporary time period expires when the mobile terminal is making a phone call while being served by a CSG cell with a CSG ID to which the mobile terminal has made a temporary subscription. Conventionally, being triggered by a measurement report from the mobile terminal, a handover is carried out under the initiative of the network. In contrast, according to the solution provided by this embodiment, not being triggered by a measurement report from the mobile terminal, but being trigged because the temporary time period for a temporary subscription has expired or immediately before the temporary time period for a temporary subscription expires, the network side initiates a handover. As an alternative, being trigged by deletion of a CSG subscription, the network side can initiate a handover.

In addition, by implementing a solution as shown below, the mobile communication system can solve the above-mentioned problems 1, 2, and 3 at a time. Two solutions are disclosed below. (1) Use this variant in combination with Embodiment 1, Variant 1 of Embodiment 1, Embodiment 2, Variant 1 of Embodiment 2, Embodiment 3, Variant 1 of Embodiment 3, Variant 2 of Embodiment 3, Embodiment 4, Variant 1 of Embodiment 4, or Variant 2 of Embodiment 4.

(2) The network side sends a message indicating that the temporary time period for the temporary subscription has expired to the mobile terminal by using a connection established between the network side and the mobile terminal when the mobile terminal is in the active state. The network side sends a message indicating that the temporary time period for the temporary subscription has expired to the mobile terminal by using control information (c-plane) in the connection. A concrete example of the information showing that the temporary time period has expired is information for identifying the CSG for which the temporary time period has expired. Because a concrete example of the information for identifying the CSG for which the temporary time period has expired is the same as that shown in Embodiment 1, the explanation of the concrete example is omitted hereafter. As a result, in the mobile communication system in which the mobile terminal is allowed to make a temporary subscription to a plurality of CSGs, the network side can correctly notify the mobile terminal of to which CSG the temporary subscription whose temporary time period has expired has been made. A concrete example of an entity of the network side is an MME, an HSS, or the like. The MME, the HSS, or the like sends a message indicating that the temporary time period for the temporary subscription has expired to the mobile terminal through a source cell or a target cell. The network side which has notified the mobile terminal that the temporary time period has expired ends the management of the CSG ID as an expired CSG subscription while bringing the CSG ID into correspondence with the mobile terminal, or does not start the management of the CSG ID for the mobile terminal as an expired CSG subscription. Further, the mobile terminal which has received the message indicating that the temporary time period has expired deletes the CSG ID from the allowed CSG ID list stored therein. Accordingly, the mobile communication system can be constructed in such a way that consistency is provided between the mobile terminal and the network side.

Figure 26:
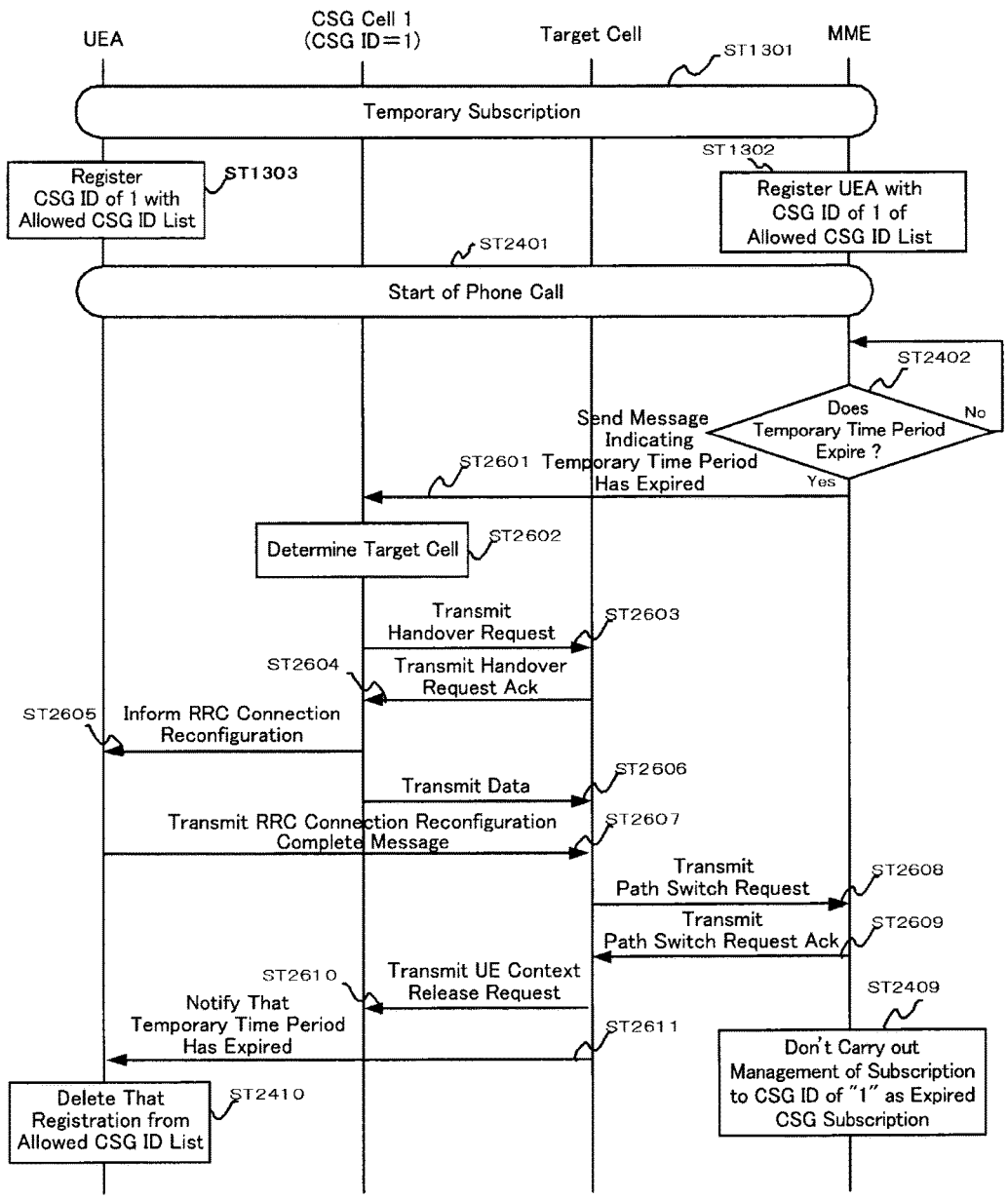
FIG. 26 is a sequence diagram of the operation of a mobile communication system according to a solution provided by Variant 1 of Embodiment 5.

An example of the operation of the mobile communication system is shown in FIG. 26. Because the same reference numerals as those shown in FIGS. 13 and 24 denote like parts, the explanation of the parts is omitted hereafter. An MME, in step ST2402, determines whether the temporary time period for a temporary subscription with which a mobile terminal is making a phone call expires. When the temporary time period expires, the MME shifts to step ST2601. In contrast, when the temporary time period does not expire, the MME repeats the determination of step ST2402. The MME, in step ST2601, sends a message indicating that the temporary time period for the temporary subscription has expired to a CSG cell, which is a serving cell, with the CSG ID to which the mobile terminal has made the temporary subscription. In this example of the operation, the MME sends a message indicating that the temporary time period for the temporary subscription of the mobile terminal A has expired to the CSG cell 1. Being triggered by reception in step ST2601 of the message indicating that the temporary time period for the mobile terminal A has expired from the MME, the CSG cell 1, in step ST2602, initiates a handover process on the mobile terminal A. In a concrete example of the handover process, the CSG cell 1 decides the target cell which is the handover destination of the mobile terminal A.

The MME can decide the target cell. In this case, the MME can carry out the processes in steps ST2603 and ST2604. In addition, the MME can transmit information about the target cell which the MME has decided to a source cell (in this example of the operation, the CSG cell 1) by using an S1 interface. As an alternative, the target cell can transmit the information about the target cell to the source cell by using an X2 interface. When the MME has the allowed CSG ID list managed by the network side, there can be provided an advantage of making it easy for the mobile terminal to select a "suitable cell" as the target cell.

The CSG cell 1, in step ST2603, transmits a handover request to the target cell decided in step ST2602. At that time, the CSG cell 1 can transmit information showing that the handover request is triggered because the temporary time period for a temporary subscription to the target cell has expired. This information can be added as an information element of the handover request. The target cell, in step ST2604, transmits a handover request ack to the CSG cell 1. The CSG cell 1, in step ST2605, transmits an RRC connection reconfiguration message to the mobile terminal A. The information about the target cell is included in the RRC connection reconfiguration message. As a concrete example of the information about the target cell, there is a new temporary mobile terminal identifier (also referred to as C-RNTI), information about the security algorithm of the target cell, RACH allocation information, or the system information about the target cell. The CSG cell 1, in step ST2606, transmits data about the mobile terminal A to the target cell in order to make it possible to carry out the handover. At that time, the CSG cell 1 can transmit the information showing that the handover request is triggered because the temporary time period for a temporary subscription to the target cell has expired.

The mobile terminal A, in step ST2607, transmits an RRC connection reconfiguration complete message to the target cell. The target cell, in step ST2608, transmits a path switch request message concerning the mobile terminal A to the MME. The MME, in step ST2609, transmits a path switch request ack message concerning the mobile terminal A to the target cell. At that time, the MME can transmit information showing that the path switch is triggered because the temporary time period for a temporary subscription to the target cell has expired. The MME can add this information as an information element of the path switch request ack message. In response to the path switch request message received in step ST2608, the MME, in step ST2409, does not start the management of the CSG ID associated with the subscription as an expired CSG subscription. In this example of the operation, the MME does not start the management of the CSG ID of "1" for the mobile terminal A as an expired CSG subscription. By notifying the CSG cell, which is a serving cell, with the CSG ID to which the mobile terminal has made the temporary subscription that the temporary time period for the temporary subscription has expired, the MME, in step ST2601, can perform the process in step ST2409. The target cell, in step ST2610, notifies the CSG cell 1 that the CSG cell 1 can delete the data associated with the mobile terminal A. In a concrete example, the target cell notifies the CSG cell 1 that the CSG cell 1 can release the "UE context" of the mobile terminal A.

The target cell, in step ST2611, notifies the mobile terminal A that the temporary time period for the temporary subscription has expired. In response to the notification in step ST2611 showing that the temporary time period for this temporary subscription has expired, the mobile terminal A, in step ST2410, deletes the CSG ID from the allowed CSG ID list thereof. In this example of the operation, the mobile terminal A deletes the CSG ID of "1" from the allowed CSG ID list thereof. The serving cell can transmit the information which the MME, in step ST2601, transmits to the serving cell to the mobile terminal. In this case, when the mobile terminal receives the information, the MME, in step ST2601, can perform the process in step ST2409. Further, the CSG cell 1 which is the serving cell, in step ST2605, includes the information showing that the temporary time period for the temporary subscription has expired in the RRC connection reconfiguration message which the CSG cell transmits to the mobile terminal A, or transmits the information, together with the RRC connection reconfiguration message, to the mobile terminal. In this case, when the mobile terminal receives the information in step ST2605, the MME can perform the process in step ST2409.

Further, when receiving the notification showing that the temporary time period has expired or when deleting the CSG ID associated with the temporary subscription from the allowed CSG ID list, the mobile terminal can notify the user to that effect. As a result, the mobile communication system enables the user to know that the temporary time period has expired, and can provide a user-friendly communication environment for users.

Three concrete examples of a method of notifying the user to that effect are disclosed below. (1) The mobile terminal displays the information thereon or on a display to which the mobile terminal is connected. The information displayed can be the CSG ID for which the local temporary time period has expired. (2) The mobile terminal notifies the user to that effect by using a notification sound. (3) The mobile terminal notifies the user to that effect by using a vibrator function.

Variant 1 of Embodiment 5 can provide the following advantages in addition to the advantages provided by Embodiment 5. According to the solution provided by Embodiment 5, the network side needs to wait for the completion of the phone call of the mobile terminal being served by a CSG cell with the CSG ID to which the mobile terminal has made a temporary subscription. The time which has elapsed until the supply of a service from a CSG to which a mobile terminal has made a temporary subscription to the mobile terminal is stopped after the original temporary time period has expired is influenced by the user's actions. In contrast, in accordance with this embodiment, the time which has elapsed until the supply of the service from the CSG to which the mobile terminal has made the temporary subscription to the mobile terminal is stopped after the original temporary time period has expired is not influenced by the user's actions. Therefore, the mobile communication system can be constructed in such a way as to operate with stability without taking into consideration the uncertainty of the user actions. Further, the mobile communication system can stop the service from the cell with the CSG ID to the mobile terminal without waiting for the completion of the phone call of the mobile terminal being served by the cell, and can be constructed in such a way as to heed the will of either the owner of the CSG cell or the operator.

Variant 2 of Embodiment 5

Because a problem to be solved by Variant 2 of Embodiment 5 is the same as that solved by Embodiment 5, the explanation of the problem is omitted hereafter.

A solution provided by Variant 2 of Embodiment 5 is shown below. In a case in which the temporary time period expires when the mobile terminal is making a phone call while being served by a CSG cell with a CSG ID to which the mobile terminal has made a temporary subscription, the network side notifies the mobile terminal that the temporary time period for the temporary subscription has expired. Being triggered by this notification, the network side stops the service from the CSG cell with the CSG ID to the mobile terminal. Being triggered by the notification, the network side can alternatively disconnect the phone call between the CSG cell with the CSG ID and the mobile terminal. Being triggered by the notification, the network side can alternatively release the radio link between the CSG cell with the CSG ID and the mobile terminal.

In addition, by implementing a solution as shown below, the mobile communication system can solve the above-mentioned problems 1, 2, and 3 at a time. Two solutions are disclosed below. (1) Use this variant in combination with Embodiment 1, Variant 1 of Embodiment 1, Embodiment 2, Variant 1 of Embodiment 2, Embodiment 3, Variant 1 of Embodiment 3, Variant 2 of Embodiment 3, Embodiment 4, Variant 1 of Embodiment 4, or Variant 2 of Embodiment 4.

(2) The network side notifies the mobile terminal that the temporary time period has expired by using a connection established between the network side and the mobile terminal when the mobile terminal shifts from an active state to an idle state. The network side notifies the mobile terminal that the temporary time period has expired by using control information (c-plane) in the connection. A concrete example of information showing that the temporary time period has expired is information for identifying the CSG for which the temporary time period has expired. Because a concrete example of the information for identifying the CSG for which the temporary time period has expired is the same as that shown in Embodiment 1, the explanation of the concrete example is omitted hereafter. As a result, in the mobile communication system in which the mobile terminal is allowed to make a temporary subscription to a plurality of CSGs, the network side can correctly notify the mobile terminal about to which CSG the temporary subscription whose temporary time period has expired has been made. A concrete example of an entity of the network side is an MME, an HSS, or the like. The network side which has notified the mobile terminal that the temporary time period has expired ends the management of the CSG ID as an expired CSG subscription while bringing the CSG ID into correspondence with the mobile terminal, or does not start the management of the CSG ID for the mobile terminal as an expired CSG subscription. Further, the mobile terminal which has received the notification showing that the temporary time period has expired deletes the CSG ID from the allowed CSG ID list stored therein. Accordingly, the mobile communication system can be constructed in such a way that consistency is provided between the mobile terminal and the network side.

Figure 27:
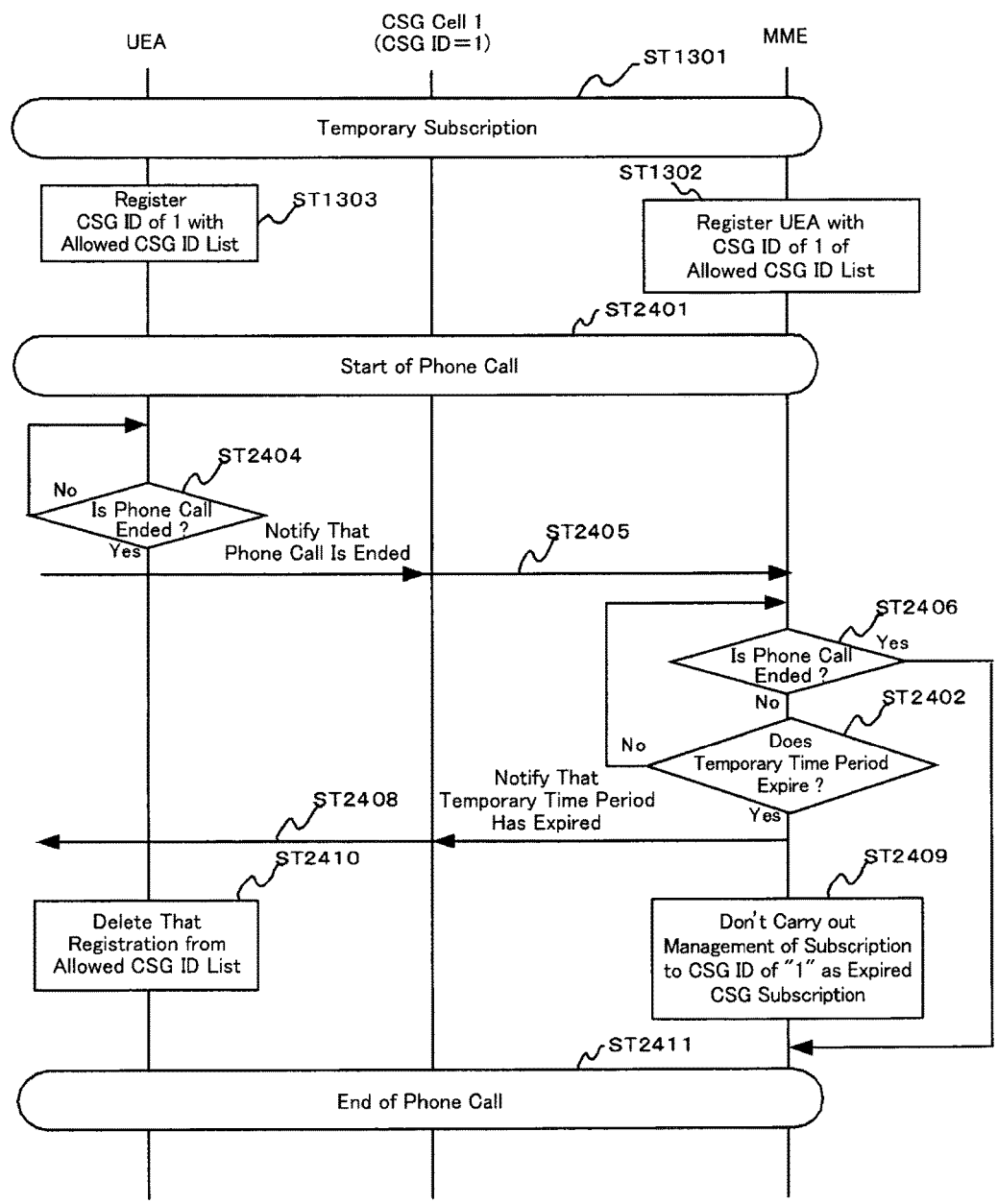
FIG. 27 is a sequence diagram of the operation of a mobile communication system according to a solution provided by Variant 2 of Embodiment 5.

An example of the operation of the mobile communication system is shown in FIG. 27. Because the same reference numerals as those shown in FIGS. 13 and 24 denote like parts, the explanation of the parts is omitted hereafter. An MME, in step ST2406, determines whether or not to end a phone call. When ending the phone call, the MME shifts to step ST2411. In contrast, when not ending the phone call, the MME shifts to step ST2402. The MME, in step ST2402, determines whether the temporary time period for the temporary subscription with which the mobile terminal is making the phone call expires. When the temporary time period expires, the MME shifts to step ST2408. In contrast, when the temporary time period does not expire, the MME returns to step ST2406. The MME, in step ST2408, notifies the mobile terminal that the temporary time period has expired through the CSG cell with the CSG ID associated with the temporary subscription. In this example of the operation, the MME transmits the information to the mobile terminal through the CSG cell 1. The MME, in step ST2409, does not start managing the CSG ID associated with the subscription as an expired CSG subscription. In this example of the operation, the MME does not start the management of the CSG ID of "1" for the mobile terminal A as an expired CSG subscription. The mobile terminal A, in step ST2410, deletes the CSG ID from the allowed CSG ID list thereof. In this example of the operation, the mobile terminal A deletes the CSG ID of "1" from the allowed CSG ID list thereof.

Further, when receiving the notification showing that the temporary time period has expired or when deleting the CSG ID associated with the temporary subscription from the allowed CSG ID list, the mobile terminal can notify the user to that effect. As a result, the mobile communication system enables the user to know that the temporary time period has expired, and can provide a user-friendly communication environment for users.

Three concrete examples of a method of notifying the user to that effect are disclosed below. (1) The mobile terminal displays the information thereon or on a display to which the mobile terminal is connected. The information displayed can be the CSG ID for which the local temporary time period has expired. (2) The mobile terminal notifies the user to that effect by using a notification sound. (3) The mobile terminal notifies the user to that effect by using a vibrator function.

Variant 2 of Embodiment 5 can provide the following advantages. Even in a case in which the temporary time period expires when a mobile terminal is making a phone call while being served by a CSG cell with a CSG ID to which the mobile terminal has made a temporary subscription, the mobile communication system can disconnect the phone call after notifying the user that the temporary time period has expired. As a result, the mobile communication system can provide a user-friendly communication environment for the user.

Further, the mobile communication system can end the management of the temporary subscription as an expired CSG subscription or stop a start of the management of a temporary subscription as an expired CSG subscription. The mobile communication system can thus prevent the number of temporary subscriptions which are managed as expired CSG subscriptions from increasing as the number of mobile terminals which temporarily subscribe the CSG increases. As a result, the above-mentioned problem 1 that the processing load imposed on the network side due to the management of expired CSG subscriptions increases can be solved.

Further, because the mobile communication system can end the management of a temporary subscription as an expired CSG subscription, the mobile communication system can carry out the paging optimisation, like that in accordance with Embodiment 1. As a result, the MME or the CSG cell with the CSG ID can eliminate a needless paging transmitting process of transmitting a paging to a mobile terminal for which the MME or the CSG cell does not have to support any service originally because the time period for a temporary subscription has expired or a CSG subscription has been canceled, and needless radio resources and so on used for the paging transmission can be reduced.

Further, the mobile terminal can delete the CSG ID associated with the temporary subscription from the allowed CSG ID list stored therein in response to the notification from the network showing that the temporary time period has expired. As a result, the same advantages as those provided by Embodiment 2 can be provided.

According to the solution provided by Embodiment 5, the network side needs to wait for the completion of the phone call of the mobile terminal being served by a CSG cell with the CSG ID to which the mobile terminal has made a temporary subscription. The time which has elapsed until the supply of a service from a CSG to which a mobile terminal has made a temporary subscription to the mobile terminal is stopped after the original temporary time period has expired is influenced by the user's actions. In contrast, in accordance with this embodiment, the time which has elapsed until the supply of the service from the CSG to which the mobile terminal has made the temporary subscription to the mobile terminal is stopped after the original temporary time period has expired is not influenced by the user's actions. Therefore, the mobile communication system can be constructed in such a way as to operate with stability without taking into consideration the uncertainty of the user actions. Further, the mobile communication system can stop the service from the cell with the CSG ID to the mobile terminal without waiting for the completion of the phone call of the mobile terminal being served by the cell, and can be constructed in such a way as to heed the will of either the owner of the CSG cell or the operator.

Embodiment 6

A problem to be solved by Embodiment 6 is explained below. A cell which is operated in a hybrid access mode supports both an open access mode and a closed access mode. Therefore, there is a possibility that a temporary subscription is accepted also for an operation in the closed access mode of the hybrid access mode. In contrast, 3GPP does not currently disclose any technique concerning a temporary subscription to a cell which is operated in the hybrid mode. There raises an issue that it is necessary to construct a mobile communication system which can provide a user-friendly service which makes use of supporting both the open access mode and the closed access mode by the cell operated in the hybrid mode when the temporary time period for a temporary subscription to the cell which is operated in the hybrid access mode expires.

A solution provided by Embodiment 6 is shown below. When a mobile terminal is in the coverage of a cell operated in the hybrid access mode and with a CSG ID to which a mobile terminal has made a temporary subscription, and the temporary time period for the temporary subscription expires, the network side changes the handling of the mobile terminal from handing the mobile terminal as a CSG member to handing the mobile terminal as a non-CSG member. In other words, the cell which is operated in the hybrid access mode changes from an operation in the closed access mode to an operation in the open access mode for the mobile terminal.

Even when the temporary time period for the temporary subscription has expired, the cell which is operated in the hybrid access mode enables the mobile terminal to continue camping on the cell. Even when the temporary time period for the temporary subscription has expired, the cell which is operated in the hybrid access mode enables the mobile terminal to continue making a phone call. In the phone call which the mobile terminal continues making, the mobile terminal can be handled as a non-CSG member.

Figure 28:
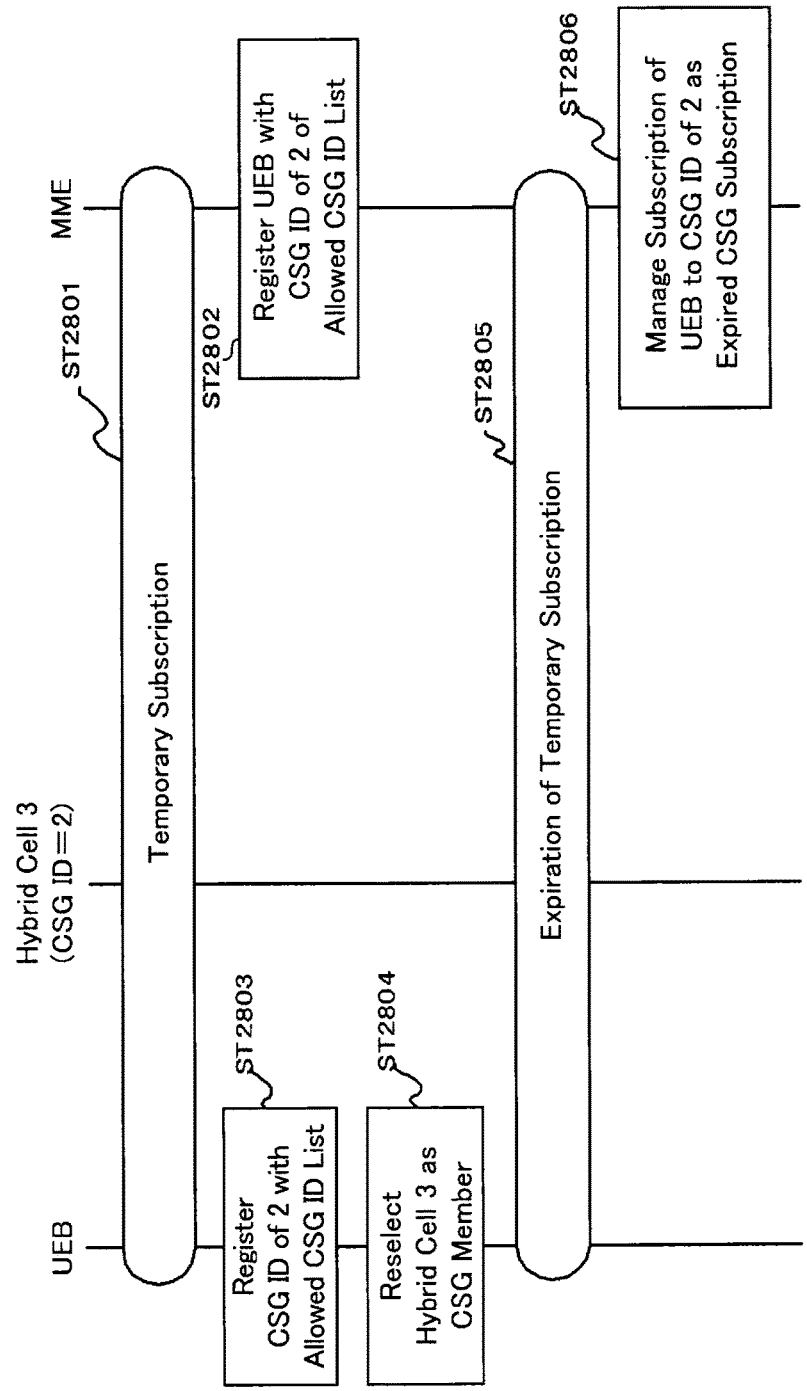
FIG. 28 is a sequence diagram of the operation of a mobile communication system when a mobile terminal is in an idle state according to a solution provided by Embodiment 6.

An example of the operation of the mobile communication system when the temporary time period for a mobile terminal in an idle state has expired is shown in FIG. 28. A mobile terminal B (UEB), in step ST2801, is caused to temporarily subscribe to a CSG ID of "2". The network side, concretely an MME, in step ST2802, registers the mobile terminal B with the CSG ID of "2", and manages the allowed CSG ID list in which the CSG ID of "2" is contained. The mobile terminal B, in step ST2803, registers the CSG ID of "2" therein, and manages the allowed CSG ID list in which the CSG ID of "2" is contained. The mobile terminal B, in step ST2804, reselects a hybrid cell 3 with the CSG ID of "2" and operated in the hybrid access mode as a CSG cell. More specifically, the mobile terminal B reselects the hybrid cell 3 as a CSG member to the CSG ID of "2". As a result, the mobile terminal B camps on the hybrid cell 3. In step ST2805, the temporary time period for the temporary subscription of the mobile terminal B to the CSG ID of "2" expires. The network side, concretely the MME, in step ST2806, manages the subscription of the mobile terminal B to the CSG ID of "2" as an expired CSG subscription.

Figure 29:
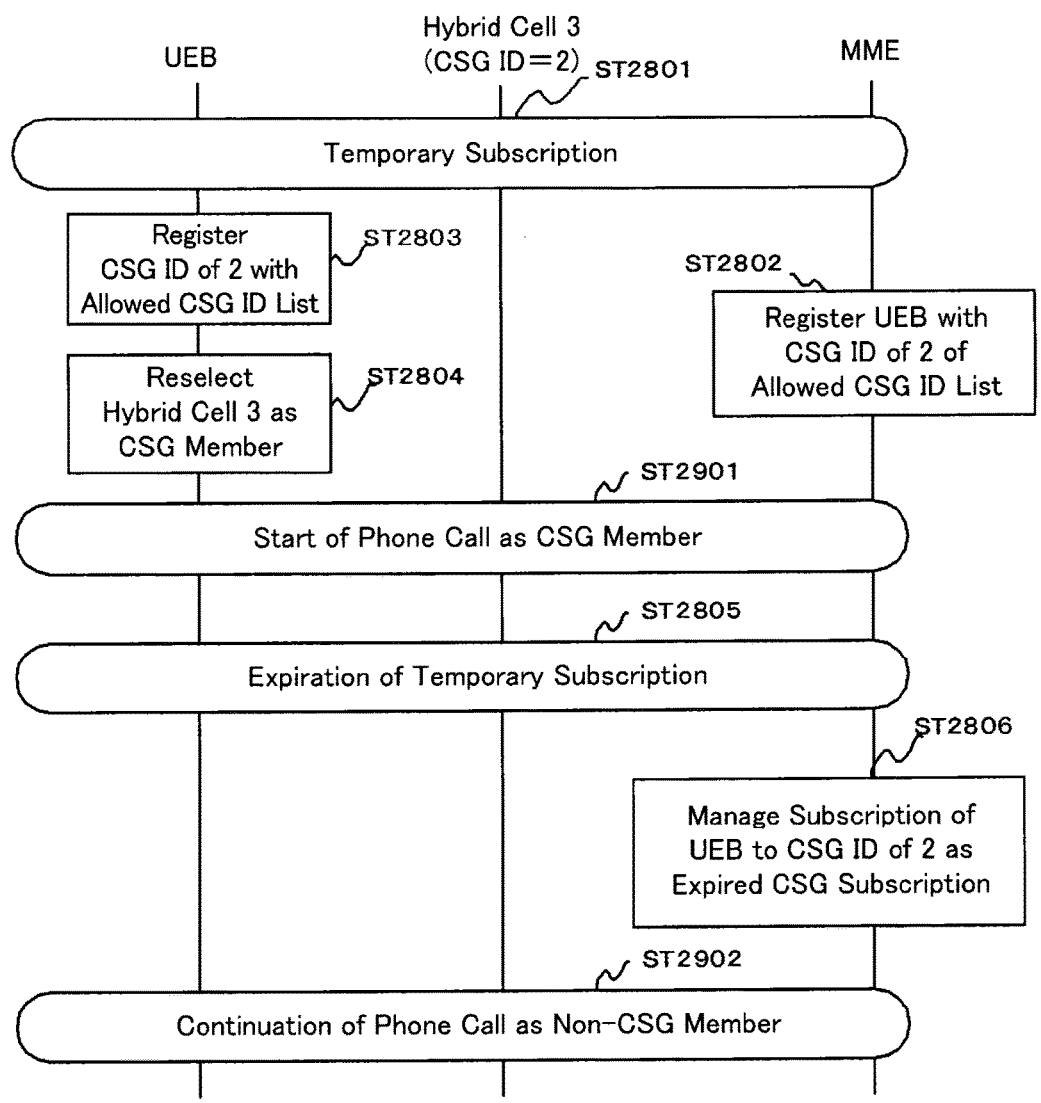
FIG. 29 is a sequence diagram of the operation of the mobile communication system when the mobile terminal is in an active state according to the solution provided by Embodiment 6.

An example of the operation of the mobile communication system when the temporary time period for a mobile terminal in an active state has expired is shown in FIG. 29. Because the same reference numerals as those shown in FIG. 28 denote like parts, the explanation of the parts is omitted hereafter. A mobile terminal B, in step ST2901, starts making a phone call by using a hybrid cell 3 with a CSG ID of "2" to which the mobile terminal has made a temporary subscription as a serving cell. More specifically, the mobile terminal B establishes a connection between the mobile terminal and the hybrid cell 3 as a CSG member to the CSG ID of "2". In step ST2805, the temporary time period for the temporary subscription of the mobile terminal B to the CSG ID of "2" expires. The network side, concretely an MME, in step ST2806, manages the subscription of the mobile terminal B to the CSG ID of "2" as an expired CSG subscription. The mobile terminal B, in step ST2902, continues the phone call in the open access mode by using the hybrid cell 3 as a serving cell. More specifically, the mobile terminal B maintains the connection with the hybrid cell 3 as a non-CSG member to the CSG ID of "2".

This Embodiment 6 can be used in combination with Embodiment 1, Variant 1 of Embodiment 1, Embodiment 2, Variant 1 of Embodiment 2, Embodiment 3, Variant 1 of Embodiment 3, Variant 2 of Embodiment 3, Embodiment 5, or Variant 1 of Embodiment 5.

Embodiment 6 can provide the following advantages. Even though the temporary time period for a subscription for the closed access mode has expired, a cell which is operated in the hybrid access mode can make the mobile terminal keep on camping on the cell associated with the subscription. Even though the temporary time period for a subscription for the closed access mode has expired, a cell which is operated in the hybrid access mode can maintain a phone call of the mobile terminal associated with the subscription. As a result, the mobile communication system can provide a user-friendly service which makes use of supporting both the open access mode and the closed access mode by the cell operated in the hybrid access mode.

Further, even though the temporary time period for a subscription for the closed access mode has expired, a cell which is operated in the hybrid access mode can handle the mobile terminal as a non-CSG member when a phone call of the mobile terminal associated with the subscription is maintained. As a result, the mobile communication system can be constructed in such a way as to heed the will of either the owner of the CSG cell or the operator.

Variant 1 of Embodiment 6

A problem to be solved by Variant 1 of Embodiment 6 is explained below. In the case that the solution provided by Embodiment 6 is implemented, the following problem arises. In accordance with a currently-used method of updating the allowed CSG ID list stored in the mobile terminal, it is necessary to receive a reject message from a cell with the CSG ID for which the time period for a temporary subscription has expired in order to delete the CSG ID. However, in accordance with Embodiment 6, even though the temporary time period for a temporary subscription has expired, a cell which is operated in the hybrid access mode can make the mobile terminal keep on camping on the cell associated with the subscription. Even though the temporary time period for a temporary subscription has expired, a cell which is operated in the hybrid access mode can maintain a phone call of the mobile terminal. Therefore, even when the temporary time period for the temporary subscription has expired, the mobile terminal does not receive a reject message from the cell with the CSG ID associated with the temporary subscription which is operated in the hybrid access mode. As a result, in accordance with the currently-used method of updating the allowed CSG ID list stored in the mobile terminal, the CSG ID associated with the temporary subscription is not deleted from the allowed CSG ID list stored in the mobile terminal, and therefore the above-mentioned problem 2 occurs.

In the above-mentioned explanation, a case in which the temporary time period for a temporary subscription has expired is explained mainly. On the other hand, also in a case in which a subscription to a CSG of a cell which is operated in the hybrid access mode is canceled for some reason, the same problem arises.

Further, there arises another problem that even though the mobile terminal is handled as a non-CSG member by the network side because the CSG ID for the mobile terminal is not registered in the allowed CSG ID list managed by the network side, the user has a wrong realization that he or she can enjoy a service as a CSG member because the CSG ID remains in the allowed CSG ID list stored in the mobile terminal. As a service in which this problem arises, for example, there can be a service which charges a CSG member a given communication cost regardless of the packet quantity, or a service which charges a non-CSG member a communication cost according to the packet quantity. In a case in which the mobile communication system offers such a service, there arises a problem that the user suffers a disadvantage of, for example, paying a high communication cost as a result of carrying out large-volume packet communications after understanding that the user will be charged a given communication cost regardless of the packet quantity because of the user's wrong realization that he or she can enjoy a service as a CSG member even though the mobile terminal is handled as a non-CSG member by the network side and the communication cost according to the packet quantity is added.

A solution provided by Variant 1 of Embodiment 6 is shown below. When the network side transmits an accept or attach accept ack to a request which a mobile terminal has transmitted, through a cell with a CSG ID associated with a temporary subscription for which the temporary time period has expired, the cell being operated in the hybrid access mode, when the temporary time period for the temporary subscription of the mobile terminal has expired, the network side notifies the CSG subscription status of the mobile terminal to the mobile terminal. Also when the network side transmits an accept or attach accept ack to a request which a mobile terminal has transmitted, through a cell with a CSG ID for which a CSG subscription has been canceled, the cell being operated in the hybrid access mode, when the CSG subscription has been canceled, the network side notifies the CSG subscription status of the mobile terminal to the mobile terminal. Because a concrete example of the CSG subscription status is the same as that shown in Variant 1 of Embodiment 2, the explanation of the concrete example is omitted hereafter. As an alternative, the network side can transmit information showing that the mobile terminal is using the open access mode or the mobile terminal is not using the closed access mode, as the CSG subscription status, to the mobile terminal. The mobile terminal checks to see the CSG subscription status, and, when determining, as a result of checking to see the CSG subscription status, that the mobile terminal has received information showing a CSG subscription for which the temporary time period has expired, a canceled CSG subscription, or the use of the open access mode, deletes the CSG ID from the allowed CSG ID list stored therein.

A concrete example of an entity of the network side which responds the request made by the mobile terminal is an MME or an HSS (Home Subscriber Server). Because a concrete example of the request which the mobile terminal transmits to the network side is the same as that shown in Embodiment 3, the explanation of the concrete example is omitted hereafter.

Three concrete examples of the ack which the network side transmits to the mobile terminal are disclosed below. (1) An accept or attach accept message which the network side transmits to the mobile terminal as a result of "E-UTRAN initial attach" which is the method of establishing an EPS (Evolved Packet system) bearer, the E-UTRAN initial attach being executed by the mobile terminal. (2) An accept or attach accept message which the network side transmits to the mobile terminal as a result of "UE triggered service Request" which is the method of setting up a user plane (u-plane) radio bearer, the UE triggered service Request being executed by the mobile terminal. (3) An accept or attach accept message which the network side transmits to the mobile terminal as a result of "E-UTRAN Tracking Area update" which is the method of updating the tracking area, the E-UTRAN Tracking Area update being executed by the mobile terminal.

Because a concrete example of a method of notifying the "CSG subscription status of the mobile terminal" to the mobile terminal, which the network side (an MME, a base station, or the like) uses, is the same as that shown in Embodiment 3, the explanation of the concrete example is omitted hereafter.

In addition, by implementing a solution as shown below, the mobile communication system can solve the above-mentioned problem 1. Two solutions are disclosed below. (1) Use this variant in combination with Embodiment 1 and Variant 1 of Embodiment 1. (2) When notifying the CSG subscription status of the mobile terminal to the mobile terminal by using an accept or attach accept ack to a request which the mobile terminal has transmitted through a cell with a CSG ID associated with a temporary subscription for which the temporary time period has expired, the cell being operated in the hybrid access mode, or a cell with a CSG ID for which a subscription has been canceled, the cell being operated in the hybrid access mode, the network side carries out the following processing. The network side deletes the CSG ID for the mobile terminal from the target for the management of expired CSG subscriptions. As a result, the mobile communication system can be constructed in such a way as to, when the CSG ID is deleted from the allowed CSG ID list stored in the mobile terminal, end the management of the temporary subscription as an expired CSG subscription managed by the network while bringing the CSG ID into correspondence with the mobile terminal, thereby providing consistency between the mobile terminal and the network side.

Figure 30:
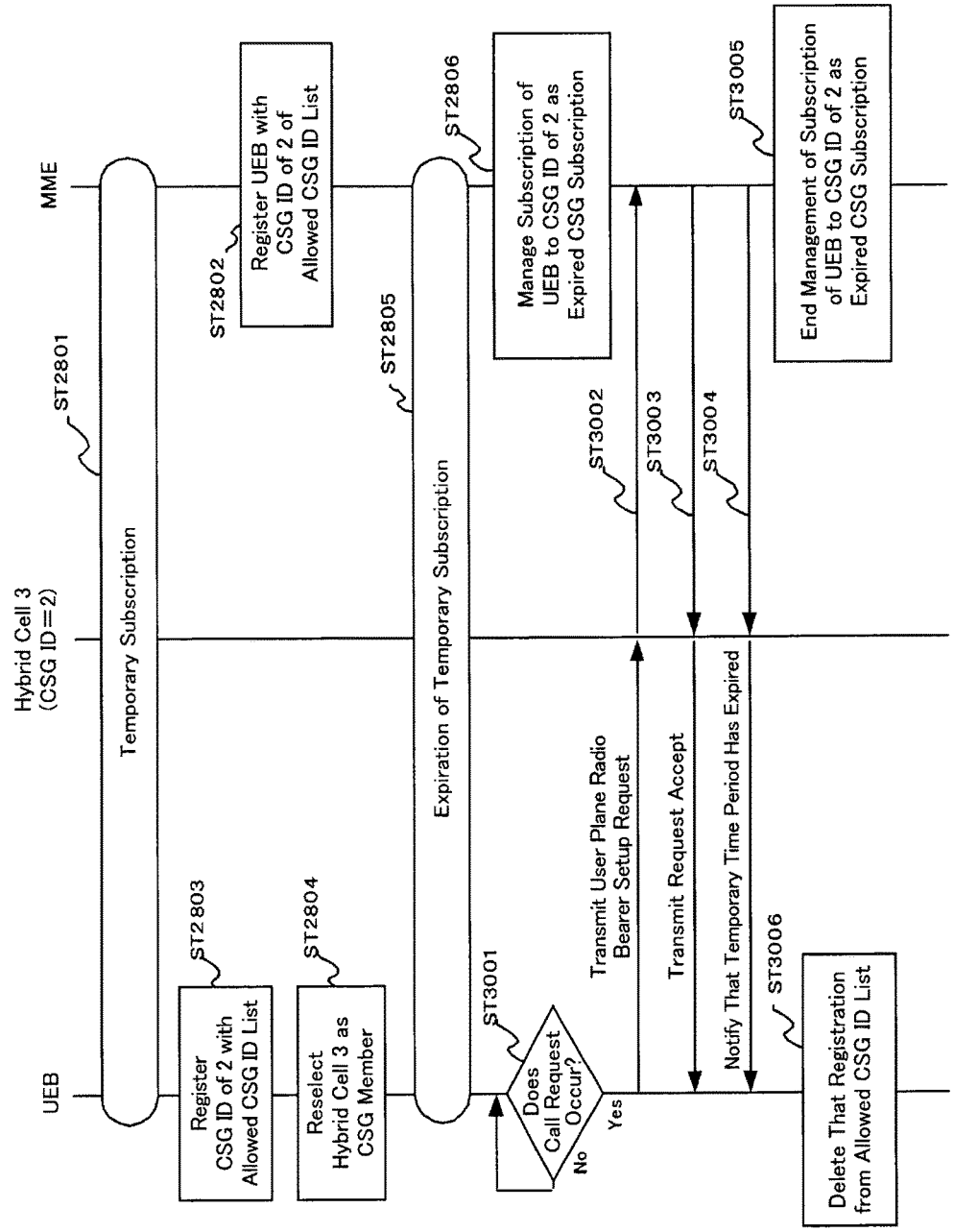
FIG. 30 is a sequence diagram of the operation of a mobile communication system when a mobile terminal is in an idle state according to a solution provided by Variant 1 of Embodiment 6.

An example of the operation of the mobile communication system when the temporary time period has expired in a mobile terminal in an idle state is shown in FIG. 30. Because the same reference numerals as those shown in FIG. 28 denote like parts, the explanation of the parts is omitted hereafter. A mobile terminal B (UEB), in step ST2801, is caused to temporarily subscribe to a CSG ID of "2". The mobile terminal B, in step ST3001, determines whether a call request occurs. When a call request occurs, the mobile terminal shifts to step ST3002. In contrast, when no call request occurs, the mobile terminal repeats the determination of step ST3001. The mobile terminal B, in step ST3002, transmits a setup request to set up a user plane radio bearer to an MME through a hybrid cell 3. In a concrete example, the mobile terminal B transmits a "UE triggered service Request" to the MME.

The MME, in step ST3003, transmits an accept or attach accept message to the mobile terminal B in response to the request to set up a user plane radio bearer. At this time, because the temporary time period for the temporary subscription of the mobile terminal B to the CSG ID of "2" has expired, the CSG ID of "2" for the mobile terminal B is not managed in a state in which the CSG ID of "2" is registered in the allowed CSG ID list managed by the network side. Therefore, the MME determines that the mobile terminal B is a non-CSG member for the CSG ID of "2" which the hybrid cell 3 has. However, the MME does not transmit a reject message to the mobile terminal B in response to the request to set up a user plane radio bearer, but transmits an accept message to the mobile terminal B because of the existence of the open access mode in the hybrid cell 3.

In this case, when transmitting an accept message in response to the request from the mobile terminal, the MME can transmit information showing whether the accept message is targeted for the open access mode or the closed access mode to the hybrid cell. As a result, the cell which is operated in the hybrid access mode can singly perform different control operations on a mobile terminal which is connected thereto in the open access mode and a mobile terminal which is connected thereto in the closed access mode. In a concrete example, the cell gives a higher priority to a mobile terminal which is connected thereto in the closed access mode than to a mobile terminal which is connected thereto in the open access mode. As a concrete example of the information showing whether the accept message is targeted for the open access mode or the closed access mode, there is information showing whether or not the mode is the open access one, information showing whether or not the mode is the closed access one, or information showing whether the mode is the open access one or the closed access mode.

The MME, in step ST3004, notifies the mobile terminal B that the temporary time period has expired. As an alternative, the MME can notify the mobile terminal B that the MME uses the open access mode. As an alternative, the MME can notify the mobile terminal B that the MME does not use the closed access mode. The processes in steps ST3003 and ST3004 can be performed simultaneously. Further, the MME can notify the mobile terminal B that the temporary time period has expired as a part of information elements included in a TAU accept message. As a result, what is necessary is just to carry out a downlink scheduling on the serving cell only once, and therefore there can be provided an advantage of reducing the processing load imposed on the serving cell and making effective use of radio resources.

The MME, in step ST3005, deletes the CSG ID for which the MME has notified the mobile terminal, as the "CSG subscription status of the mobile terminal", that the temporary time period has expired, for example, by using the response to the mobile terminal, and which is registered for the mobile terminal from the target for the management of expired CSG subscriptions. In this example of the operation, the MME deletes the CSG ID of "2" for the mobile terminal B from the target for the management of expired CSG subscriptions. The mobile terminal B, in step ST3006, deletes the CSG ID from the allowed CSG ID list stored therein when the CSG subscription for which the temporary time period has expired or the canceled CSG subscription is included in the CSG subscription status transmitted in step ST3004, or the information showing that the MME uses the open access mode or that the MME does not use closed access mode is included in the CSG subscription status. In this example of the operation, when making a CSG subscription, the mobile terminal realizes the CSG ID of "2" as a CSG subscription for which the temporary time period has expired, and deletes the CSG ID of "2" from the allowed CSG ID list stored therein.

An example of the operation of the mobile communication system when the temporary time period has expired in the mobile terminal in an active state is disclosed below. The example is explained below assuming that the mobile communication system allows the mobile terminal B (UEB) to temporarily subscribe to a CSG ID of "2". The mobile terminal B starts making a phone call by using a hybrid cell 3 with the CSG ID of "2" to which the mobile terminal has made a temporary subscription as a serving cell. More specifically, the mobile terminal B establishes a connection between the mobile terminal and the hybrid cell 3 as a CSG member to the CSG ID of "2". After that, the temporary time period for the temporary subscription of the mobile terminal B to the CSG ID of "2" expires. Two examples of an operation which is performed after the temporary time period has expired.

(1) The MME notifies the mobile terminal B that the temporary time period has expired by using the connection established between the hybrid cell 3 and the mobile terminal B as a CSG member. As an alternative, the MME can notify the mobile terminal B that the MME uses the open access mode. As an alternative, the MME can notify the mobile terminal B that the MME does not use the closed access mode. After that, the MME deletes the subscription of the mobile terminal B to the CSG ID of "2" from the allowed CSG ID list managed by the network side, but does not start the management of the subscription of the mobile terminal B to the CSG ID of "2" as an expired CSG subscription. The mobile terminal B deletes the CSG ID from the allowed CSG ID list stored therein for the CSG subscription (the CSG ID of "2") for which the temporary time period has expired. The mobile terminal B maintains the phone call in the open access mode by using the hybrid cell 3 as a serving cell. More specifically, the mobile terminal B maintains the connection between the mobile terminal and the hybrid cell 3 as a non-CSG member to the CSG ID of "2".

(2) The MME manages the subscription of the mobile terminal B to the CSG ID of "2" as an expired CSG subscription. The mobile terminal B maintains the phone call in the open access mode by using the hybrid cell 3 as a serving cell. More specifically, the mobile terminal B maintains the connection between the mobile terminal and the hybrid cell 3 as a non-CSG member to the CSG ID of "2". The MME notifies the mobile terminal B that the temporary time period has expired by using the connection established between the hybrid cell 3 and the mobile terminal B as a non-CSG member. After that, the MME ends the management of the subscription of the mobile terminal B to the CSG ID of "2" as an expired CSG subscription. The mobile terminal B deletes the CSG ID from the allowed CSG ID list stored therein for the CSG subscription (the CSG ID of "2") for which the temporary time period has expired.

Further, when receiving the notification showing that the temporary time period has expired, or that the MME uses the open access mode or that the MME does not use the closed access mode, when deleting the CSG ID associated with the temporary subscription from the allowed CSG ID list, or the like, the mobile terminal can notify the user to that effect. As a result, the mobile communication system enables the user to know that the temporary time period has expired, and can provide a user-friendly communication environment for users.

Three concrete examples of a method of notifying the user to that effect are disclosed below. (1) The mobile terminal displays the information thereon or on a display to which the mobile terminal is connected. The information displayed can be the CSG ID for which the local temporary time period has expired. (2) The mobile terminal notifies the user to that effect by using a notification sound. (3) The mobile terminal notifies the user to that effect by using a vibrator function.

Variant 1 of Embodiment 6 can be used in combination with Embodiment 1, Variant 1 of Embodiment 1, Embodiment 2, Variant 1 of Embodiment 2, Embodiment 3, Variant 1 of Embodiment 3, Variant 2 of Embodiment 3, Embodiment 5, or Variant 1 of Embodiment 5.

Variant 1 of Embodiment 6 can provide the following advantages in addition to the advantages provided by Embodiment 6. At the time of the expiration of a temporary subscription of a mobile terminal to a CSG which is operated in the hybrid access mode, the CSG subscription status of the mobile terminal is notified from the network side to the mobile terminal. This notification makes it possible for the network side to end the management of the CSG ID associated with the temporary subscription of the mobile terminal as an expired CSG subscription. As a result, the above-mentioned problem 1 can be solved. Therefore, there can be provided the same advantages as those provided by Embodiment 1.

Further, by causing the network side to notify the CSG subscription status of the mobile terminal to the mobile terminal, the mobile communication system enables the mobile terminal to delete the CSG ID from the allowed CSG ID list stored in the mobile terminal. As a result, the above-mentioned problem 2 can be solved. Therefore, there can be provided the same advantages as those provided by Embodiment 2. Further, in accordance with this Variant 1 of Embodiment 6, because the mobile terminal checks to see the CSG subscription status thereof notified thereto from the network side, there can be provided a further advantage of being able to construct the mobile communication system in such a way that consistency between the mobile terminal and the network side is provided.

Further, because the mobile terminal or the user can know that the handling thereof is changed from handing the mobile terminal as a CSG member to handing the mobile terminal as a non-CSG member from, for example, the fact that the temporary time period for a temporary subscription has expired in a cell which is operated in the hybrid access mode, the mobile communication system which is user-friendly can be constructed.

Embodiment 7

A problem to be solved by Embodiment 7 is explained below. There is a case in which even a normal CSG member subscription is canceled for some reason. In accordance with a currently-used method of updating an allowed CSG ID list stored in a mobile terminal, in order to delete a CSG ID associated with cancellation of a CSG member subscription, it is necessary to receive a reject message from a cell with the CSG ID associated with the cancellation of the subscription. When cancelling the subscription of the mobile terminal to the CSG ID which the CSG cell has after the mobile terminal moves away from the coverage area of the CSG cell, the mobile terminal is not rejected by the CSG cell. Because the inconsistency between the allowed CSG ID list managed by the network side and the allowed CSG ID list stored in the mobile terminal continues in this way, the above-mentioned problem 2 arises.

Further, the following situation occurs, and therefore the following problem 4 arises. There occurs a situation in which the mobile terminal selects or camps on a cell with a CSG ID when making a CSG cell selection or reselection in the automatic mode thereof because the CSG ID is not deleted from the allowed CSG ID list stored in the mobile terminal even though the CSG ID is not included in the allowed CSG ID list managed by the network side any longer by reason of the cancellation of the CSG member subscription according to the will or the like of the owner of the cell, the operator, or the like. More specifically, there occurs a situation in which the mobile terminal selects or camps on a cell from which the mobile terminal cannot receive any subsequent service.

This situation raises the problem 4 in the above-mentioned conventional paging method as follows. When a CSG cell having a deleted CSG ID carries out the paging optimisation, no paging message destined for the mobile terminal is transmitted from the CSG cell. Because the CSG ID is not deleted from the allowed CSG ID list stored in the mobile terminal, as mentioned in the explanation of the above-mentioned situation, a case in which the mobile terminal camps on a CSG cell with the CSG ID which is deleted in the automatic mode of the mobile terminal is examined below. Because no paging message destined for the mobile terminal is transmitted from any CSG cell with the CSG ID, the mobile terminal cannot receive any paging message and no response to the paging is transmitted from the mobile terminal. Being triggered by no response from the mobile terminal to the paging, the network side repeatedly carries out the paging without carrying out the paging optimisation. This mobile terminal transmits a response to the paging through a CSG cell with the deleted CSG ID. Because the CSG ID for the mobile terminal is deleted from the allowed CSG ID list managed by the network side, the response from the mobile terminal to the paging is rejected. The mobile terminal that has received this reject message deletes the CSG ID from the allowed CSG list stored in the mobile terminal. As a result, the mobile terminal reselects a CSG cell with a CSG ID other than the above-mentioned CSG ID, which is included in the allowed CSG ID list stored therein, or a non-CSG cell, and receives a paging message from this cell. The mobile terminal responds to this paging message, and receives a notification showing an acceptance of the paging response through the cell.

As mentioned above, the mobile communication system executes the flow of the process including: (1) the step of carrying out the paging optimisation with a normal paging; (2) the step of the network side repeating the paging because the network side does not receive any paging response from the mobile terminal; (3) the step of the mobile terminal transmitting a response to a paging transmitted thereto through a CSG cell with an unregistered CSG ID; (4) the step of the network transmitting a reject message to the paging response by reason of the unregistration; (5) the step of the mobile terminal updating the allowed CSG ID list stored therein; (6) the step of the mobile terminal reselecting another cell; and (7) the step of the mobile terminal transmitting a response to a paging transmitted thereto through a registered CSG cell or a non-CSG cell. Thus, the problem 4 that a control time delay is accumulated in the steps (1) and (2) of the mobile communication system arises. Further, because the paging is carried out repeatedly, needless use of radio resources occurs.

Figure 31:
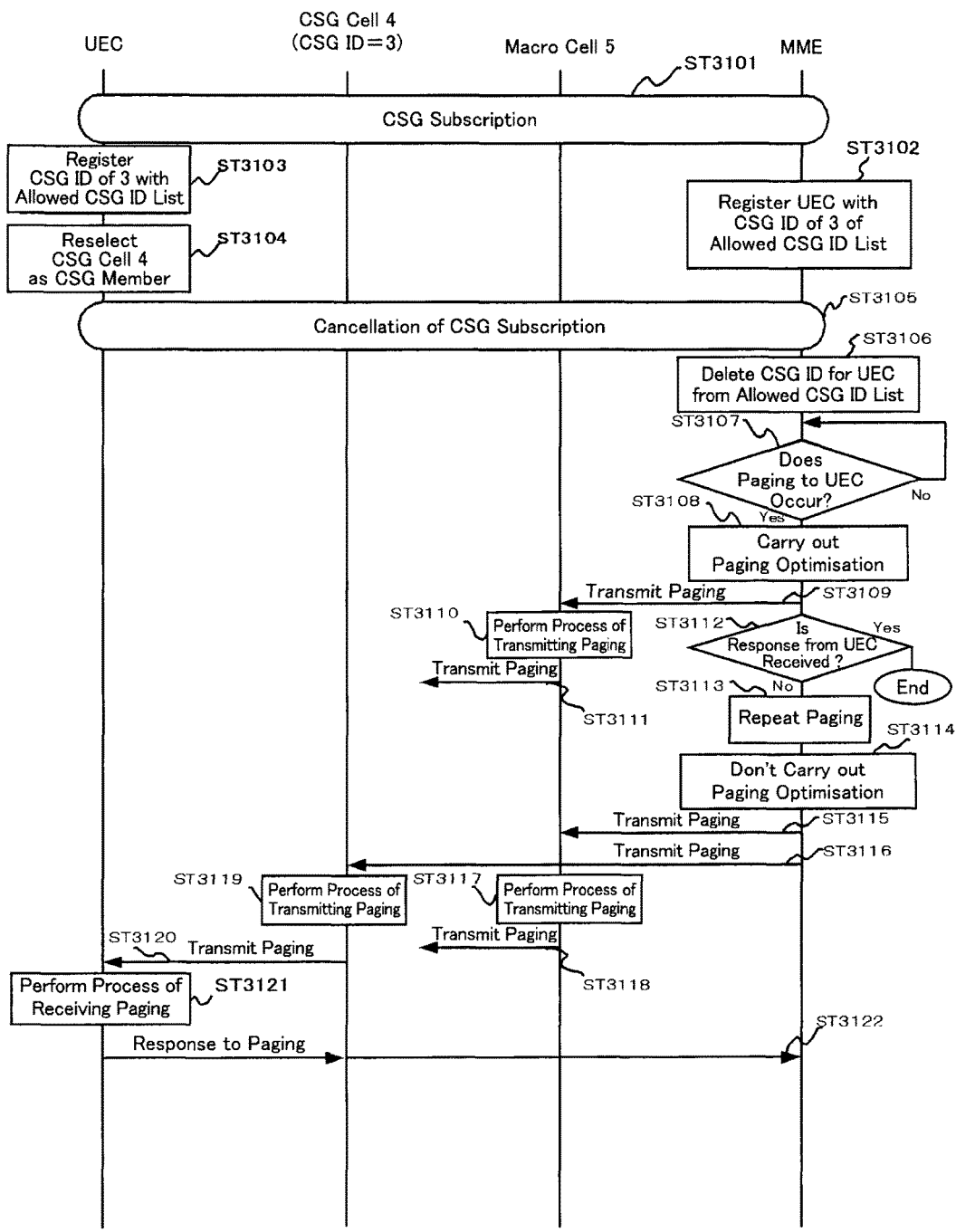
FIG. 31 is a sequence diagram of the operation of a mobile communication system for explaining a problem to be solved by Embodiment 7.

Concrete examples of an operation which causes the above-mentioned problem 3 is explained below with reference to FIG. 31. The mobile communication system, in step ST3101, registers a mobile terminal C (UEC) with a CSG ID of "3". The network side, concretely an MME, in step ST3102, registers the mobile terminal C with the CSG ID of "3", and manages the allowed CSG ID list in which the CSG ID of "3" is contained. The mobile terminal C, in step ST3103, registers the CSG ID of "3" therein, and manages the allowed CSG ID list in which the CSG ID of "3" is contained. The mobile terminal C in an idle state, in step ST3104, reselects a CSG cell 4 with the CSG ID of "3". More specifically, the mobile terminal C camps on the CSG cell 4 as a CSG member.

The registration of the mobile terminal C to the CSG ID of "3" is canceled in step ST3105. The network side, concretely the MME, in step ST3106, remove the registration of the mobile terminal C to the CSG ID of "3" from the allowed CSG ID list managed by the network side. The MME, in step ST3107, determines whether a paging destined for the mobile terminal C occurs. When a paging destined for the mobile terminal C occurs, the MME shifts to step ST3108, whereas when no paging destined for the mobile terminal C occurs, the MME repeats the determination of step ST3107.

The network side, concretely the MME, in step ST3108, carries out the paging optimisation on the paging destined for the mobile terminal C. In a concrete operation of the paging optimisation, when the allowed CSG ID list of the mobile terminal C which is managed by the network side is included in the paging message, the paging is not transmitted to a CSG cell with a CSG ID which is not included in the allowed CSG ID list. In this example of the operation, the MME does not transmit the paging to a CSG cell with the CSG ID of "3" in the tracking area to which the mobile terminal C belongs. More specifically, the MME does not transmit the paging to the CSG cell 4.

The network side, concretely the MME, in step ST3109, transmits the paging destined for the mobile terminal C to a macro cell 5 in the tracking area to which the mobile terminal C belongs. The macro cell 5, in step ST3110, carries out a process of transmitting the paging destined for the mobile terminal C. As a concrete example of the process, there is a scheduling for mapping the paging message to a physical downlink shared channel (PDSCH). The macro cell 5, in step ST3111, transmits the paging to the mobile terminal C. Because the mobile terminal C camps on the CSG cell 4, the mobile terminal C does not monitor the paging transmitted to the macro cell 5.

The network side, concretely the MME, in step ST3112, determines whether the network side has received a response to the paging transmission from the mobile terminal C. When the network side has not received any response from the mobile terminal C, the network side shifts to step ST3113. In contrast, when the network side has received a response to the paging from the mobile terminal C, the network side shifts to a process which is not a characterized part of this embodiment. Therefore, the explanation of this process is omitted. The network side, concretely the MME, in step ST3113, transmits the paging repeatedly. The network side, concretely the MME, in step ST3114, does not carry out the paging optimisation on the paging destined for the mobile terminal C. This is because it is decided by the current standards that the paging optimisation is not carried out when the paging is transmitted repeatedly. The above-mentioned problem 4 arises as shown in the explanation of steps 3108 to ST3114.

The network side, concretely the MME, in step ST3115, transmits the paging destined for the mobile terminal C to the macro cell 5. The network side, concretely the MME, in step ST3116, transmits the paging destined for the mobile terminal C to the CSG cell 4. The macro cell 5, in step ST3117, carries out the process of transmitting the paging destined for the mobile terminal C. As a concrete example of the process, there is a scheduling for mapping the paging message to a physical downlink shared channel (PDSCH). The macro cell 5, in step ST3118, transmits the paging to the mobile terminal C. The CSG cell 4, in step ST3119, carries out the process of transmitting the paging destined for the mobile terminal C. As a concrete example of the process, there is a scheduling for mapping the paging message to a physical downlink shared channel (PDSCH). The CSG cell 4, in step ST3120, transmits the paging to the mobile terminal C. The mobile terminal C, in step ST3121, receives the paging from the CSG cell 4, and carries out a paging receiving process. The mobile terminal C, in step ST3122, transmits a response to paging to the MME through the CSG cell 4.

A solution provided by Embodiment 7 is shown below. When a CSG member subscription is canceled, the network manages the CSG ID for the mobile terminal as an expired CSG subscription. When a CSG member subscription is canceled, the network side carries out the same management and control as those which the network side performs when the temporary time period for a temporary subscription has expired.

As a result, because it is decided in accordance with a currently-used paging method that expired CSG subscriptions are handled as valid CSG subscriptions for the paging optimisation, the paging optimisation is not carried out on the paging destined for the mobile terminal even when a CSG member subscription is canceled. More specifically, explaining with reference to FIG. 31, because the process in step ST3108 is not performed, steps ST3109 to ST3113 can be eliminated. Therefore, the problem 4 can be solved.

Further, because the current technique about "expired CSG subscriptions" in the network side is used in the solution provided by this Embodiment 7, there can be provided an advantage of being able to solve the problem 4 while preventing an increase in the load imposed on the network. As a result, there can be provided an advantage of preventing the mobile communication system from increasing in complexity.

This Embodiment 7 can be used in combination with Embodiment 1, Variant 1 of Embodiment 1, Embodiment 2, Variant 1 of Embodiment 2, Embodiment 3, Variant 1 of Embodiment 3, Variant 2 of Embodiment 3, Embodiment 4, Variant 1 of Embodiment 4, Variant 2 of Embodiment 4, Embodiment 5, Variant 1 of Embodiment 5, Embodiment 6, or Variant 1 of Embodiment 6.

Variant 1 of Embodiment 7

Because a problem to be solved by Variant 1 of Embodiment 7 is the same as that by Embodiment 7, the explanation of the problem is omitted hereafter.

A solution provided by Variant 1 of Embodiment 7 is shown below. When a CSG member subscription is canceled, the network manages the CSG ID for the mobile terminal as a "canceled CSG subscription", independently from expired CSG subscriptions. Further, canceled CSG subscriptions are handled as valid CSG subscriptions for the paging optimisation. As a result, the paging optimisation is not carried out on a paging destined for the mobile terminal also when a CSG member subscription is canceled. More specifically, explaining with reference to FIG. 31, because the process in step ST3108 is not performed, steps ST3109 to ST3113 can be eliminated. Therefore, the problem 4 can be solved.

Further, in accordance with the solution provided by this Variant 1 of Embodiment 7, because "cancelled CSG subscriptions" are managed and controlled independently of the conventional management of "expired CSG subscriptions" by the network side, there can be provided an advantage of being able to deal with a change in the specifications of the mobile communication system, and so on with flexibility.

Embodiment 1, Variant 1 of Embodiment 1, Embodiment 2, Variant 1 of Embodiment 2, Embodiment 3, Variant 1 of Embodiment 3, Variant 2 of Embodiment 3, Embodiment 4, Variant 1 of Embodiment 4, Variant 2 of Embodiment 4, Embodiment 5, Variant 1 of Embodiment 5, Embodiment 6, or Variant 1 of Embodiment 6 can be applied to "cancelled CSG subscriptions" according to Variant 1 of this Embodiment 7.

Although the communication system using the LTE method in which a Home-eNB is used as a CSG cell is shown above, the present invention can also be applied to a communication system using a UMTS method in which a Home-NB is used as a CSG cell.

In the communication system using the UMTS method in which a Home-NB is used as a CSG cell, an RNC is disposed between a base station (Home-NB or NB) and a core network, and an RRC message, such as an RRC connection request, has only to be transmitted and received between a mobile terminal and the RNC and a NAS message, such as a TAU request, has only to be transmitted from the mobile terminal to the core network through the base station (Home-NB or NB) and the RNC. By constructing the communication system in this way, the present invention can also be applied to the communication system using the UMTS method in which a Home-NB is used as a CSG cell.

The invention claimed is:

1. A mobile communication system including a closed subscriber group (CSG) cell which is accessible by a CSG member, a hybrid cell which is the CSG cell where a non-closed subscriber group (non-CSG) member is also allowed access at the same time, and a mobile terminal which is subscribed as the CSG member and connected to the CSG cell or the hybrid cell as the CSG member, wherein
triggered by reception at a base station of the CSG cell of a message from a network side while the mobile terminal is connected to the CSG cell, the message indicating a subscription time period for the CSG member has expired, the message being transmitted from the network side to a base station of the CSG cell and not transferred by the base station of the CSG cell to the mobile terminal, the CSG cell is configured to initiate a handover,
the CSG cell is configured to transmit a handover request to a target cell which is a handover destination of the mobile terminal,
the CSG cell is configured to transmit a radio resource management (RRC) connection reconfiguration message to the mobile terminal after receiving a handover request acknowledgement from the target cell,
the mobile terminal is configured to receive the RRC connection reconfiguration message from the CSG cell,
the mobile terminal is configured to transmit an RRC connection configuration complete message to the target cell, and
triggered by reception at a base station of the hybrid cell of the message from the network side while the mobile terminal is connected to the hybrid cell, the hybrid cell is configured to change treatment for the mobile terminal from treating the mobile terminal as the CSG member to treating the mobile terminal as the non-CSG member.

2. The mobile communication system according to claim 1, wherein the message from the network side is received directly by the CSG cell.

3. The mobile communication system according to claim 1, wherein the message from the network side includes information identifying a CSG whose subscription time period has expired.

4. The mobile communication system according to claim 3, wherein the information included in the message indicates a CSG ID as an identifier of the CSG.

5. The mobile communication system according to claim 1, wherein the RRC connection reconfiguration message includes at least information regarding a security algorithm of the target cell.

6. A base station that covers a closed subscriber group (CSG) cell which is accessible by a CSG member, the base station comprising:
   a receiver to receive a message from a network side while a mobile terminal subscribed as the CSG member is connected to the CSG cell, the message indicating a subscription time period for the CSG member has expired, the message being transmitted from the network side to a base station of the CSG cell and not transferred by the base station of the CSG cell to the mobile terminal,
   a controller to initiate a handover triggered by reception of the message from the network side, and
   a transmitter to transmit a handover request to a target cell which is a handover destination of the mobile terminal,
   wherein the transmitter transmits a radio resource management (RRC) connection reconfiguration message to the mobile terminal after the receiver receives a handover request acknowledgement from the target cell.

7. The base station according to claim 6, wherein the RRC connection reconfiguration message includes at least information regarding a security algorithm of the target cell.

8. A base station that covers a hybrid cell which is a closed subscriber group (CSG) cell accessible by a CSG member, where a non-closed subscriber group (non-CSG) member is also allowed access at the same time, the base station comprising:
   a receiver to receive a message from a network side while a mobile terminal subscribed as the CSG member is connected to the hybrid cell, the message indicating a subscription time period for the CSG member has expired, the message being transmitted from the network side to a base station of the CSG cell and not transferred by the base station of the CSG cell to the mobile terminal, and
   a controller to change treatment for the mobile terminal from treating the mobile terminal as the CSG member to treating the mobile terminal as the non-CSG member triggered by reception of the message from the network side.

* * * * *